US012184320B2

(12) United States Patent
Jaurigue et al.

(10) Patent No.: US 12,184,320 B2
(45) Date of Patent: Dec. 31, 2024

(54) AUTOMATED RADIO FREQUENCY SAFETY AND COMPLIANCE FOR 5G NETWORK SYSTEMS

(71) Applicant: Safe Dynamics, Inc., San Diego, CA (US)

(72) Inventors: Daniel Jaurigue, San Diego, CA (US); Milos Spisak, San Diego, CA (US); Bharat Shah, San Diego, CA (US); Serdar Ergun, San Diego, CA (US); Daniel J. Hill, San Diego, CA (US); Douglas M. Williams, San Diego, CA (US)

(73) Assignee: SAFE DYNAMICS, INC., San Diego, CA (US)

( * ) Notice: Subject to any disclaimer, the term of this patent is extended or adjusted under 35 U.S.C. 154(b) by 420 days.

(21) Appl. No.: 17/601,267

(22) PCT Filed: Apr. 15, 2020

(86) PCT No.: PCT/US2020/028335
§ 371 (c)(1),
(2) Date: Oct. 4, 2021

(87) PCT Pub. No.: WO2020/214715
PCT Pub. Date: Oct. 22, 2020

(65) Prior Publication Data
US 2022/0166454 A1 May 26, 2022

Related U.S. Application Data

(60) Provisional application No. 62/836,470, filed on Apr. 19, 2019.

(51) Int. Cl.
*H04B 1/3827* (2015.01)
*H04B 17/10* (2015.01)
*H04B 17/30* (2015.01)

(52) U.S. Cl.
CPC ......... *H04B 1/3838* (2013.01); *H04B 17/102* (2015.01); *H04B 17/30* (2015.01)

(58) Field of Classification Search
CPC ..... H04B 1/3838; H04B 17/102; H04B 17/30
(Continued)

(56) References Cited

U.S. PATENT DOCUMENTS 8,559,882 B2 * 10/2013 Williams ............... G06Q 10/06
455/67.11
9,338,679 B1 5/2016 Sheppard
(Continued)

FOREIGN PATENT DOCUMENTS

JP 2014-512738 A 5/2014
WO 2016/144668 A1 9/2016

OTHER PUBLICATIONS

Extended European Search Report dated Dec. 7, 2022 in European Patent Application No. 20791429.2.
(Continued)

*Primary Examiner* — Ayodeji O Ayotunde
(74) *Attorney, Agent, or Firm* — Procopio, Cory, Hargreaves & Savitch LLP

(57) ABSTRACT

Automated radio frequency safety and compliance for 5G network systems. In an embodiment, a database comprises, for each of a plurality of sites, data representing relative locations of transmitter(s), including at least one 5G antenna, that emit radio frequency (RF) radiation at the site. For at least one of the sites, a power density caused by the transmitter(s) is calculated for one or more areas of the site. In addition, a maximum permissible exposure (MPE) map of the site is generated. The MPE map may comprise a graphical representation of each transmitter, and graphically distinguish any area of the site for which the calculated power density exceeds at least one limit.

20 Claims, 28 Drawing Sheets

(58) Field of Classification Search
USPC .................................................... 455/552.1
See application file for complete search history.

(56) References Cited

U.S. PATENT DOCUMENTS

| | | | | |
|---|---|---|---|---|
| 9,515,378 | B2* | 12/2016 | Prasad | H01Q 1/245 |
| 2007/0229378 | A1* | 10/2007 | Clark | H01Q 1/125 |
| | | | | 343/765 |
| 2012/0091205 | A1* | 4/2012 | Khorsheed | G06K 7/14 |
| | | | | 235/462.11 |
| 2015/0181390 | A1 | 6/2015 | Williams | |
| 2018/0167897 | A1* | 6/2018 | Sampath | H04W 72/12 |
| 2019/0005317 | A1* | 1/2019 | Uhlemann | H04L 47/10 |
| 2019/0098607 | A1 | 3/2019 | Zhang et al. | |

OTHER PUBLICATIONS

International Search Report and Written Opinion for corresponding PCT/US2020/028335, mailed on Jul. 2, 2020, 18 pages.
Office Action dated Jan. 9, 2024 in Japanese Patent Application No. 2021-562136.

* cited by examiner

Site Specific Safety Program

AUTOMATED RADIO FREQUENCY SAFETY AND COMPLIANCE FOR 5G NETWORK SYSTEMS

CROSS-REFERENCE TO RELATED APPLICATIONS

This application claims priority to U.S. Provisional Patent App. No. 62/836,470, filed on Apr. 19, 2019, which is hereby incorporated herein by reference. This application also claims priority, as a continuation-in-part, to U.S. application Ser. No. 16/656,118, filed on Oct. 17, 2019, which is a continuation of U.S. application Ser. No. 14/640,876, filed Mar. 6, 2015, which are both hereby incorporated herein by reference.

BACKGROUND

Field of the Invention

This invention relates generally to radio frequency exposure safety and to a system for monitoring and controlling energy transmission. This invention also relates to electromagnetic energy exposure safety and for monitoring and controlling energy transmissions in 5G wireless networks.

Related Art

The current systems of protecting people from radio frequency ("RF") exposure are inadequate and are often in violation of existing state and federal regulations. Current cell phone use requires enormous cellular networks consisting of thousands of base station antennas. In addition, the wireless signals from base station antennas can be retransmitted or amplified by multiple or single indoor distributed antenna systems. These wireless transmission sites come with an environmental hazard, since they generate radio frequency (RF) radiation (RFR). RFR is tasteless, odorless, and invisible, increasing the need for a comprehensive RF safety compliance program. The damaging health effects from excessive RF exposures are well documented, but may not be apparent until long after the exposures occurred.

Over a period of time, wireless technology has migrated away from solely transmitting data and voice from antennas located on outdoor structures such as buildings, public right of ways, light standards, and the like. Today, much of the wireless traffic is generated within commercial and public structures from micro cells, Wi-Fi™ access points, wireless local area networks (WLANs), and other RF producing devices. Because of the many sources of RF radiation, a need exists to inform and protect individuals within these structures about and from RF radiation.

SUMMARY

Embodiments disclosed herein include systems and methods for providing access to radio transmission safety information relating to a radio transmission site while a person is at or near the radio transmission site.

In an embodiment, a method is disclosed that comprises using at least one hardware processor to: store a database, wherein the database comprises, for each of a plurality of sites, data representing relative locations of one or more transmitters that emit radio frequency (RF) radiation at the site, wherein the one or more transmitters comprise at least one 5G antenna; and, for at least one of the plurality of sites, calculate a power density caused by the one or more transmitters, including the at least one 5G antenna, for one or more areas of the at least one site, and generate a maximum permissible exposure (MPE) map of the at least one site, wherein the MPE map comprises a graphical representation of each of the one or more transmitters, including the at least one 5G antenna, and graphically distinguishes any area of the site for which the calculated power density exceeds at least one limit. The MPE map may comprise a graphical representation of a floor plan at the at least one site with any graphically distinguished areas superimposed on the floor plan. For each of the plurality of sites, each relative location of each of the one or more transmitters may be represented as an offset from a fixed reference point.

The MPE map may graphically distinguish a plurality of areas of the at least one site based on the at least one limit. The at least one limit may comprise an occupational limit and a general limit, and wherein the plurality of areas comprise a restricted area in which the calculated power density exceeds the occupational limit, and a controlled area in which the calculated power density is below the occupational limit but exceeds the general limit.

The method may further comprise using the at least one hardware processor to, for the at least one site, generate a site-specific RF safety summary comprising a site identifier for the at least one site, the MPE map, and one or more safety rules. The method may further comprise using the at least one hardware processor to transmit the site-specific RF safety summary to at least one user device over at least one network. The method may further comprise using the at least one hardware processor to transmit the site-specific RF safety summary to the at least one user device over the at least one network in response to a request from the at least one user device over the at least one network. The method may further comprise, for each of the plurality of sites, generating a machine-readable indicium that encodes an identifier of the site for placement at the site, wherein the request comprises the identifier of the site as decoded from the machine-readable indicium by a mobile application on the at least one user device. The machine-readable indicium may comprise a matrix barcode.

The method may further comprise using the at least one hardware to, for each of one or more of the plurality of sites: detect motion or human presence at the site based on an output of one or more sensors located at the site; in response to detecting the motion or human presence, automatically control the one or more transmitters, including the at least one 5G antenna, to modify one or more operating parameters of the one or more transmitters to reduce RF exposure.

The method may further comprise using the at least one hardware processor to, for the at least one site: receive a request to power down the at least one 5G antenna; and, in response to the request, initiate power down of the least one 5G antenna. Receiving the request to power down the 5G antenna may comprise receiving a selection of the graphical representation of the at least one 5G antenna from the MPE map.

The at least one 5G antenna may be a plurality of 5G antennas, wherein calculating the power density caused by the plurality of 5G antennas comprises using a model that calculates the contribution of each of the plurality of 5G antennas to the power density at a plurality of points in the MPE map.

The method may further comprise using the at least one hardware processor to, for the at least one site: receive an update to a configuration or a parameter of the at least one 5G antenna from a user device over at least one network; and, in response to the update, modify information stored for the at least one 5G antenna in the database and used to generate the MPE map of the at least one site, according to the update, and initiate a communication to prompt at least one user, who previously obtained a safety certification for the at least one site, to obtain a re-certification for the at least one site. The method may further comprise using the at least one hardware processor to track all safety certifications for the plurality of sites in compliance with one or more applicable RF safety regulations.

The method may further comprise using the at least one hardware processor to, for the at least one site: receive an update to a configuration or a parameter of the at least one 5G antenna from a user device over at least one network; and, in response to the update, modify information stored for the at least one 5G antenna in the database and used to generate the MPE map of the at least one site, according to the update, and record the modification in a modification history stored in the database.

In an embodiment, calculating the power density comprises calculating the power density using one or more equations, wherein the method further comprises using the at least one hardware processor to: receive an update to the one or more equations; and modify the one or more equations according to the update so that subsequent calculations of the power density caused by the one or more transmitters use the modified one or more equations.

The method may further comprise using the at least one hardware processor to: determine a location of a user; and restrict access to the MPE map for one or more of the plurality of sites based on the location of the user.

The methods above may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
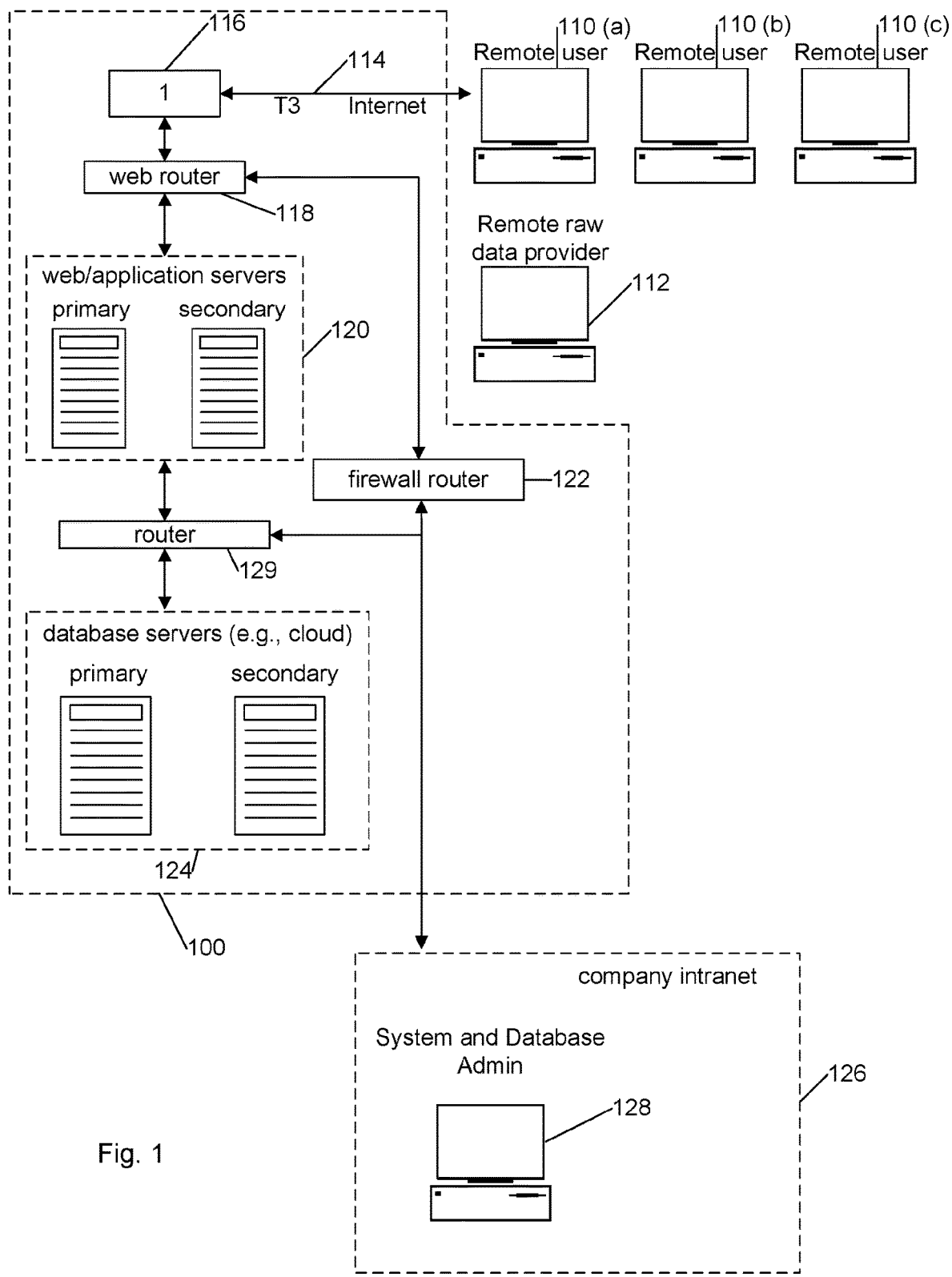
FIG. 1 is a high level block diagram illustrating an example network and the system, according to an embodiment.

Certain embodiments as disclosed herein provide for systems and methods for a wireless location monitoring and reporting system. In numerous embodiments, the system also provides for a 4G and/or 5G wireless location monitoring and reporting system. It should also be understood that the disclosed system may be applied to any future RF technology, including 6G networks, 7G networks, and/or the like.

5G networks (licensed and unlicensed) may employ the use of various technologies not utilized by existing 4G or Wi-Fi™ private networks. These technologies may include, for example, High-band spectrum, multiple-in and multiple-out (MIMO) and potentially Massive MIMO employing multiple transmit chains, and Antenna arrays and beamforming. 5G networks may be private or public and may be licensed or unlicensed. Systems and methods described herein may provide for certification of private network installations and associated antenna nodes to ensure that the networks are safe for all employees, workers and any members of the general public that would work or transit near these antennas. With the implementation of the systems and methods described herein and commitment by network owner(s) to abide by the conditions set forth thereby, embodiments of the system herein may be capable of insuring and indemnifying a 5G network owner (e.g., a private 5G network in some embodiments) against RF and/or electromagnetic exposure claims.

After reading this description it will become apparent to one skilled in the art how to implement the invention in various alternative embodiments and alternative applications. However, although an embodiment of the present invention will be described herein, it is understood that these embodiments are presented by way of example only, and not limitation. As such, this detailed description of various alternative embodiments should not be construed to limit the scope or breadth of the present invention as set forth in the appended claims.

Disclosed embodiments include a method for using an information storage and retrieval system and establishing a database structure enabling the storage of information, in a local and/or remote database server (e.g., providing cloud management systems and servers), concerning the locations and utilization characteristics of wireless RF transmitting antennas and the places with existing antennas, referred to as "sites." These sites may include wireless transmitters, such as cellular antennas (e.g., such as but not limited to antennas and/or antenna arrays configured as single user multiple-in and multiple-out (SU-MIMO), antennas arrays for multiple-in and multiple-out (MIMO), antenna arrays for massive MIMO, and utilization of beamforming algorithms), in-door distributed antenna systems (inDAS), individual signal boosters, and WLAN networks such as Wi-Fi™ (collectively referred to as "transmitters"). In an embodiment, one or more of the transmitters may be configured to utilize various frequency bands. For example, in the case of 5G, these frequency bands may include a low frequency band (e.g., sub 1 GHz), mid frequency band (e.g., 1-6 GHz), and high frequency band (e.g., above 6 GHz). Some of these transmitters may be located within structures (e.g., a building), such as in the case of inDAS, individual signal boosters, and WLAN networks. All transmitters can transmit wireless signals through the air. WLAN and inDAS systems may be composed of multiple antennas and may act as a single antenna system. The system and methods may provide site-specific safety information and tools for protecting workers from RFR hazards and provide auditing in order to document compliance with applicable regulations.

Electronic access to the information database can be made available over the Internet to the system's subscribers, referred to herein as "users." Additionally, Maximum Permissible Exposure (MPE) maps and the data necessary to create the spatial representations of the site configuration may be created using the information database. The systems and methods described herein can provide greater worker safety, eliminate the disproportional amount of liability currently shouldered by wireless telecommunication companies, and reduce RF exposure and/or electromagnetic exposure to persons involved in site management.

Additionally, workers, first responders, and users of the system can be provided with a simplified process for accessing information for a site, for example, via machine-readable indicium or indicia, identifying the site, which can be read by a user device (e.g., cellular telephone). The machine-readable indicium can be, for example, a matrix barcode, such as a quick response (QR) code. The machine-readable indicium is preferably located at the site, for example, on a sign warning of the RF radiation hazard.

FIG. 1 is a high level block diagram of an example network including the system 100, according to an embodiment. The system 100 can communicate with users via an external network 114, such as the Internet. Reference to a user or users herein refer to individuals interacting with the system 100 (and other embodiments described herein) via a computer interface. The computer interface can be implemented directly within the system 100, or via another computer or device which communicates with the system 100. As an example, the remote user devices 110a-c and a remote raw data provider device 112 are shown. Remote user devices 110 include traditional computers, mobile computers, mobile telephones, smart phones, and/or other mobile or fixed computing devices which can provide a user interface (e.g., a display and input mechanism) and access to the system 100 via a network 114, such as the Internet. The system 100 may also include or communicate with a system and database administration module 128, within the company intranet 126, which can interact with the system 100 directly. When communication traffic first enters the system 100 it passes through a data switch unit (DSU) 116. The traffic from the DSU is passed to a web router 118. From the web router the traffic flows to the web application servers 120. The web application servers 120 may provide user interfaces (e.g., graphical user interfaces to remote user devices 110). In an embodiment, the web application servers 120 include a primary load balanced application server and a back-up secondary server. The web application servers 120 may communicate through a router 129 and/or a firewall router 122 with database servers 124.

Figure 2:
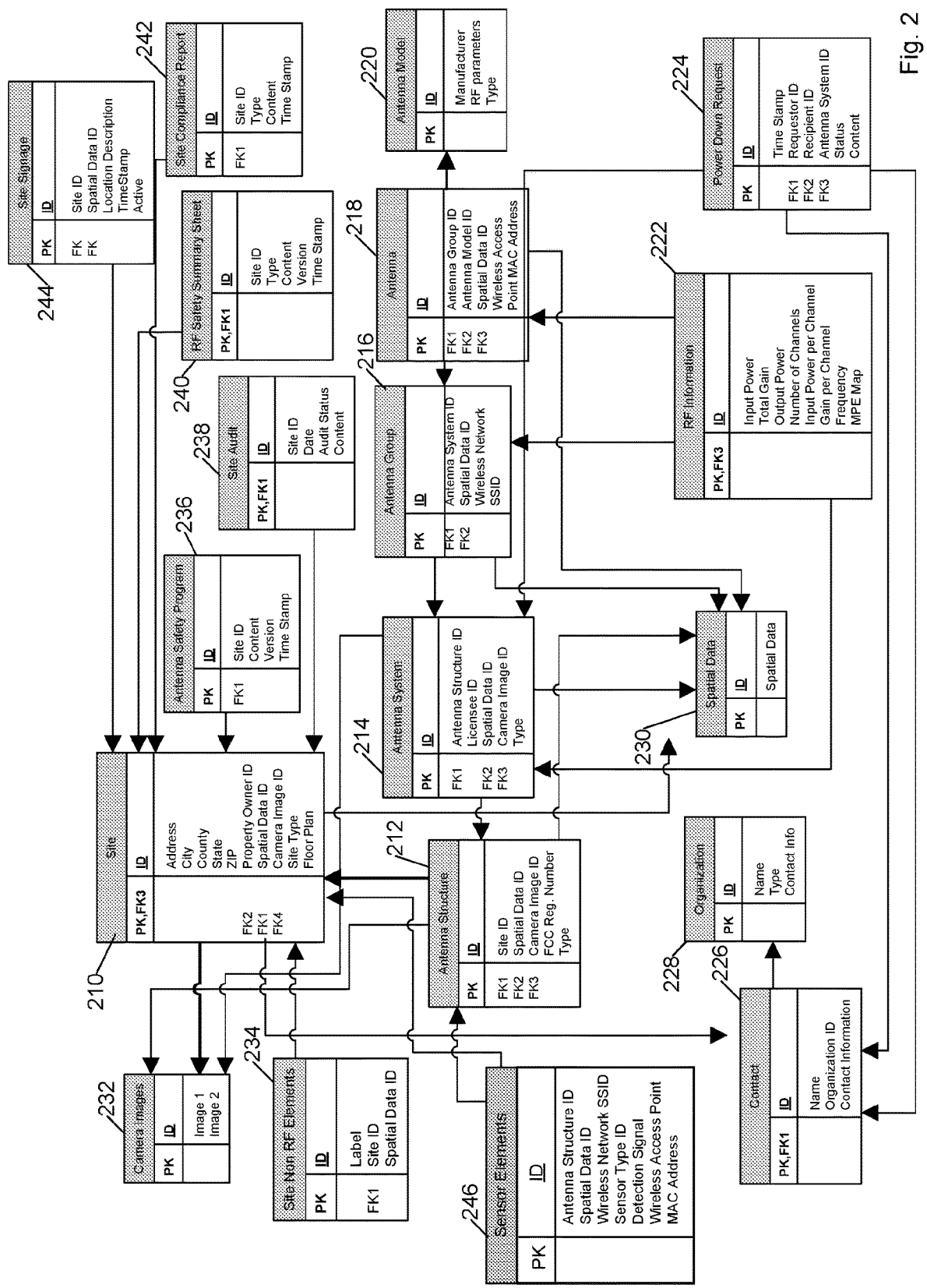
FIG. 2 is a database diagram or schema illustrating an example of a site's attributes, according to an embodiment.

FIG. 2 is a database diagram or schema illustrating an example of an RF site database of a site's attributes, according to an embodiment. The database can be implemented on the database servers 124 (e.g., illustrated in FIG. 1). In an embodiment, this technology is built on the Microsoft™ N-tier Distributed Network Architecture (DNA), which separates the database, data access, business logic, and presentation layers, to provide security, scalability, and performance for high volume database applications. The database may include multiple tables which each have resident information. In the embodiment depicted in FIG. 2, a subset of the database data is presented to illustrate the key elements of the system. In an embodiment, database servers 124 may be implemented as cloud storage, in which the data is stored in logical pools that may span multiple database servers 124 that are owned and managed by a third-party hosting company. In this case, portions of the data may reside on the same servers as data owned by other customers of the third-party hosting company, but the logical pools of each customer are logically distinct from the logical pools of other customers and inaccessible to the other customers.

Site table 210 may have the following attributes: ID which is a unique identifier for the site; site's address, including street Address, City, County, State and ZIP code; Property Owner ID which is associated with the Contact table 226 and identifies a site's property owner; Spatial Data ID which is associated with the Spatial Data table 230 and identifies spatial data of the site, which will be further explained in connection with FIGS. 10 and 11; Camera Image ID which is associated with Camera Image table 232 and identifies camera images used by module 435 (e.g., illustrated in FIG. 5), which will be explained later; and Site Type which identifies the type of site, such as a commercial office building, hospital, medical center, higher education institute, hotel, convention center, park, sporting venue, airport, subway building, or dwelling.

In an embodiment, Site table 210 also includes the attribute Floor Plan. Floor Plan includes a site's physical layout, such as interior and exterior walls. The Floor Plan can also include a cross sectional view of a building such as the site plot map or floor plan of the building depicted in FIG. 3. In the example of a multi-floor building, Floor Plan may include the geometric boundaries of the entire building and each floor of the building, such as the length, width, and height. Floor Plan can include the length, width, and height within a three-dimensional (3-D) environment. Floor Plan may also associate with Antenna System 214, and relate the geometrical relationship between transmitters within a floor or outside the building in reference to the floor plan. Floor plan will be discussed in further detail in association with FIG. 3.

Antenna Structure table 212 may have the following attributes: unique ID; Site ID which is associated with the Site table 210 and identifies the site to which the represented antenna structure was assigned; Spatial Data ID which is associated with the Spatial Data table 230 and identifies spatial data of the antenna structure, which will be explained in connection with FIGS. 10 and 11; Camera Image ID which is associated with Camera Image table 232 and identifies camera images used by module 435 of FIG. 5, which will be explained later; FCC Reg. Number, which is an unique number assigned to antenna structure by the Federal Communications Commission (FCC), or other antenna structure identifier; and Type which identifies antenna structure types such as electric pole or tower.

Antenna System table 214 may have the following attributes: unique ID; Antenna Structure ID which is associated with the Antenna Structure table 212 and identifies the Antenna Structure to which the represented Antenna System was assigned; Licensee ID which is associated with the Contact table 226 and identifies the licensee (e.g., Verizon Wireless™, AT&T™, etc.); Spatial Data ID which is associated with the Spatial Data table 230 and identifies spatial data of the represented Antenna System, which will be explained in connection with FIGS. 13 and 14; Camera Image ID which is associated with Camera Image table 232 and identifies camera images used by module 435 of FIG. 5; and Type which identifies the antenna system type such as array of panel antennas, a single antenna, a macrocell, a microcell, an inDAS, an outdoor distributed antenna system, an individual signal booster, a Wi-Fi hot spot, SU-MIMO, antenna arrays for MIMO and massive MIMO, or any other type of transmitter. In some embodiments, one or more antenna may also be configured to utilize beamforming algorithms and solutions.

Antenna Group table 216 is used to join individual antennas into a group for the purpose of assigning RF Information. Antenna Group table 216 may have the following attributes: unique ID, Antenna System ID which is associated with the Antenna System table 214 and identifies the Antenna System to which the antenna group was assigned; Spatial Data ID which is associated with the Spatial Data table 230 and identifies spatial data of the antenna group, which will explained in connection with FIGS. 12 and 13; and Wireless Network service set identifier (SSID) or network name which provides the unique identifier of a wireless network and identifies wireless network type such as Wi-Fi™, cellular (e.g., 4G LTE, 5G NR, etc.), and/or the like. Wireless Network SSID may be associated with Site table 210, which identifies the building to which the Wireless Network SSID is assigned.

Antenna table 218 may have the following attributes: unique ID; Antenna Group ID which can be associated with the Antenna Group table 216, Antenna Model ID which is associated with the Antenna Model table 220 and identifies the antenna model; Spatial Data ID which is associated with the Spatial Data table 230 and identifies spatial data of the antenna; Wireless Access Point Media Access Control (MAC) address which identifies the unique identifier of a network interface device. The Wireless Access Point MAC address may be associated with RF Information table 222, which identifies the RF radiation specifications of a wireless access point device. Antenna table 218 may also have a Technology Field attribute which indicates the technology utilized by the represented antenna (e.g., 3G, 4G, 5G, 6G, etc.).

Figure 5:
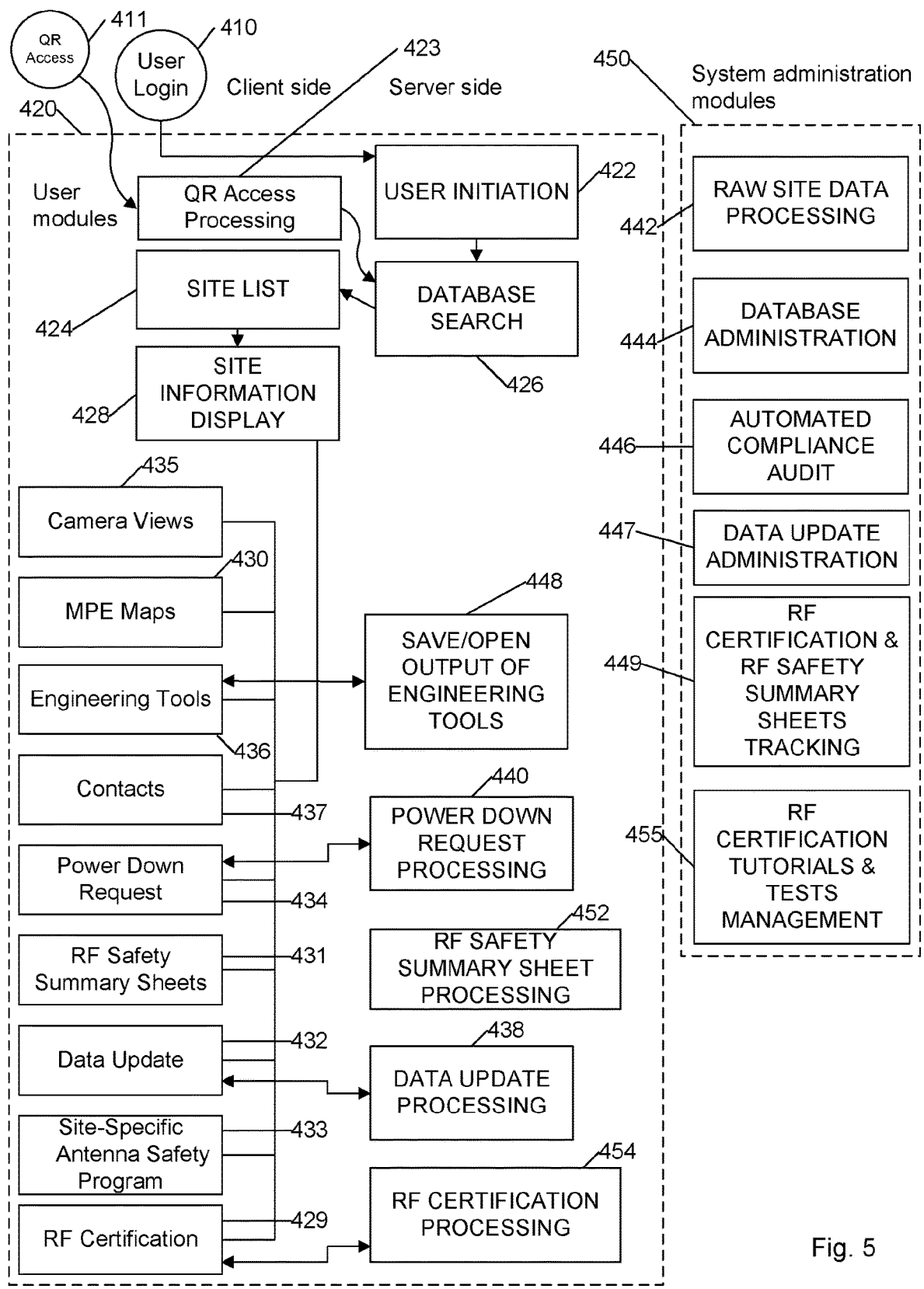
FIG. 5 is a functional block diagram illustrating the functions or modules of an embodiment of the system, according to an embodiment.

RF Information table 222 may store the information used to calculate power density levels used for creating MPE maps by module 430 of FIG. 5 and for the Engineering tools functionalities of module 436 of FIG. 5. Table 222 may have the following attributes: Input Power; Total Gain; Output Power; Number of Channels; Gain per Channel; Frequency; and MPE Map. RF Information table 222 may also store RF and/or electromagnetic exposure information. Electromagnetic exposure information may include electromagnetic field characteristics. RF Information table 222 may also have a Technology Field attribute which indicates the applicable technology (e.g., 3G, 4G, 5G, 6G, etc.).

Power Down Request table 224 may be used to store information related to the functionality of the module 434 of FIG. 5, which will be explained in connection with FIG. 7. Table 224 may have the following attributes: unique ID; Time Stamp which includes exact time and date in which power down was requested; Requestor ID which is associated with the Contact table 226 and identifies the person that requested the power down; Recipient ID which is associated with the Contact table 226 and identifies the recipient of the power down request; Antenna System ID which is associated with the Antenna System table 214 and identifies the antenna system which needs to be powered down; Status which indicates a current status of the power down request such as placed, received, or replied; and Content which includes detailed information about the power down request.

Site Non RF Elements table 234 may identify the non-RF elements of the site, such as equipment rooms, hatches, or fences. Table 234 may have the following attributes: unique ID; Label which is displayed on various graphic representations of the site; Site ID which is associated with the Site table 210 and identifies the site to which the represented element was assigned; and Spatial Data ID which is associated with the Spatial Data table 230 and identifies spatial data of the non-RF element, which will explained in connection with FIGS. 10, 11, 12 and 13.

Antenna Safety Program table 236 may store site-specific antenna safety programs associated with the site and is related to module 433 of FIG. 5. Table may have the following attributes: unique ID, Site ID which is associated with the Site table 210 and identifies the site to which the represented antenna safety program was assigned; Version number which is used to identify various versions of the antenna safety program associated with the same site and explained in connection with FIG. 19; and Time Stamp which indicates the data and time when the version of antenna safety program was created.

Site Audit table 238 may store the information related to site-specific RF compliance audits. Table 238 may have the following attributes: unique ID; Site ID which is associated with the table Site 210 and identifies the site to which the represented site audit was assigned; Date which identifies the actual date of the audit; Audit Status which identifies a compliance status of the site, such as in compliance or not in compliance; and Content which includes detailed information related to the represented site audit.

RF Safety Summary Sheet (site-specific) table 240 may store RF safety summary sheets provided by system to workers, and is related to the functionality of the module 431 of FIG. 5, which will be explained in connection with FIG.14. Table 240 may have the following attributes: unique ID, Site ID which is associated with the Site table 210 and identifies the site to which the represented RF safety summary sheet was assigned; Type which indicates the type of the represented RF safety summary sheet, such as trained worker or general worker; Content attributes which include a content of the sheet such as camera images, MPE maps, or site contact information; Version which stores the identifier of the version of the represented RF summary safety sheet for future reference; and Time Stamp which stores the date and time when the represented RF safety summary sheet was created.

Site Compliance Report table 242 may include the information related to the functionality of module 446 of FIG. 5, which will be explained in connection to FIGS. 20 and 21. Table 242 may have the following attributes: unique ID; Site ID which is associated with the Site table 210 and identifies the site to which the represented compliance audit was assigned; Type of the represented compliance audit, such as monthly or annual; Content which describes details of the compliance status of the site; and Time Stamp which stores the date and time when the compliance report sheet was created.

Site Signage table 244 may store information related to the warning signs associated with the site and is related to the QR access processing module 423 of FIG. 5. Table 244 may have the following attributes: unique ID, Site ID which is associated with the Site table 210 and identifies the site to which the represented sign was assigned; Spatial Data ID which is associated with the Spatial Data table 230 and identifies the exact position of the sign relative to a site; Location Description which is a description of the sign location and mounting; Time Stamp which indicates the date and time when the sign was placed on site; and Active indication which indicates if the sign is currently active/placed on the site.

Sensor Elements table 246 may be used to join individual sensors into an antenna group for the purpose of assigning detection events. Sensor Elements table 246 may have the following attributes: Antenna Structure ID which is associated with the Antenna Structure table 212 and identifies the Antenna Structure to which the represented sensor element was assigned; Spatial Data ID which is associated with the Spatial Data table 230 and identifies spatial data of the represented sensor element; and Wireless Network SSID or network name which identifies the unique identifier of a wireless network and identifies wireless network type such as Wi-Fi™, cellular (e.g., 4G LTE, 5G NR, etc.), and/or the like; Wireless Network SSID which is associated with Site table 210, which identifies the building to which the Wireless Network SSID is assigned; Wireless Access Point MAC address which identifies the unique identifier of a network interface device; Sensor Type ID which identifies the sensor type; and Detection Signal which provides the signal of a detected event based on the sensor type.

Figure 3:
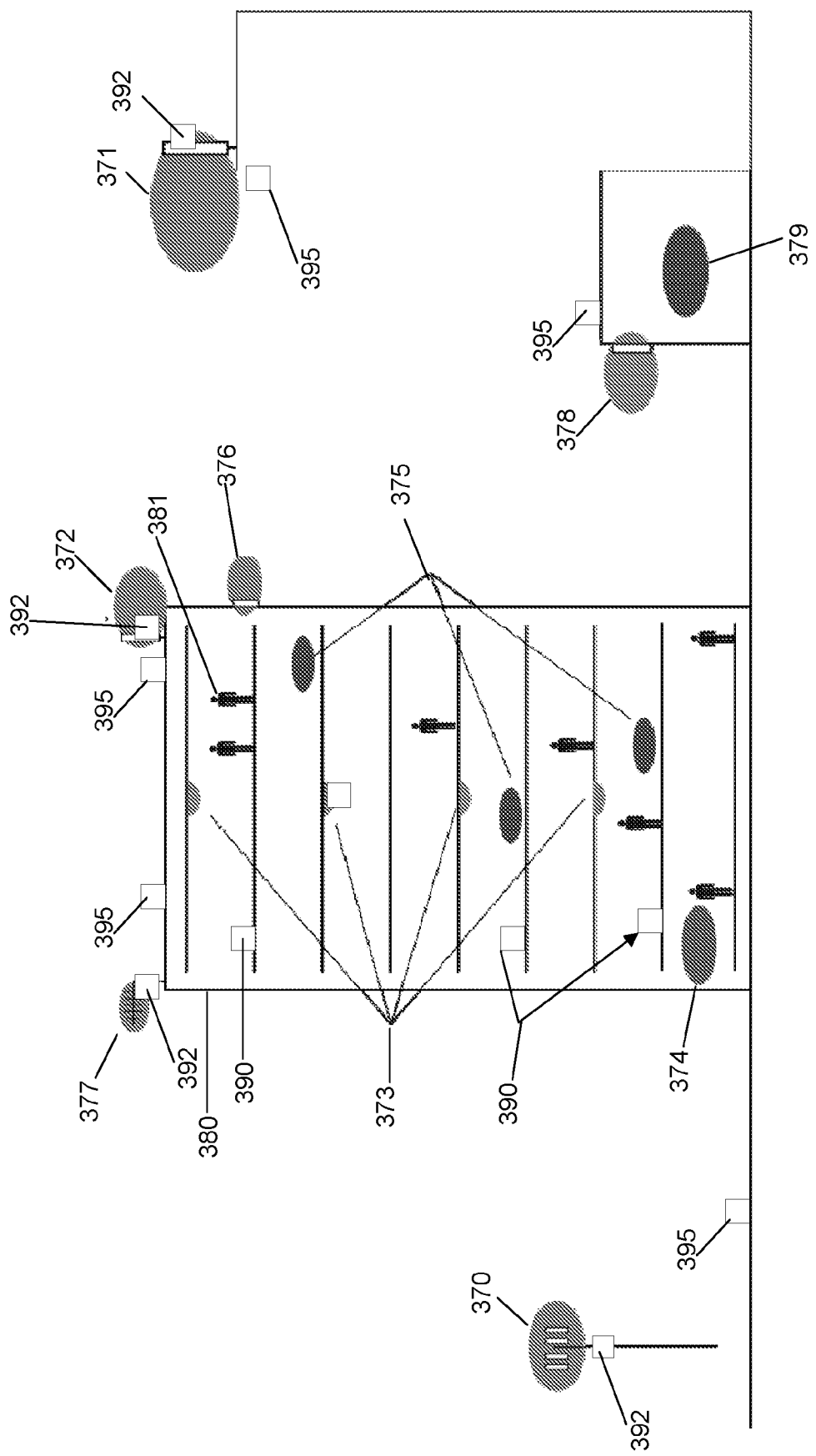
FIG. 3 is an example of a site plot map of a building illustrating a graphic representation of multiple sources of RF radiation, according to an embodiment.

FIG. 3 is an example of a cross sectional or side view site plot map of a building 380 and surrounding structures, illustrating a graphic representation of multiple sources of RF radiation, according to an embodiment. Building 380 may be a structure such as a commercial office building, hospital, medical center, higher education institute, hotel, convention center, park, sporting venue, airport, subway building, and/or the like. In some instances, building 380 is a dwelling. The floor plan may be provided by a public entity such as a city administration, by a private entity such as a building owner, or created during a site survey. In an embodiment, floor plans are provided in a uniform format. A person within building 380, such as person 381, may be subject to multiple sources of RF radiation. RF radiation may be transmitted by outdoor transmitters (outdoor relative to building 380) such as a rooftop antenna 371, a rooftop antenna 372, a facade antenna 376, a donor DAS antenna 377, a pico cell 378, a public Wi-Fi™ hot spot 379, and/or cell tower 370. In addition, RF radiation may be transmitted by an indoor transmitter such as an inDAS 373, a cell signal booster 374, and/or floor Wi-Fi™ hot spot 375. In an embodiment, one or more of the outdoor and/or indoor transmitters may comprise a cellular antenna, for example but not limited to, antennas and/or antenna arrays configured as single user multiple-in and multiple-out (SU-MIMO), antennas arrays for multiple-in and multiple-out (MIMO), antenna arrays for massive MIMO, and utilization of beam-forming algorithms. In an embodiment, the cellular antennas may be configured to utilize cellular networks, such as 4G LTE and/or 5G NR wireless networks.

inDAS 373 may be an indoor distributed antenna system of spatially separated nodes connected to a common source such as rooftop antenna 371, rooftop antenna 372, or cell tower 370. Donor DAS 377 may be an outdoor distributed antenna system of spatially separated nodes connected to a common source such as rooftop antenna 371, rooftop antenna 372, or cell tower 370. Both inDAS 373 and donor DAS 377 may split the transmitted power from an antenna such as rooftop antenna 372 among several antenna elements so as to provide coverage over an area, but with reduced total power and improved reliability. Thus, both inDAS 373 and donor DAS 377 may be used to increase wireless signal within building 380. In an embodiment, inDAS 373 and/or donor DAS 377 may be configured to utilize one or more of a low frequency band, mid frequency band, or high frequency band (e.g., millimeter wavelength band) for communications via 5G wireless networks.

FIG. 3 also illustrates a plurality of sensors communicably connected to the transmitters. Sensor Elements table 246 of FIG. 2 may include sensor data of each sensor illustrated in FIG. 3. The sensors may include indoor sensors 390 connected to indoor transmitters. Alternatively or additionally, the sensors may include outdoor sensors 395 and 392 connected to outdoor transmitters. Each sensor may be associated with a connected transmitter, and in some embodiments may be associated with one or more transmitters. In an embodiment, a sensor (e.g., 392) may be attached to a corresponding transmitter. In an embodiment, the sensors may also include cameras used to capture and supply camera images to Camera Image table 232. The sensors may be connected via wired and/or wireless connections. In an embodiment, the sensors may make up a network of sensors configured to monitor an area around a transmitter and/or site. For example, a cellular network (e.g., 4G, 5G), a Wi-Fi™ network, and/or the like, may host a network of Internet-of-things (IoT) sensors that may be configured to provide different types of information for detecting various environmental events in the area surrounding corresponding transmitters. For example, sensors may be used for monitoring security, confirming attendance by a first responder or other certified personnel, surveillance, environmental properties (e.g., atmosphere, temperature, etc.), and/or the like. The network of sensors may be hosted by a small cell 5G network (e.g., an edge network). The small cell may be a private cellular network that controls the sensors and communicates detection signals to the database server 124.

As an example, a sensor may be a motion sensor that detects movement in the area surrounding the transmitter. When movement is detected, the system 100 may utilize camera images to identify the source of the movement. Based on the source of the movement, the system 100 may modify the operation of the transmitter to ensure compliance with RF exposure regulations. For example, operating characteristics may be adjusted if a person triggered the sensor, thereby reducing the exposure to within regulations. Other sensors may be employed, including, for example, pressure sensors, infrared sensor, sensors installed along a fence that detect breakage in the fence, and/or the like. Other sensors may include temperature sensors, thermal sensors, camera surveillance systems, and/or the like.

As another example, a sensor system may comprise a combination of sensors, including, for example, one or more cameras. System 100 could host artificial intelligence (e.g., one or more machine-learning models), or an augmented reality system, that processes images from the camera(s) to detect and/or confirm the presence of a human within the vicinity of one or more transmitting antennas, as well as determine the distance between the human and the transmitting antenna(s). While the human presence is detected, the system 100 may continually modify the operation of the transmitting antenna(s), based on the calculated power density experienced by a human at the position of the human and/or at the determined distance between the human and the transmitting antenna(s), in real time, as that position and/or distance changes over time, to ensure real-time compliance with RF exposure regulations as the human moves around within the vicinity of the transmitting antenna(s).

In an embodiment, sensors may be utilized by the system for monitoring access to antenna locations. The sensors may trigger an automated modification of the transmitter characteristics to ensure compliance with current and any future updates of RF exposure regulations. For example, the transmitter power to one or more antennas may be reduced or completely shut off by the system 100, in response to sensing motion towards the antenna(s) (e.g., indicative of a person getting closer to the antenna(s)), to ensure that maximum exposure limits are not exceeded (e.g., for as long as motion is sensed near the antenna(s)).

In an embodiment, the system 100 may use individual sensors or a combination of multiple sensors, connected to transmitters, to provide information about security, attendance, status of transmitters and their associated antenna locations, and/or the like. Furthermore, the system 100 my utilize sensors, operating parameters, use cases, and/or artificial intelligence (AI) systems to trigger automated modification of transmitter characteristics to ensure compliance with current and any future updates of RF exposure regulations. For example, scenarios triggering the sensors and subsequent modification of transmitter characteristics may be stored in database 124, and aggregated with previously collected and/or recorded data that the system 100 may analyze to determine whether an automated modification is necessary. The modification of the transmitter characteristics may be based on common attributes that caused a previous modification of characteristics, and/or the modification may be adjusted for improved compliance with the RF regulations.

Accordingly, the systems and methods described herein may be configured to leverage the proliferation of 5G small cells (outdoor) to host a network of IoT sensors that could provide many different types of information (security, attendance, status, environmental, surveillance, etc.). To do this may require a two-step process: (1) establish in the database 124 a list of all 4G/5G sites/antenna locations and their site-specific safety information (e.g., primarily RF safety, but could also include tower safety info for towers, etc.); and (2) make this information available to users. Over time, the safety system may evolve by installing sensors at each antenna location to monitor access and modify the antenna operation when necessary to automate the process of ensuring compliance with RF exposure regulations. Once in place, these sensors may be expanded to serve other business functions. Similar to smart buildings, this network of sensors at every outdoor wireless location could enable all sorts of smart infrastructure, smart cities, smart transportation, and/or the like.

Floor Plan of Site table 210 of FIG. 2 may include geometric data of building 380, such as the length, width, and height of each floor, as well as the entire building, and the locations of interior walls. Floor Plan can include the location of certain areas of each floor of a building, such as offices, cubicles, conference rooms, cafeterias, and storage rooms. Floor Plan can include the location of entrances and exits of each floor of a building, such as main entrance doors, side entrance doors, fire escape, and emergency exits. In addition, Floor Plan may identify certain boundaries of building 380, such as a North wall, a South wall, a West wall, an East wall, a building base, and a building ceiling. Furthermore, Floor Plan may identify boundaries of each floor, such as a floor base and a floor ceiling. Each boundary can be defined relative to defined X-Y-Z coordinate.

Spatial Data ID of Antenna System table 214 of FIG. 2 may include spatial data of each transmitter emitting radiation to building 380. Spatial data of each transmitter may be identified by Global Positioning System (GPS) coordinates. Floor Plan and Spatial Data ID may reference one another to generate a coordinate system where each transmitter has a relative position to a reference point of building 380. For instance, the Southwest corner may be defined as the origin or reference point for the X, Y, and Z coordinates, and the location of each transmitter may be defined by an X-offset, Y-offset, and/or Z-offset from the Southwest corner. Transmitters that are offset in the Z direction from the reference point can be identified by the floor on which the transmitter is located due to the floor height data captured in Floor Plan. Outdoor transmitters, such as rooftop antenna 371, may also have offset coordinates from a reference point (e.g., the same or different reference point as indoor transmitters).

In certain situations, a first responder may need to know the physical location of a transmitter within a building. For example, the first responder, or a first responder dispatch center, may request from the system 100, the presence and/or location of a transmitter within the building. In some instances, the first responder or dispatch center may have access to the database of the system 100 and can check the database for transmitters within the building. In other instances, a system administrator may check the database and relay the physical locations of the transmitters back to the first responder or dispatch center. In an embodiment, the system 100 or system administrator can provide coordinates of the transmitter within an accuracy of 140 feet or less.

In an embodiment, the system 100 provides the first responder or the dispatch center access to a floor plan of a building that contains the physical locations of all transmitters within that building. The floor plan may also include the physical locations of any antennas located outside of the building. In certain embodiments, the first responder or the dispatch center may retrieve the floor plan of the building from the database 124 via the Internet.

A first responder, such as a policeman, may access the floor plan during an emergency situation such as a terrorist attack, a hostage situation, a fire, or an earthquake. The floor plan may allow the policeman to identify the location of office cubicles, offices, conference rooms, cafeterias, storage rooms, and other locations in the building where office workers may be located. In addition, the floor plan may allow the policeman to identify the location of emergency exits.

A database of exact locations of all site transmitters, including unique identifications of cell antennas and/or the WLAN's SSID and/or MAC address, in conjunction with the database of buildings floorplans can be used for an indoor positioning system. In an embodiment, the indoor positioning system utilizes spatial data information from the 3-D X-Y-Z coordinate system disclosed above. Actual positions of each transmitter can be determined by using one or more techniques such as triangulation or multilateration. Triangulation can be used to determine a transmitter's actual position by knowing the range of a single transmitter and its relative location to other transmitters. In addition, in an embodiment, the indoor positioning system references Floor Plan of Site table 210 to determine the 2-D location of each transmitter relative to a floor of a building or site. Other indoor positioning methods that do not rely on positions and characteristics of RF transmitters may also be used as a part of a hybrid positioning solution or as a sole method of indoor positioning.

In certain situations, a first responder may not know the physical location of a transmitter within a building. Thus, sensors or a network of sensors may be utilized to monitor areas surrounding one or more transmitters, detect the presence of the first responder, and issue a detection signal to the system 100, which acts as a central database. The system 100 may recognize the detection signal, process the signal, and determine to modify the operation of the transmitter to ensure compliance with RF regulations. The system 100 may also be configured to determine the modifications to be made, for example, based on a determined MPE map and/or power density calculations of the detected area, and modify one or more transmitter characteristics to ensure compliance. In an embodiment, the system 100 may issue a warning or other indication to a user to cause the modification. In an embodiment, the system may utilize operating parameters, use cases, and/or AI to determine to modify and the necessary modifications to ensure compliance.

Figure 4:
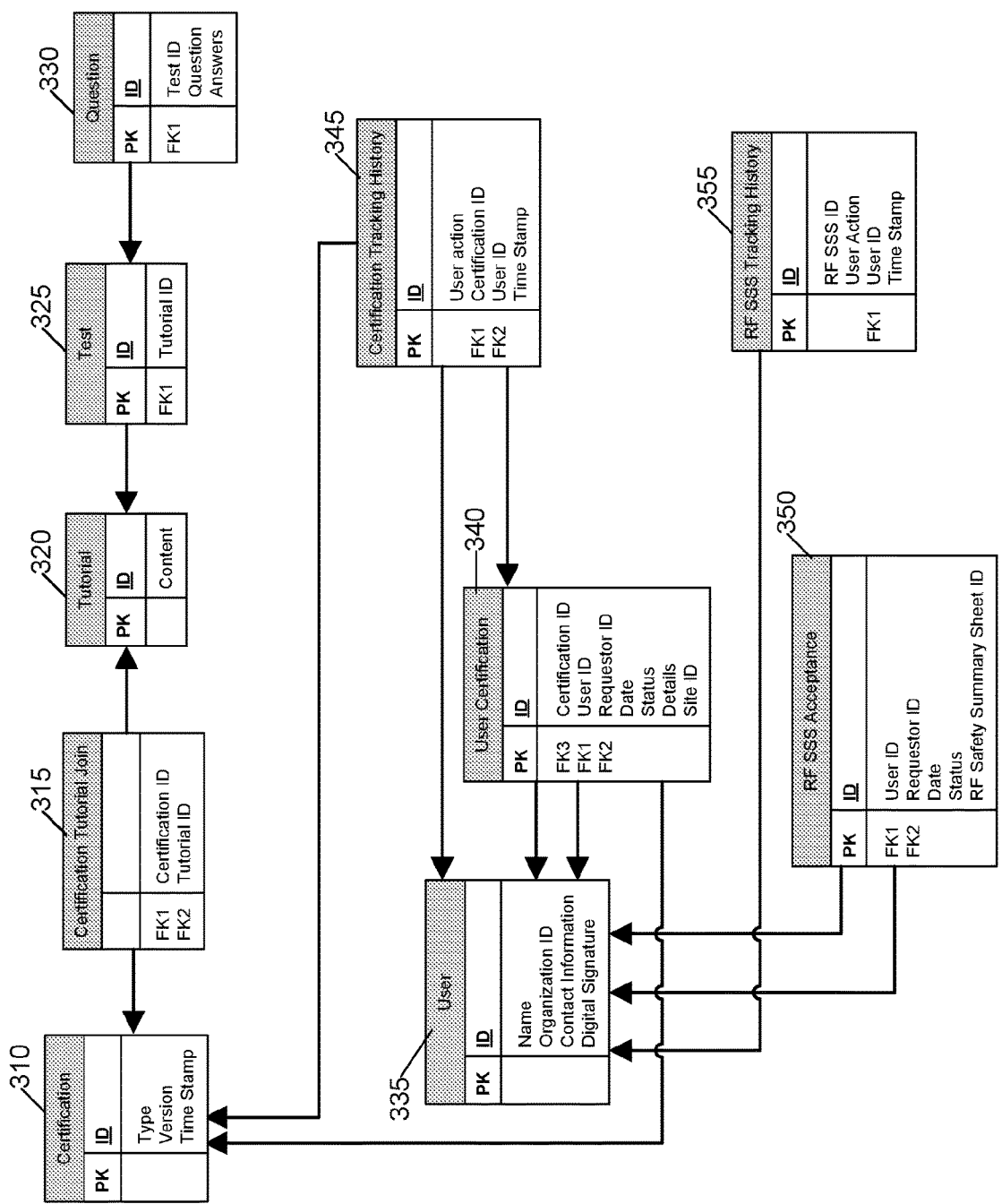
FIG. 4 is a database diagram or schema illustrating the RF Certification and RF Safety Summary Sheet attributes, according to an embodiment.

FIG. 4 is a database diagram or schema illustrating the attributes related to RF Certification and (site-specific) RF safety summary sheets, according to an embodiment. The depicted tables can be implemented on the database server 124 of FIG. 1. The schema includes tables and data related to functionalities of modules 431 and 429 of FIG. 4. Additionally, the tables can include data described later in connection with FIGS. 22-26.

Certification table 310 may include various versions of the RF Certification and be used for a new user who requires RF certification, a worker, or a contractor company. Table 310 may have the following attributes: unique ID; Type which indicates certification type, such as Property Owner Representative RF certification or Trained Worker RF certification; Version which indicates a version of the certification and is used for future reference; and Time Stamp which is a date and time when the certification was created.

Tutorial table 320 may include various tutorials that can be assigned to multiple certifications. Table 320 may have the following attributes: unique ID; and Content which stores actual content of the certification tutorial. Multiple tutorials can be associated with the multiple certification using Certification Tutorial Join table 315. Each tutorial of the certification may be followed by an appropriate test which includes various questions. Question table 330 may have the following attributes: unique ID; test questions; and the possible answers with indication of the correct answer. Question table 330 is associated with the Test table 325, which is associated with the Tutorial table 320.

User Certification table 340 may store a history of certifications taken by users of system 100. Table 340 may have the following attributes: unique ID; Certification ID which is associated with the Certification table 310 and identifies the represented certification; User ID which is associated with the User table 335 and identifies the user who took the represented certification; Requestor ID which is associated with the Users table 335 and identifies the requestor of the represented certification; Date which indicates the date when the represented certification was taken; Status which indicates the status of the represented certification, such as completed or uncompleted; Details which includes certification test results; and Site ID which is associated with the Site table 210 of FIG. 2 and indicates the site, if the represented certification was site-specific.

Certification Tracking History table 345 may be used to provide a detailed view of the steps taken by a user during a certification, including user's answers to the test questions and tracking of the time that the user spent on various sections of the certification. Table 345 may comprise the following attributes: unique ID; User Action that stores each step the user takes during the tracked certification; Certification ID which is associated with the Certification table 310 and identifies the tracked certification; User ID which is associated with the User table 335 and identifies the user; and Time Stamp which indicates the exact date and time per user action.

RF SSS Acceptance table 350 may be used to track users' acceptances of the site-specific RF safety summary sheets. Table 350 may have the following attributes: unique ID; User ID which is associated with the User table 335 and identifies the user who accepted the RF safety summary sheet; Requestor ID which is associated with User table 335 and identifies the user who requested acceptance of the RF safety summary sheet; Date which indicates the day when the RF safety summary sheet was acknowledged; Status which indicates the status of the request, such as requested or acknowledged; and RF Safety Summary Sheet ID which is associated with the RF Safety Summary Sheet table 240 of FIG. 2 and indicates the RF safety summary sheet.

RF SSS Tracking History table 355 may be used for tracking the users' actions related to acceptance of RF safety summary sheets. Table 355 may have the following attributes: unique ID; User action that stores each step a user has taken during the acceptance of the RF safety summary sheet; RF SSS ID which is associated with the RF Safety Summary Sheet table 240 of FIG. 2 and identifies the accepted RF safety summary sheet; User ID which is associated with the User table 335 and identifies the user; and Time Stamp which indicates the exact date and time per user action.

FIG. 5 is a functional block diagram illustrating the functions or modules of the system 100 of FIG. 1, according to an embodiment. The system 100 may include user modules 420 and system administration modules 450. The user modules 420 provide the operational functionality of the system, and the system administration modules 450 provide the administration functionality. The user modules 420 may be divided into client-side modules and server-side modules. The client-side modules generally provide the interface functionality for user interactions. In an embodiment, the client side modules run on a remote user device 110 and provide a graphic interface to users. The Server-side modules run on the server side on the web/application server 120, interact with database servers 124, and send output to the client-side modules.

The server-side modules may include a user initiation module 422, a database search module 426, a power down request processing module 440, a save/open output of engineering tools module 448, data update processing module 438, RF safety summary sheet processing module 452, and RF certification processing module 454. The client-side modules may include a site search module 424, a site information display module 428 (sometimes referred to as a building information display module), a camera view module 435, an MPE maps module 430, an engineering tools module 436, a contacts module 437, a power down request module 434, an RF Summary Sheets module 431, a data update module 432, a site-specific safety program module 433 (sometimes referred to as building specific safety program module), and an RF certification module 429.

The user initiation module 422 may implement the user logon function 410, including determining whether or not the user has authorization to use the system and determining what rights the particular user has. This can include providing an initial landing page (e.g., a web page) that can be accessed as an initial entry point for accessing other modules of the system 100.

The QR accessing module 423 (or a machine-readable indicia accessing module) implements the QR access process which, in an embodiment, is initiated by, for example, a module residing and operating on a remote user device 110. This process can provide a simplified access process to a site which is identified by machine-readable indicia to be read by the remote user device 110 (e.g., a cellular telephone). This process is described in more detail in connection with FIG. 7.

Database Search module 426 searches the database of the sites based on the user's role in the system and is explained in connection with FIG. 6. The database search module 426 may reside on web/application servers 120 and interact with the database servers 124 of FIG. 1. The database search module 426 searches the database using the various search criteria, and provides the results to the site list module 424. Site list module 424 provides the user with the list of the sites that the user is authorized to view.

The site information display module 428 (or building information display module) may provide the user with information about a specific site. In an embodiment, the site information display module 428 shows the user a floor plan of a floor of a building of a specific site. In an embodiment, the site information display module 428 shows the user the site top preview, the geographic map preview, the site panoramic view, and/or a slideshow of the site's camera views and site information. The site top preview is generated from data in the database. In an embodiment, the system 100 creates a site top and side preview map and shows site plot map, which comprises a graphic representation of all site elements within the MPE maps. The geographic map preview can be generated using web services or stored images and displays sites on a geographic map. The module 428 allows the user to click on a zoom button or the image itself, and a zoomed map view is displayed with a dot that represents the site location. In an embodiment, in order to generate the site panoramic view or slideshow of the site's camera views, the camera module 435 loads an external panoramic image of the site to a system component allowing a simulation of the panoramic view and zoom, or slideshow of the site's camera views. For the site information, the module 428 may display site information which includes the items set forth in the Site table 210 of FIG. 2. The module 428 can vary the site information presented based on the type of user or rights of a user as set forth in the system user database. In an embodiment, the system 100 creates a floorplan view with graphic representations of all transmitters and corresponding MPE maps.

From the site information display module 428, the user can choose to use the functions of the camera view module 435, the MPE map display module 430, the data update module 432, the power down request module 434, the engineering tools module 436, the contacts module 437, the RF Safety Summary Sheets module 431, and the site-specific antenna safety program module 433. A user can also utilize the RF certification module 429. However, in an embodiment, module 429 can also be entered or accessed directly from the user initiation module 422. The site-specific antenna program module 433 displays a site-specific safety program to a user. This module 433 may also update the site-specific safety program when changes are made to a site. The functionality of this module will be explained in connection with FIG. 20.

The camera views module 435 may load and display multiple types of camera site views. In an embodiment, these views include far and close view. These views may be retrieved, for example, from the Camera Images table 232 shown in FIG. 2.

Figure 11:
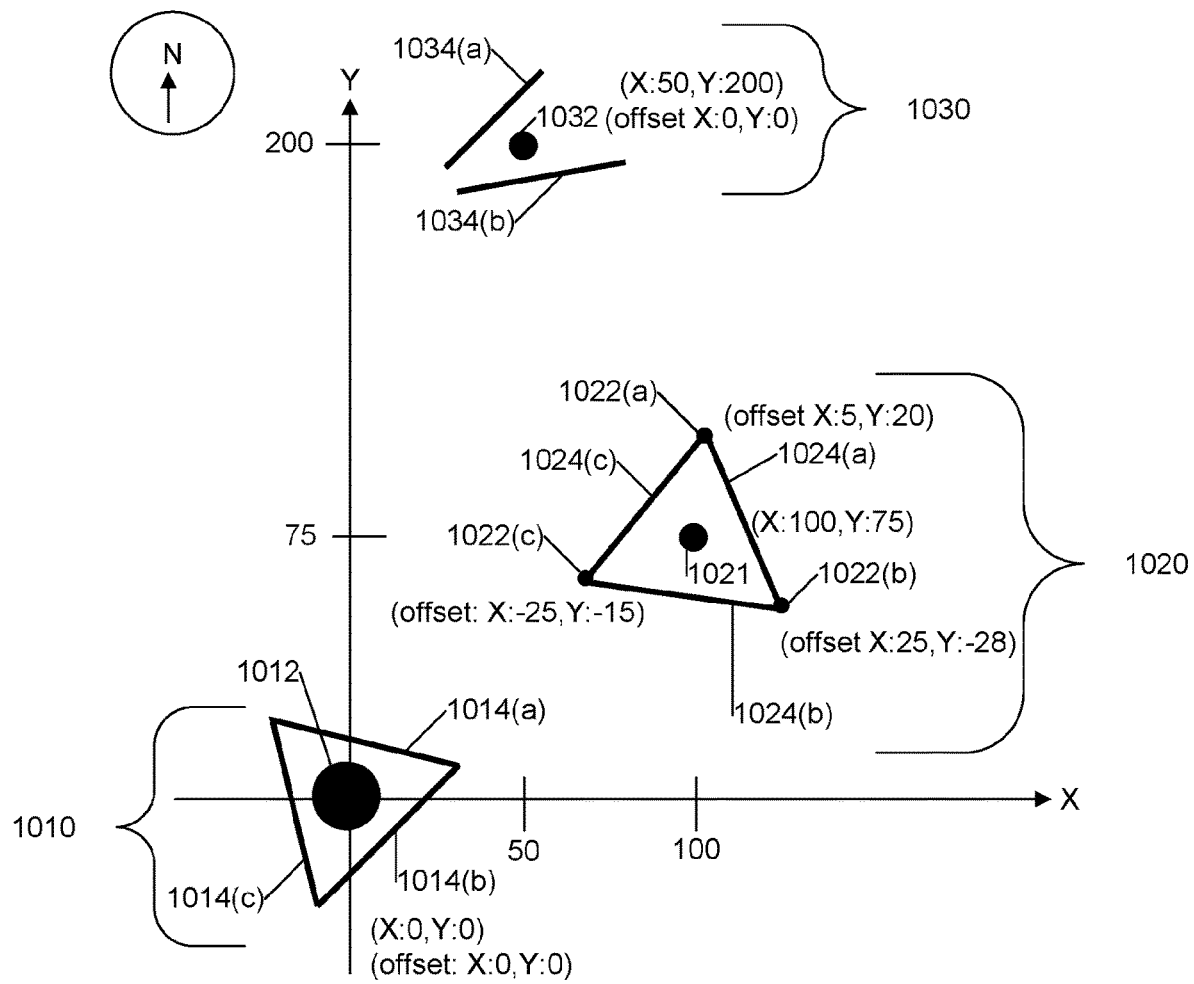
FIG. 11 is a graphical representation of a system which can be employed to define the spatial relationships between multiple antenna structures at a site which are stored in the database, according to an embodiment.
Figure 12:
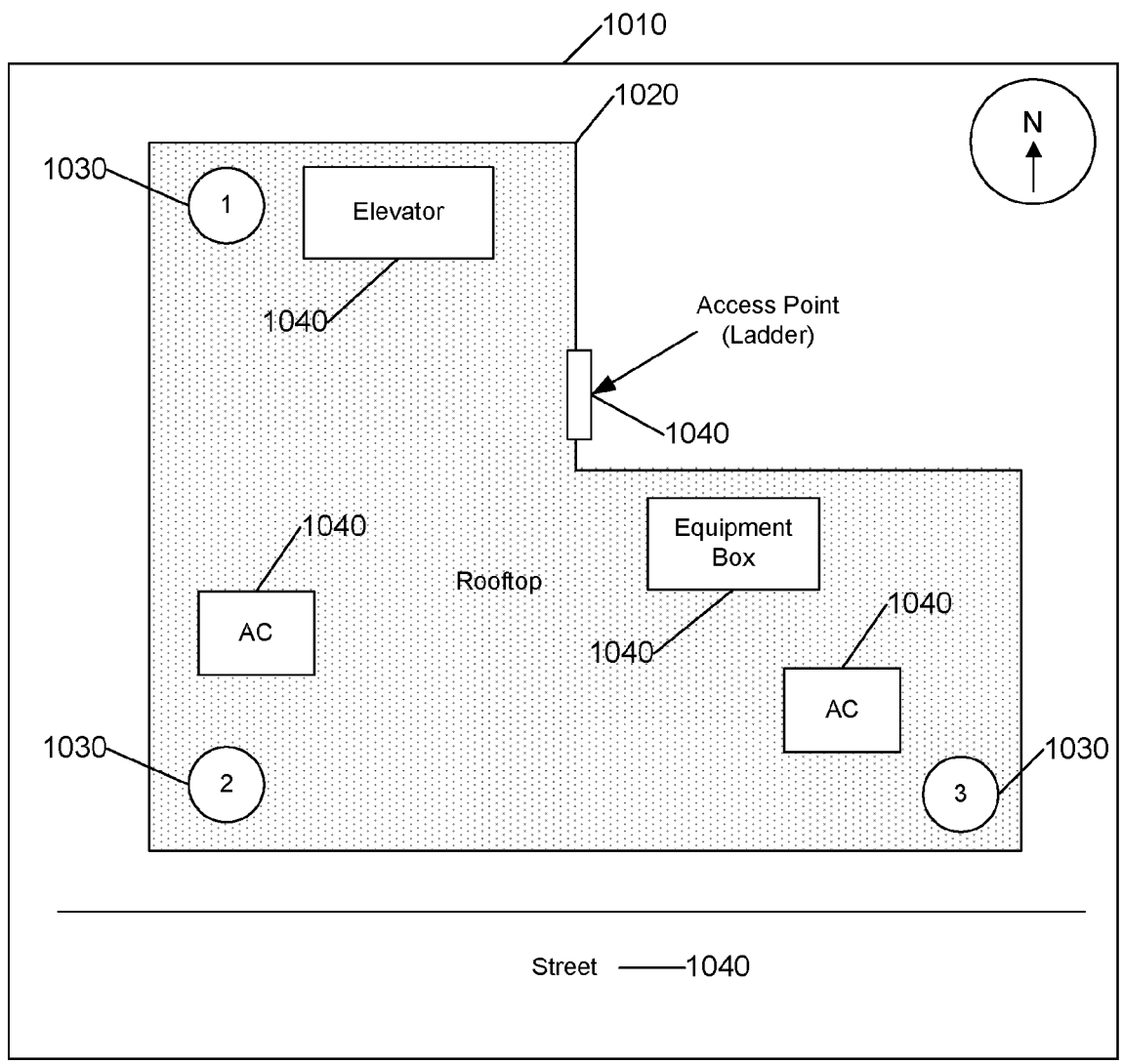
FIG. 12 is an example of site plot map, including a graphic representation of the antenna structures and other site elements site plot view, according to an embodiment.

The MPE map display module 430 may display a given site's transmitters, showing all the site's elements, and the associated MPE maps. FIGS. 11 and 12 provide examples of the MPE map views. In an embodiment, this enables any worker or individual visiting any site (e.g., in the United States) to see the RF radiation pattern maps for that site. These RF pattern maps can be updated on a daily basis and may represent an integral part of the system's compliance and safety solution.

In an embodiment, the MPE maps, with their represented RF radiation patterns, may be generated dynamically when requested, periodically updated, or updated whenever underlying the data is updated. Thus, the RF radiation patterns may be automatically kept up-to-date. For example, if the formulas (e.g., any of the equations for power density described herein) used by the applicable government regulatory entity(ies) and/or standards organizations (e.g., FCC, International Commission on Non-Ionizing Radiation Protection (ICNIRP), Institute of Electrical and Electronics Engineers (IEEE), etc.) change, the RF radiation patterns in the MPE maps can be automatically updated to reflect calculations according to the new formulas. Similarly, if the antenna configurations and parameters or floor plans change, the RF radiation patterns in the MPE maps can also be automatically updated to account for those changes.

The data update module 432 may enable an authorized user (e.g., a representative of an organization that operates one or more sites) to edit data of the site antennas that are associated with that authorized user. The data update module may also receive data from the wireless telecommunication company that owns the site antennas. The module 432 may send the edited data to the data update processing module 438. This data update processing is explained in more detail with FIG. 9 below. The data update processing module 438 may provide a site element preview map with selectable antennae structures.

In an embodiment, data update module 432 is configured to update a floor plan of a building. The system 100 can update the floor plan for physical changes made to certain areas of a floor of a building, such as offices, cubicles, conference rooms, cafeterias, and storage rooms. The system 100 can also update the floor plan for changes made to the location of entrances and exits of each floor of a building, such as main entrance doors, side entrance doors, fire escape, and emergency exits. In addition, the system 100 can update the floor plan for repositioning of transmitters such as inDAS, individual signal boosters, and WLAN networks.

In an embodiment, data update module 432 automatically tracks and records any changes to the data stored by database server 124. These changes may include any updates to antenna configurations and parameters, updates to floor plans, and/or the like. Each record of a change may identify what was changed, the source of the change (e.g., an outside source, such as a wireless carrier, a manual change by an operator or user of system 100, etc.), the time (e.g., represented by a timestamp) of the change, and/or the like, and may be stored by database server 124, for example, for auditing purposes.

In an embodiment, selection of an antenna structure (e.g., implemented by a user clicking or otherwise selecting a graphical representation of the antenna structure), causes system 100 to display the following information: antenna label; sector label; antenna structure label; antenna frequency (e.g., editable, for example, via textbox, radio button, drop-down menu, etc.); antenna input power (e.g., editable); antenna type (e.g., editable); and/or antenna model (e.g., editable). Selection of the antennae structure may yield an antennae structure zoom view with various antennas each having a link to further screens. In turn, a selection of a particular antennae may yield information including the information set forth in FIG. 2. The data update processing module 438 may communicate with the system administration modules 450. The data update module 432 provides the user with the ability to edit editable fields and send updates to the administrator.

The user can also move from the site information display module 428 to the power down request module 434. The power down request module 434 may provide one or more inputs that allow the user to request that a particular site's or antenna system at a sites power to be reduced or turned off. The power down request module 434 may communicate with the power down request processing module 440. The power down request module 434 allows the user to send power down requests for one or multiple antenna system from selected sites. In an embodiment, the power down request is sent by email to the broadcaster (operator of the antenna) and a copy of that email to the system administrator. Alternatively or additionally, a message other than an email may be used to send the power down request, or the request may be made via an application programming interface (API) to the operator's system. The power down processing module 440 may create a database entry for the power down request and send confirmation to the user. A scheduled power down request may comprise or be accompanied by information, such as the reason for the power down request, selected antenna structures, date, and duration in hours. The power down request processing module 440 may have both a manual and automated power down function. A more detailed description of the functioning of the power down request processing module 440 is set forth in connection with FIG. 8 below.

The engineering tools module 436 may generate and provide an MPE map based on dynamic resident database information and/or modified data. For example, the engineering tools module 436 may utilize the dynamic resident database information to calculate power densities for antennas in the database, including calculations for intermodulation, isolation, and creation of a hypothetical site called a "try-out" site. For the MPE map, the user can select any antennae from the site to view all information about the antennae. The user can manipulate some of the data to see how it affects the MPE maps. For intermodulation, the module 436 calculates the intermodulation between two selected antennas. For isolation, the module 436 calculates the isolation between the two selected antennas. The user can create try-out sites by placing new antennas into the site to create a preview of MPE maps or calculate intermodulation and isolation. Intermodulation and isolation studies predict possible interference of radio frequencies transmitted from different antennas and provide important information about the isolation levels required for a compatible site environment.

The contacts module 437 may display contact information to the user, including transmitter licensee or owner, site property owner representative, and city or municipalities. In an embodiment, a contact contains one or more of the following fields: company name, contact person's name, title, phone, fax, cell phone, e-mail, address (e.g., street address, city, Zip code, and state), and/or the like.

The RF Safety Summary Sheet module 431 may provide the user with the ability to review and print site-specific RF safety summary sheets. Each site-specific RF safety summary sheet can be provided in two versions. A first version is intended for RF trained workers (explained in more detail below), and may include site-specific information for work inside the areas where power density exceeds MPE limits for general, untrained workers. A second version may include site-specific information for work outside the areas where power density exceeded MPE limits and is intended for use by general, untrained workers. If only a black-and-white printer is available, the module 431 may create a print output suitable for black-and-white print showing the graphic representation of MPE maps as crosshatched areas. The RF safety summary sheet processing module 452 may provide functionally related to sending the request for accepting the RF safety summary sheet to the user and tracking the request. All of these processes will be explained in more detail in connection with FIG. 23.

The RF certification module 429 and RF certification processing module 454 may provide general and site-specific training and certification and tracking of the same. The modules may also provide functionality to ensure that RF certification is completed before providing users with a site-specific RF safety summary sheet. Furthermore, the modules may allow a user to invite others (e.g., contractor companies) to obtain a company RF Certification. Once a company becomes certified, it may manage its employees and provide them with a trained worker RF Certification via the modules, and/or issue the site-specific RF safety summary sheet. The system 100 may enable workers or contractor companies to complete a general RF certification by their own request. The operation and functionality of the RF certification module 429 is described in more detail below in connection with FIGS. 22-26.

The system administration modules 450 may include a raw site data processing module 442, a database administration module 444, an automated compliance audit module 446, a data update administration module 447, an RF certification & RF safety summary sheet tracking module 449, and an RF certification tutorials and test management module 455. Data update administration module 447 may send reminders that notify a defined contact to update actual attributes of the site. Periodic updates may be necessary, since there are frequent changes to the actual attributes of sites. The automated compliance audit module 446 may provide functionality for database audits. It may audit the sites which are controlled by the system on a monthly and annual basis to confirm that they are in compliance with international, federal, and/or state regulations, such as those established by the FCC, ICNIRP, IEEE, and California Occupational Safety and Health Administration (OSHA). In an embodiment, the data update administration module 447 handles sending requests for data updates to users ("out"), and evaluating updates when the user responds ("in").

The database administration module 444 may implement the functions to manage the application users, manage site data, manage power down requests (illustrated with respect to FIGS. 8A and 7B), and track application usage. In an embodiment, the raw site data processing module 442 performs functions that include converting raw data files into the format required by the database structures illustrated in FIGS. 2 and 3, and checking the quality of data.

The RF Certification & RF Safety Summary Sheets Tracking module 449 may implement functionality that enables a system administrator to track all system activities related to RF Certification and providing RF safety summary sheets. The system administrator can review all requests for RF Certification, all attempts to complete RF certification tutorials and tests, including failed certifications, and users' acknowledgements of RF certifications. The system administrator can further review, in details, each user's RF Certification test results with visibility into every question presented and the user's answer to each question. The system administrator can further review all requests for providing RF safety summary sheets to a worker, all accepted requests, and users' acknowledgements of the RF safety summary sheets.

The RF Certification Tutorial & Test Management module 455 may enable the system administrator to create various RF Certifications types based on requirements. The System administrator can create tutorials and tests and assign them to RF certifications. The module 455 may further provide functionality to measure performance of the various RF certifications using the tracking data retrieved from previous users' attempts to complete RF certifications.

Figure 6:
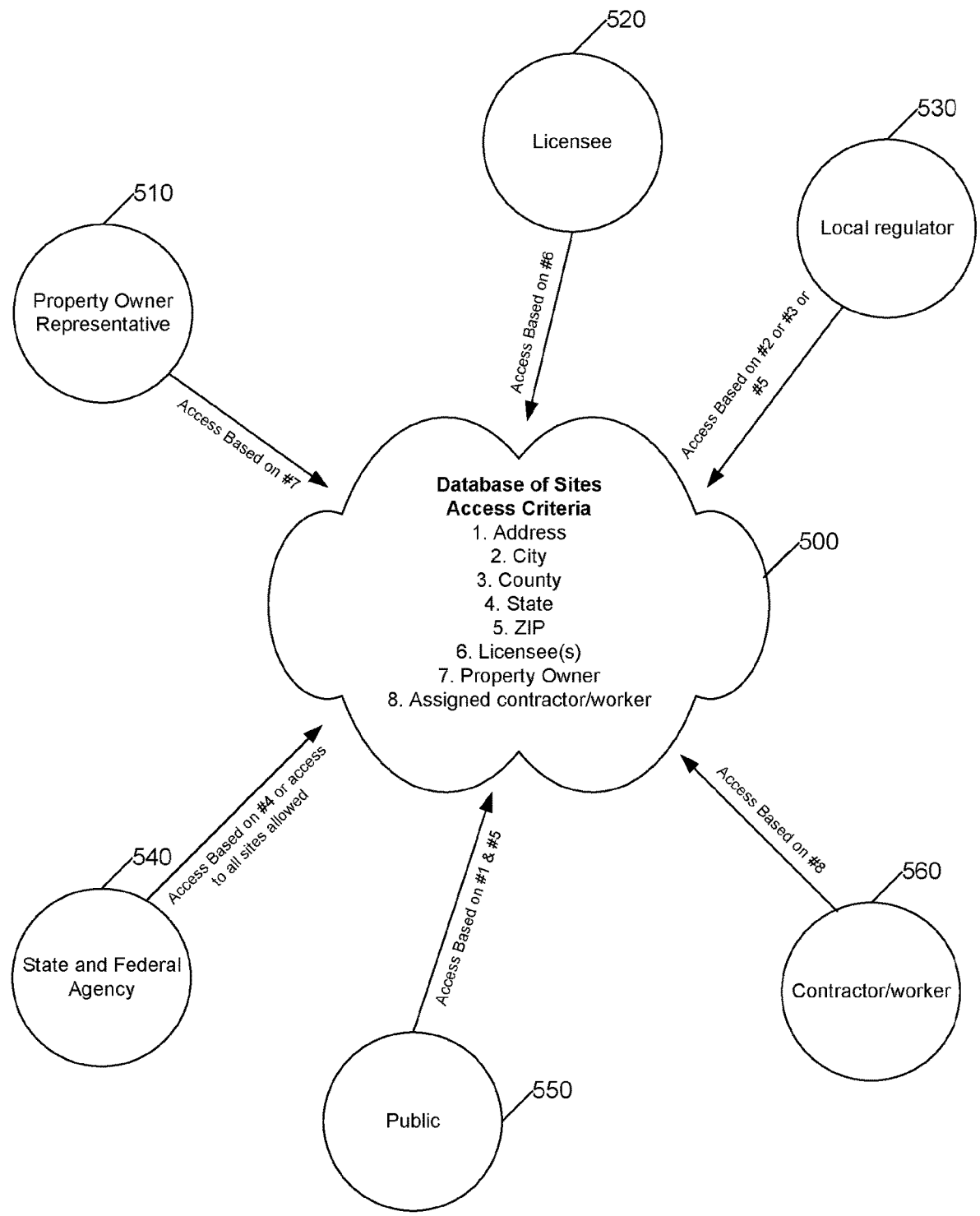
FIG. 6 is a block diagram illustrating a controlled access to sites based on user's role in the system, according to an embodiment.

FIG. 6 is a block diagram illustrating a controlled access database 500 based on a user's role in the system 100, according to an embodiment. The described process can be implemented by the corresponding modules 410, 422, 426, depicted in FIG. 5. The database 500 can be implemented as the database servers 124 in FIG. 1 which can include the site database depicted in FIG. 2. The use of the terms "site" and "sites" in this description refers to the representations of the sites in the database 500.

Database 500 includes various attributes that can be used for retrieving search query results based upon the users' roles in the system. A property owner's representative 510 can view existing sites on the properties he or she represents. For this purpose, the system 100 may use search criterion #7 as an index to retrieve and display all sites whose "property owner" attribute is associated with the current user (i.e., property owner's representative 510).

A licensee or network operator 520 can view existing and proposed sites with his or her antenna system on it. For this purpose, the system 100 may use search criterion #6 as an index to retrieve and display all sites with antenna systems whose "licensee" attribute is associated with the current user (i.e., antenna system property licensee 520).

A local regulator 530 (e.g., a government official) can view existing and proposed sites within his or her jurisdiction. For this purpose, the system 100 may use search criteria #2, #3, #4, and/or #5 as an index to retrieve and display all sites whose "city," "county," "state," and/or "Zip code" attributes match the "city," "county," "state," and/or "Zip code" attributes for the current user (i.e., local regulator 530). For example, a representative of a city government can view all sites where the database attribute "city" equals the government's city.

Members of the public 550 can view existing and proposed sites within a defined radius from their residence. For this purpose, the system 100 may use search criteria #1, #2, #4, and/or #5 as an index to retrieve and display all sites whose attributes indicate that they are within the defined radius from the residence. For example, the system 100 may convert the user's defined location into a GPS location and display sites within the defined radius from that location.

Similarly, contractor companies or individual workers 560 can view existing sites on which they were assigned to work. This access type may be created using functionality of the RF Safety Summary Sheet module 431 and RF Certification module 429 of FIG. 4.

Members of State and Federal agencies 540 can view sites based on their jurisdiction on the state level (e.g., state agencies) or have access to all sites on the national level (e.g., federal agencies). For this purpose, the system 100 may use search criteria #4 as an index to retrieve and display all sites whose attributes indicate that they are within the state or country associated with the current user (i.e., state or federal agency 540). For example, first responders such as police and fire fighters may be provided access to the database on a state or local level. In an embodiment in which access is initiated by the user's remote device 110 scanning machine-readable indicia, the user's remote device 110 may also automatically identify the user to the system 100 (e.g., by providing an identifier of the remote device 110 registered to the user, information which identifies the user, or both). Alternatively, the user can log into the system 100.

The system 100 may further allow larger organizations, such as wireless service providers, to manage their access to the database according to their internal organizational structure. For example, the system 100 may allow these organizations to create multiple user accounts for their representatives and assign those representatives access to sites by their region, state, or county.

In an embodiment, access to database 500 may be restricted based on the user's location. For example, the user's location may be determined based on an indication in the user's account information (e.g., city, county, state, Zip code), a GPS location of the user's device 110, an Internet Protocol (IP) address of the user, and/or the like. The system 100 may then provide access to only those sites which are located within a geographical region from the user's location (e.g., within a geo-fence around the user's location, within a radius of the user's location, within the same city, county, state, or Zip code as the user's location, etc.). This can provide the system 100 with an additional layer of data security and user authorization.

In an embodiment, the interface with the site information is presented as a site top preview map (i.e., a site plot map), with all the site's elements derived from the database data. The site top preview will be explained in detail in connection with FIG. 10. An antenna structure pop-up window may be used to show detailed information about the antenna, including a MPE horizontal view (e.g., with buttons allowing the user to switch between antenna arrays), an MPE map vertical view (e.g., with buttons allowing the user to switch between antenna sectors), antenna structure camera views (e.g., including both standard and close view options), and antenna structure information. In an embodiment, the antenna structure information can include the antenna structure type, latitude/longitude of the antenna structure, list of antenna arrays with labels and elevations, list of antenna sectors for all antenna arrays with labels and azimuths, and/or list of all antennas for one antenna sector with label, frequency, power, antenna type, and model.

In an embodiment, the interface with the site information is presented as a floor plan with a graphic representation of all sources of RF radiation and MPE maps. The interface with the site information may be presented as a 3-D model of a building with a graphic representation of all sources of RF radiation and MPE maps.

In an embodiment, the site information module 428 allows the user to filter sites by power line types (e.g., high power lines, low power lines, restricted, etc.), print information related to RF safety for specific pole numbers, and create an interactive map. The interactive map function allows the user to "move" along the power lines on an interactive map to locate another site on the same power line. The interactive map may display selectable (e.g., clickable) arrows in the direction of the power line, such that a selection of these arrows moves in the indicated direction. The sites may be shown by a dot or other graphical representation, and the selection of a site's graphical representation may cause the system 100 to display information about the selected site.

Figure 7:
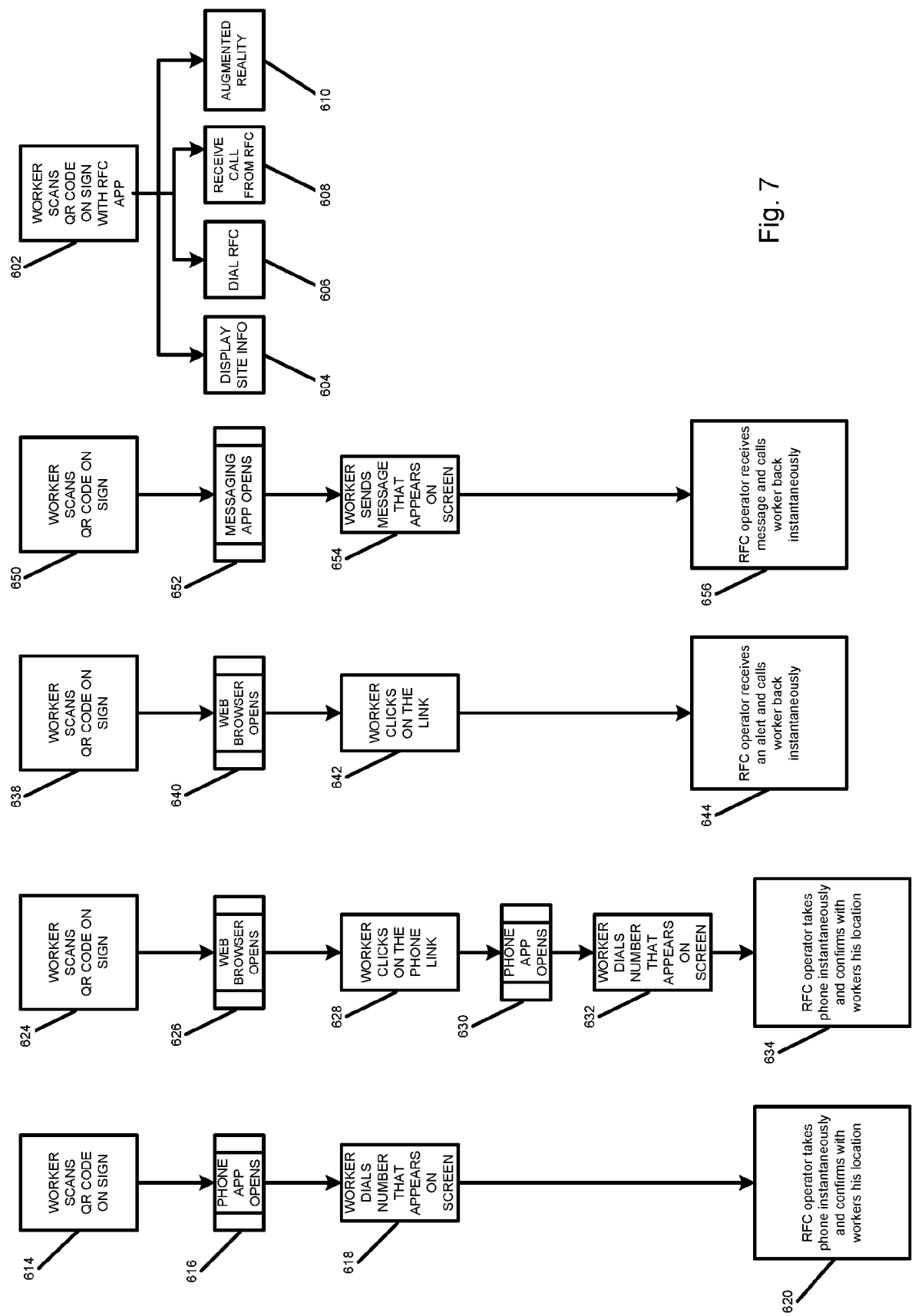
FIG. 7 is a flow diagram of an embodiment of the process implemented by the QR access function.

FIG. 7 is a flow diagram of an embodiment of the process implemented by the QR access module 423 of FIG. 5. This process can provide a simplified access process to information for a site, which is identified by machine-readable indicia that has been read by a remote device 110 (e.g., a cellular telephone). The machine-readable indicia can be, for example, a matrix barcode (such as a QR code), a two-dimensional barcode, an RFID tag, or a wireless transmission (e.g., a Bluetooth™ transmission). While references herein to machine-readable indicia will frequently contemplate a QR code, it should be understood that embodiments are not limited to any specific type of indicia. The machine-readable indicia can be provided on a sign warning of the RFR radiation hazard (a warning sign) which can be located at or near to the access points of the site. For example, for sites which are buildings, the machine-readable indicia can be located at one or more of the doors providing entry into the building. Alternative locations can also be used for the machine-readable indicia. Scanning or reading the machine-readable indicia may provide the user device 110 with information that identifies the site and the location of the sign at the site. For example, the machine-readable indicia can provide the ID of the site in table 210 and the identification of the specific sign at the sight, or another identification of the site, such as its address, and the location of the sign. The location of the sign can be important, for example, for sites with multiple antennas.

Referring to FIG. 7, an embodiment of the operation of the QR access processing module 423 will be described. Functions or steps not explicitly described as being performed by a module may be performed by the QR access processing module 423. At step 602, a user scans the QR code (or other machine-readable indicia) using a wireless mobile communication device 110 (e.g., a smart phone, tablet, or other device having the capability to scan or read the machine-readable indicia), which has specialized software running on the device 110. The software running on the device 110 can be configured to immediately obtain and display the site information for that location from the site information display module 428 as represented in step 604. For example, the QR access processing module 423 can provide the identifier of the site (e.g., from the QR code) to the database search module 426 to obtain the site information. Alternatively, at step 606 the software can cause the device to initiate a telephone call with the predetermined telephone number of a call center supported by trained safety specialists. These specialists can then assist the user. The telephone number called can indicate the site. Alternatively, at step 608 the user device 110 sends a message including the telephone number of the device (e.g., by a text, email or other communication protocol), and an operator at the phone center responsively calls the user's device 110. Alternatively, at step 610 in response to scanning and processing the QR code, the software in the user device 110 can download all the site information from the system 100. The user device 110 can then use that information to provide an augmented reality for the user. For example, the user device 110 can display additional information over top of images captured through the device's camera in real time as those images are captured. The additional information can be, for example, RFR exposure levels. In addition, the various operations just described can be presented on the display of the user device 110 as choices which can be selected by the user.

In an alternative or additional embodiment, at step 614, the user scans the QR code using the user's remote device 110. For example, the device 110 can be a mobile communication device, such as a smart phone, having a standard camera or other QR reader that is used to read the QR code. At step 616, after reading the QR code, the software on device 110 causes the telephone application on the device 110 to open or launch. At step 618, the user dials the telephone number that was obtained from the QR code and is displayed in the telephone application. The telephone number is for a call center, such that the telephone application connects the user to the call center. It should be understood that the telephone number of the call center is represented in the QR code. At step 620, personnel at the call center, can confirm the caller's location and provide RF safety assistance.

In an alternative or additional embodiment, the QR code can indicate the address of a website. For example, at step 624, the user scans the QR code using a camera or other standard QR reader of mobile device 110. At step 626, the QR reader causes the web browser of the device 110 to launch. At step 628, the web browser displays site-specific information for that that site and includes a link for placing a telephone call for assistance. When the worker clicks on that link, at step 630, the phone application in the mobile device opens with the telephone number from the website. The worker can then call that number in step 632. At step 634, as was explained in connection with step 620, the user is connected to a call center supported by individuals trained for RFR safety support.

In an alternative or additional embodiment, at step 638, the user scans the QR code using a camera or other standard QR reader of a mobile device 110. At step 640, the QR reader causes the web browser of the device to launch. The web browser displays site information that is specific to that site, and includes a link for receiving a telephone call for assistance. At step 642, the user selects that link. At step 644, an operator in the call center, previously described, receives an alert including the telephone number of the mobile device 110. The operator calls that number and is connected to the user.

In an alternative or additional embodiment, at step 650, the user scans the QR code using a camera or other standard QR reader of a mobile device 110. At step 652, the QR reader causes a messaging application (e.g., text messaging) of the device 110 to launch. Using data from the QR code, a message is displayed that is prepopulated with the basic identifying information for the site, the telephone number of the mobile device, and a preselected message address. At step 654, the worker sends the message in order to receive a call back from the call center. At step 656, an operator in the call center, previously described, receives an alert including the telephone number of the mobile device 110. The operator calls that number and is connected to the user.

In an alternative or additional embodiment, sensors may detect that the user (e.g., worker) is attempting to gain access to an area comprising one or more transmitters and send the detection signal to the system 100. Access may be attempted, for example, to perform work in the vicinity of a transmitter. Thus, in an embodiment, the system 100 may then execute remote modification of each individual nearby transmitter of the wireless network based on a power densities and/or MPE map to ensure compliance with existing and up-to-date RF exposure regulations in the accessed area. Remote modification may be triggered by either a detected attempted access and/or a request from the user (e.g., QR-code-initiated request or other request). The request or detection may be associated with the transmitter(s) in the vicinity of the area.

The system may be configured to receive the request, process it, and store the request and modifications in the central database (e.g., database 124 of FIG. 1). The stored request and resulting action may be leveraged for processing future requests.

In each of the above described methods, the time of the contact from the worker, the telephone number of the worker, and the location of the site (and the worker) can be saved, for example, as part of the site compliance report 242.

In an embodiment, at the site information step 604 in FIG. 7 and/or as implemented by site information display module 428 in FIG. 5, the user can access the functions in the contacts module 437 shown in FIG. 5. Specifically, system 100 executes a contacts module 437, to provide the user with the option to go to the power down request module 434 of FIG. 5.

Figure 8A:
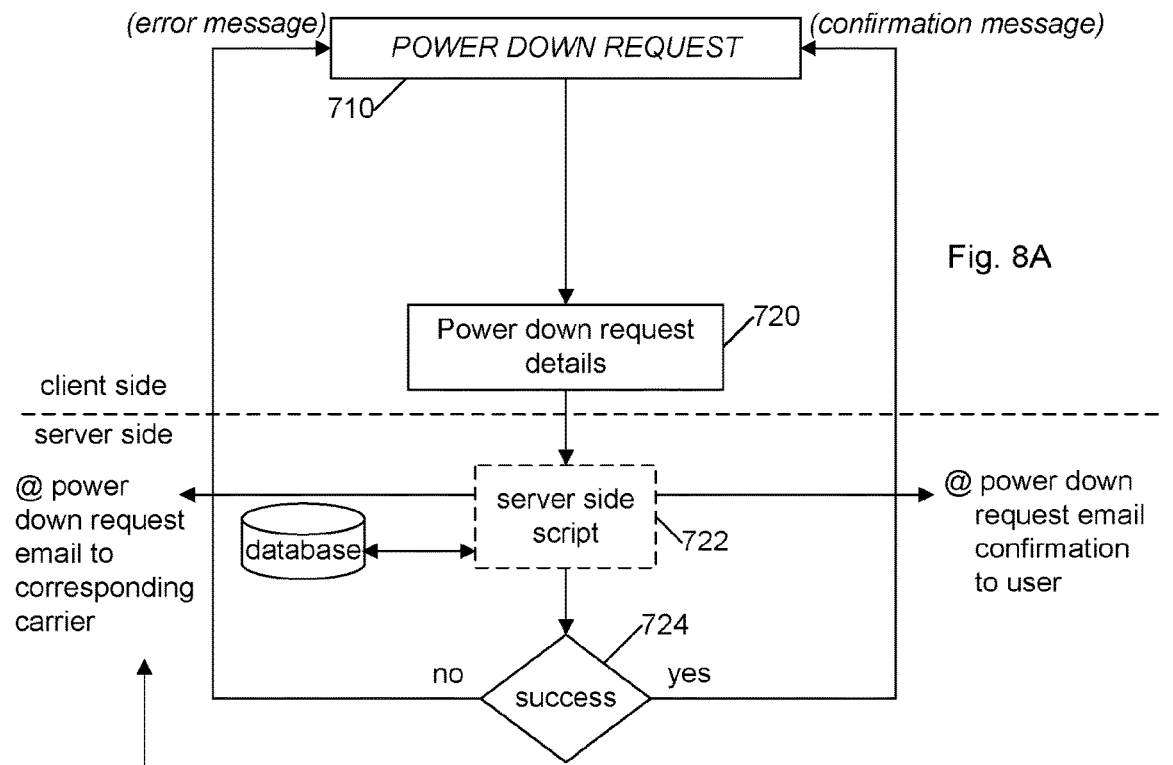
FIG. 8A is a flow diagram of the power down request functions, according to an embodiment.

FIG. 8A is a flow diagram of the power down request functions which can be implemented by modules 434 and 440 of FIG. 5, according to an embodiment. At step 710, a power down request interface provides the user with the ability to send a power down request for one or multiple antenna structures from a selected site. At step 720, the process provides the user with the ability to enter details relating to the power down request. At step 722, a power down request email is generated and sent to the broadcaster associated with the antenna, a confirmation email about sending the power down request is sent to the user, and then a database record about power down request is created. At step 724, if the power down is successful, a screen is displayed at 710 stating the emails have been successfully sent.

Figure 8B:
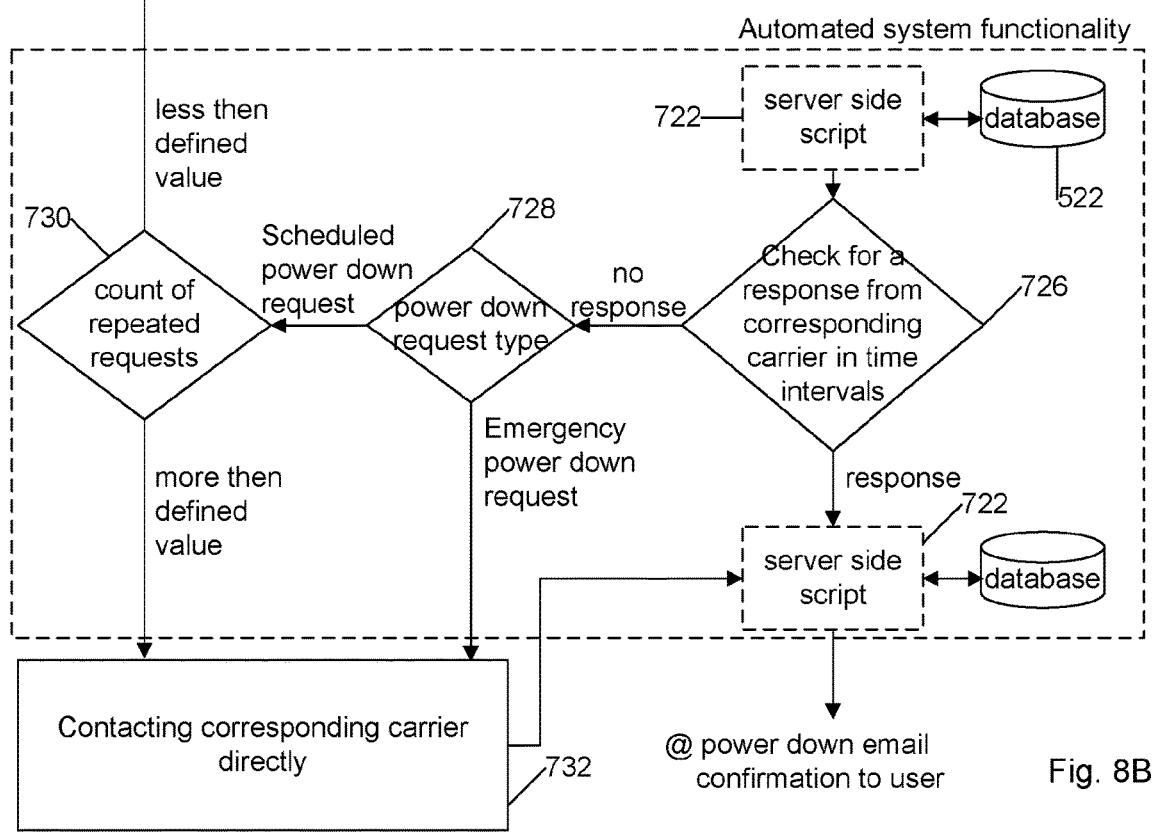
FIG. 8B is a flow diagram of the functions performed once a power down request is sent to the wireless telecommunications company, according to an embodiment.

FIG. 8B is a flow diagram of the functions performed once a power down request email is sent to the transmitter owner or operator, according to an embodiment. This request is sent automatically by database administration module 444 of FIG. 5. At step 726, at predetermined time intervals, a check is carried out to determine if a response from the transmitter owner or operator has been received. If a response is received from the transmitter owner or operator, the process proceeds to step 722. At step 722, the response is saved in the database. At step 722, a power down email confirmation is also sent to the user to confirm that the transmitter owner or operator received the power down request. This email may also contain further power down request information. If step 726 determines that no response has been received from the transmitter owner or operator, the process proceeds to step 728. Step 728 determines what type of power down request has been sent. In an embodiment, the types of power down requests include scheduled power down and emergency power down. If the power down request is determined to be an emergency, the process proceeds to step 732. At step 732, the system administrator contacts the transmitter owner or operator directly and notifies them that the antenna structure must be shut down. If the power down request is a scheduled power down, the process proceeds to step 730. Step 730 determines the number of repeated power down requests which have been sent to the transmitter owner or operator. If step 730 determines that less than a defined value of repeated power down requests have been sent, step 730 sends another power down request email to the transmitter owner or operator. If step 730 determines that more than a defined value of repeated power down requests has been sent, the system proceeds to step 732. If the system administrator contacted the transmitter owner or operatory successfully, the system 100 proceeds to step 722, as if the response were received from the transmitter owner or operator.

Figure 9:
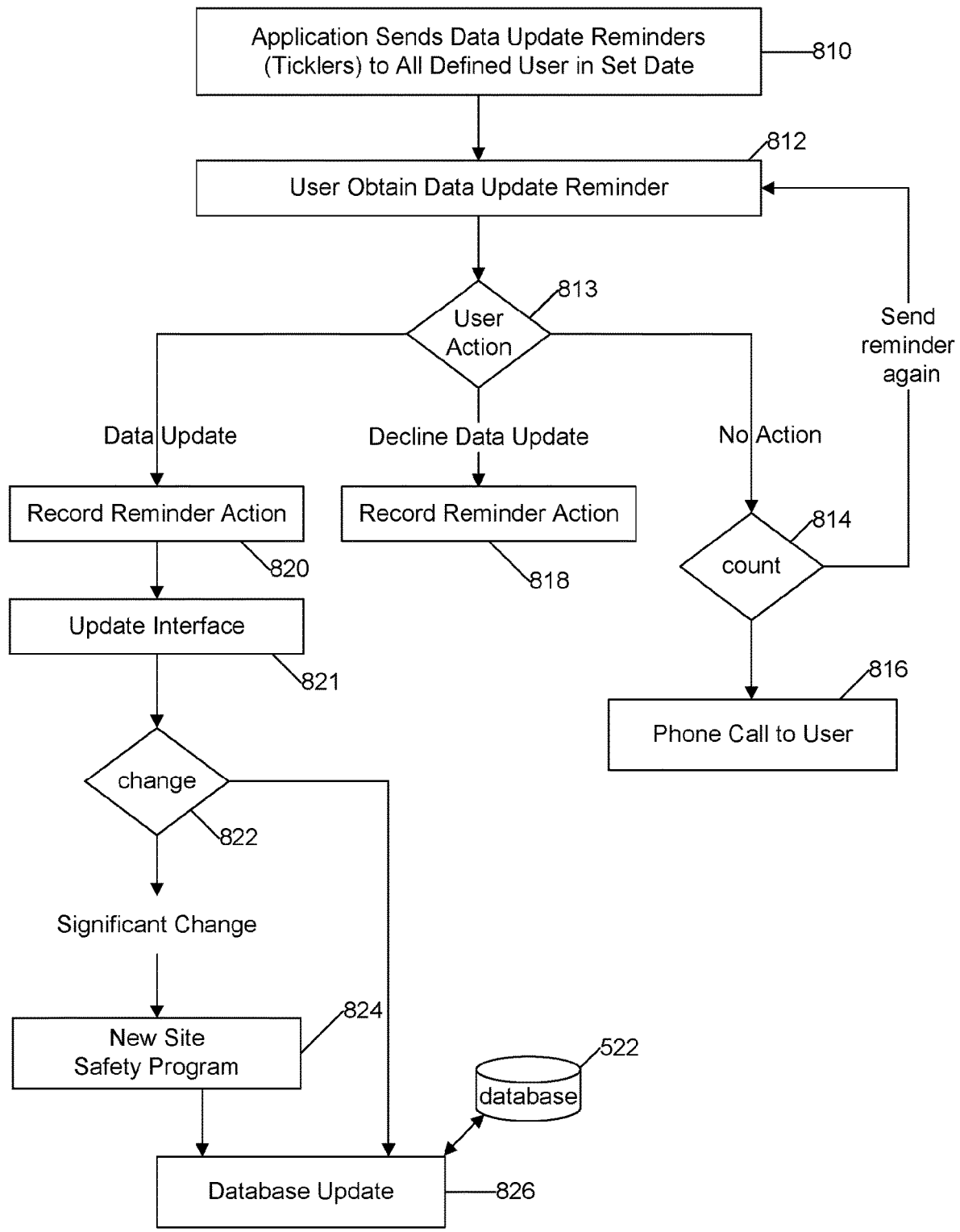
FIG. 9 is a flow diagram of an embodiment of the process implemented by the data update module.

FIG. 9 is a flow diagram of an embodiment of the process implemented by the data update administration module 447 of FIG. 5. At step 810, data update reminders are sent to all defined users. Defined users and their entered information are obtained from a user database (e.g., managed by database servers 124), and email reminders are transmitted to each such user. At step 812, the email displays a data update reminder to the user. At step 813, the user can select from action choices including data update or decline data update. If the user chooses the data update function, the module 447 routes the user to step 820 where the user action—in this case, a database update—is recorded in the database. At step 821, the user is provided with an interface for making the update. In an embodiment, this interface is made through module 432 of FIG. 5. The quality of the data is checked and the process continues to step 822, where the system 100 verifies any significant change of the data that could affect a site's specific safety program. If there is any significant change, a new site safety program is created by module 824. At step 826, the module 447 stores the information in the database. After receiving a response from the server side script, a screen displays information about the success of the update.

At step 813, if the user declines to update the data, the process proceeds to step 818. At step 818, the user's action—in this case, declining a database update—is recorded in the database. At step 813, if the user takes no action, the process proceeds to step 814. At step 814, the process either sends a second reminder or generates a prompt for an administrator to contact the transmitter operator or owner by telephone or other means. This choice may be based on the number of times the process has received no action from the user.

Figure 10:
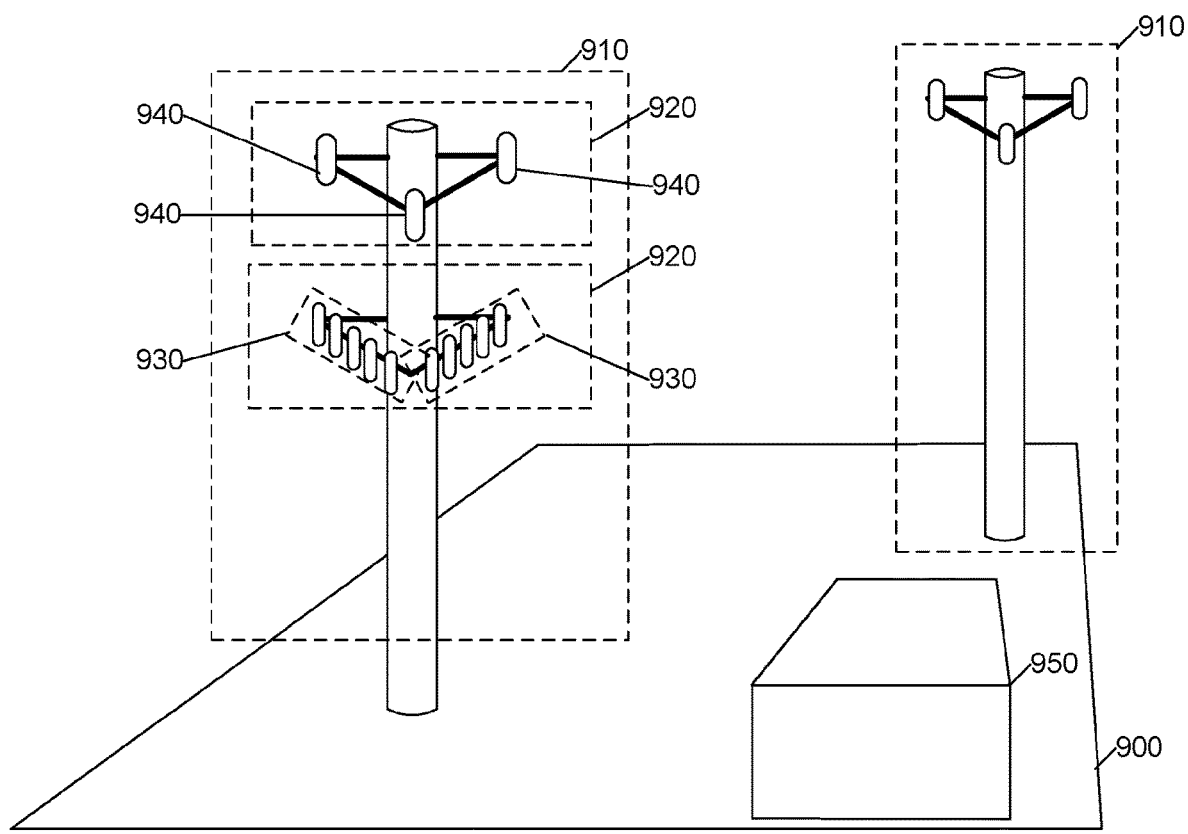
FIG. 10 is a graphical representation of a physical site related to a generalized site data structure, according to an embodiment.

FIG. 10 is a graphical representation of a physical site 900 and a generalized site data structure, according to an embodiment. Notably, implemented instances of the illustrated data structure may be stored as data in database servers 124, which may be implemented as cloud storage. FIG. 10 is intended to clarify the relationship between the data structure depicted more completely in FIG. 2 and a physical site that can be represented by the data structure. Each site 900 (represented as an entry in table 210 in the data structure) may include one or more (generally indicated by the notation "n") antenna structures 910 (represented as an entry in table 212 in the data structure). Each antenna structure may include one or more antenna systems 920 (each represented as an entry in table 214 in the data structure), and each antenna structure may further include one or more groups of antennas 930 (each represented as an entry in table 216 in the data structure). Each antenna group can include one or more antennas 940 (each represented as an entry in table 218 in the data structure). In an embodiment, an antenna group 930 may comprise an array of antennas configured for one or more of SU-MIMO, MIMO, and/or massive MIMO. One or more of the antenna groups 930 may be, individually or in combination, configured to utilize beamforming algorithms. In an embodiment, the antenna structure 910 may be configured to communicate via cellular networks, for example, 4G LTE networks, 5G NR networks, and/or the like.

Figure 13:
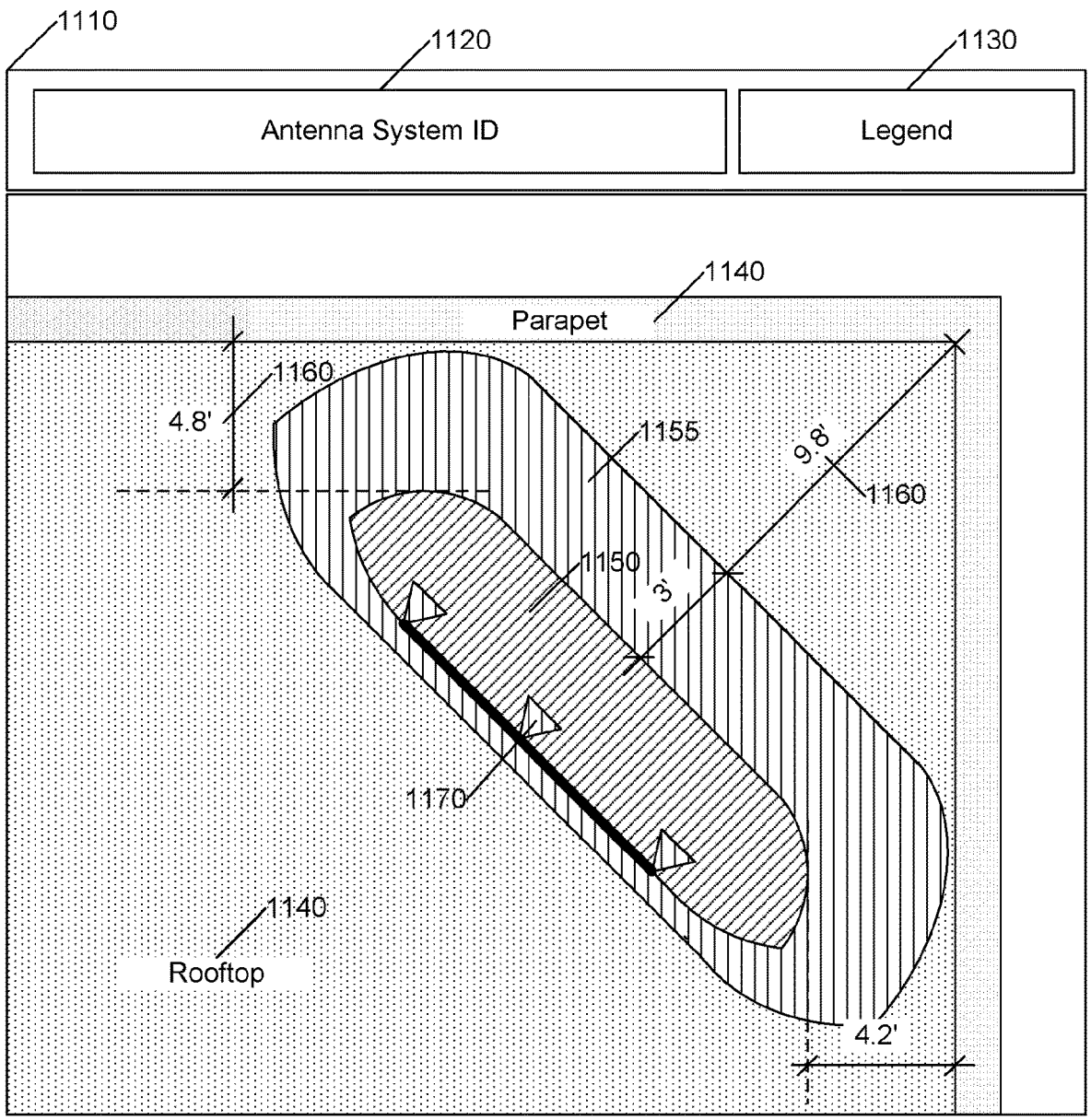
FIG. 13 is a graphical representation of a single antenna system on the site including MPE Maps from top view perspective, according to an embodiment.

FIGS. 11, 12 and 13 will now be described in connection with an embodiment of a system 100 used to define the spatial relationships between elements of a site. These figures are examples of displays provided by the system 100 to users' access devices 100, where they can be displayed and/or printed.

FIG. 11 is a graphical representation of a system which can be employed to define the spatial relationships in a horizontal plane between multiple antenna structures at a site which is represented in the database. In the example depicted in FIG. 10, three different antenna structures 1010, 1020, and 1030 are located at one site. Alternatively, one or more of the antennas can be located inside or on a building. Antenna structure 1010 has one associated tower 1012 and three sectors 1014(a), 1014(b) and 1014(c). Antenna structure 1020 has three associated towers 1022(a), 1022(b), and 1022(c), and three sectors 1024(a), 1024(b) and 1024(c). Antenna structure 1030 has one associated tower 1032 and two associated sectors 1034(a) and 1034(b). These antenna structures are mapped on an X-Y coordinate system. The first antenna structure 1010 is defined as the base location and has the coordinates of X:0 and Y:0. The coordinates of the remaining antenna structures at the site are defined relative to the first antenna structure. The amount of precision in the coordinates may be selected based upon the measurement technique employed and the precision desired in any calculations which use the coordinates.

The location of antenna structure 1020 is defined in relation to antenna structure 1010. Each tower associated with the antenna structure receives a location value measured relative to its antenna structure location. In the example portrayed in FIG. 11, which is a top view, antenna structure 1020 has coordinates X:100 and Y:75, measured as the center of the antenna structure 1020 in relation to the center of antenna structure 1010. This value may be represented in the Antenna Structure table 212 of FIG. 2. In an embodiment, the locations of towers of an antenna structure are defined as an offset from the location of an associated antenna structure. For example, the towers associated with antenna structure 1020 have the following values in relation to the center of the antenna structure 1020. Tower 1022(a) has an x offset of 5 and a y offset of 20, tower 1022(b) has a x offset of 25 and a y offset of −28, and tower 1022(c) has a x offset of −25 and a y offset of −15. The offset is measured from the center 1021 of the antenna structure 1020. As such, when the tower is left or down from the antenna structure center 1021, the values are negative. The offset values of the towers 1022 may be represented as entries in a tower table in the database. The coordinates and offsets for the other antenna structures and towers are shown in FIG. 11.

FIG. 12 is a graphical representation of a site plot map based upon data stored by the system 100 (e.g., in database server 124), which defines the spatial relationships in a horizontal plane between multiple antenna structures at a site and can be provided to users in the site plot map preview. In the example depicted in FIG. 11, three different antenna structures 1030 are located at one site. The site plot map shows these antenna structures on the area that represents building rooftop 1020. Additionally non-RF elements 1040 are presented such as an air conditioning (AC) unit, equipment box, and access point. The system can send this representation to the user's access device 110, to be displayed on a display of device 110.

FIG. 13 is a top view of an antenna system's MPE map as rendered by module 430 of FIG. 5, according to an embodiment. Antenna system MPE map 1110 includes antenna system identification 1120 and legend 1130 which includes a description of the graphic elements used in the MPE map. The MPE map includes a graphic representation of the antenna system 1170, non-RF elements 1140, the controlled areas 1150, and the restricted areas 1155 of the MPE maps, including dimensions 1160 as required by the associated site-specific antenna safety program.

Figure 14:
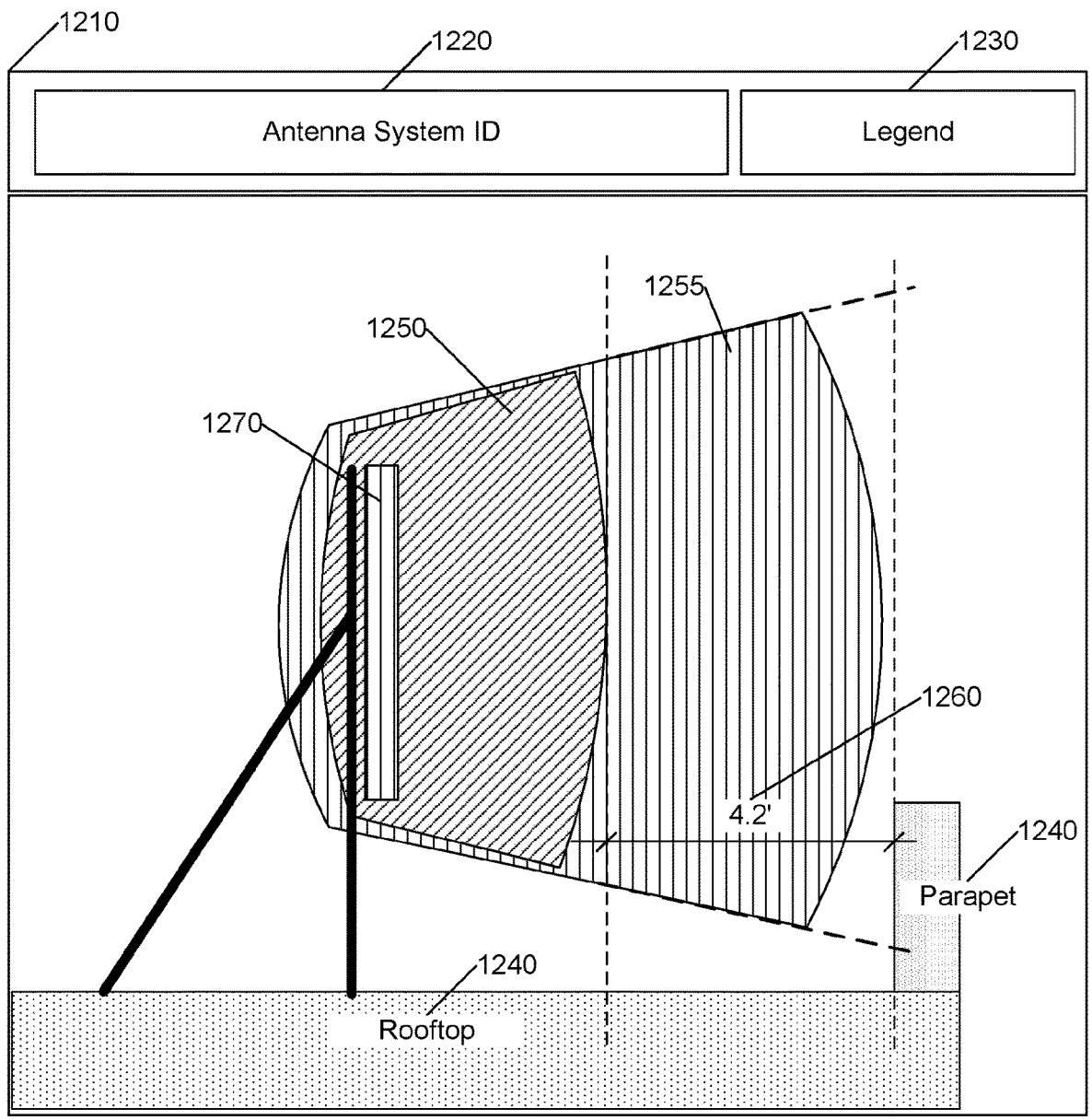
FIG. 14 is a graphical representation of a single antenna system on the site including MPE Maps from side view perspective, according to an embodiment.

FIG. 14 is a side view of the antenna system's MPE map as rendered by module 430 of FIG. 5, according to an embodiment. Antenna system MPE map 1210 includes antenna system identification 1220 and legend 1230 which includes a description of the graphic elements used in the MPE map. The MPE map includes a graphic representation of the antenna system 1270, non-RF elements 1240, the controlled areas 1250, and the restricted areas 1255 of the MPE maps, including dimensions 1260 as required by the associated site-specific antenna safety program.

Figure 15A:
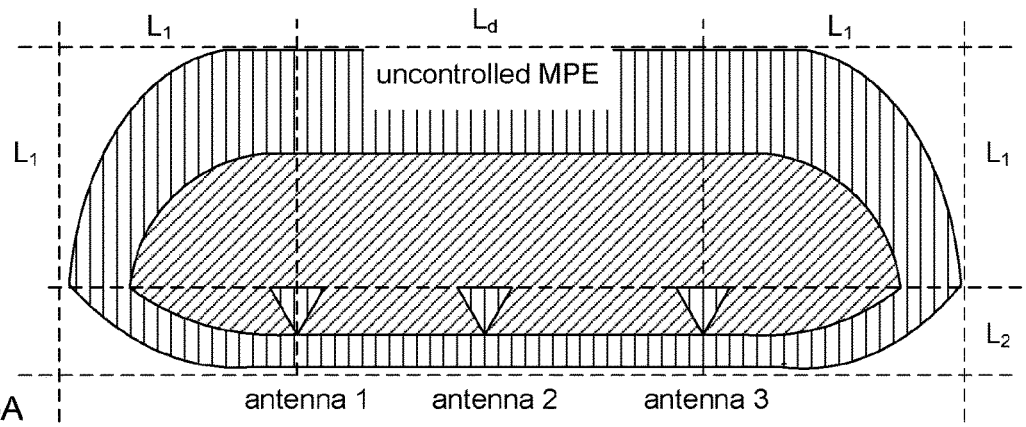
FIG. 15A is a graphical representation of a MPE map from the top view perspective for three antennas with overlapping controlled and restricted areas represented, according to an embodiment.
Figure 15B:
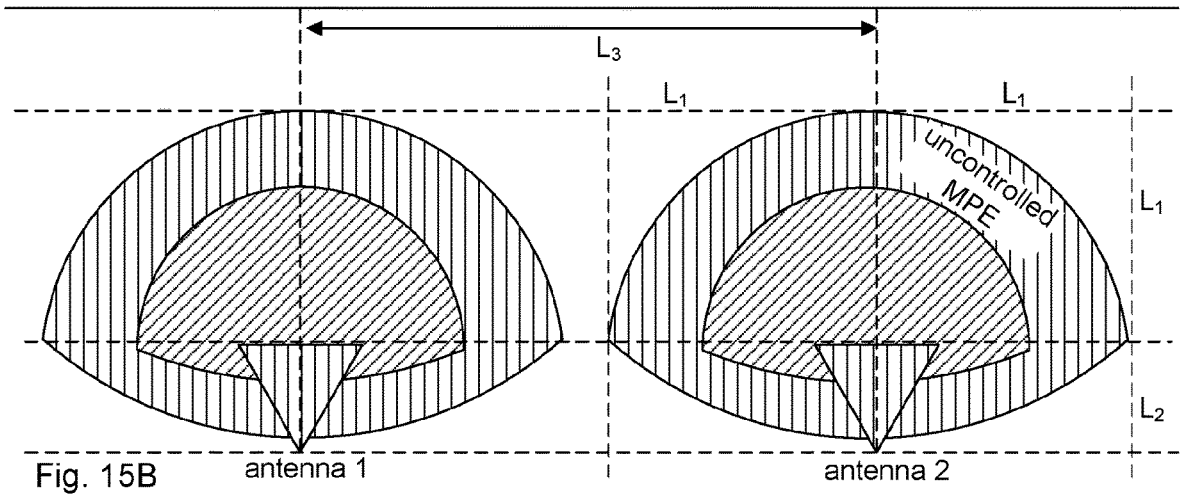
FIG. 15B is a graphical representation of a MPE map from the top view perspective for two antennas with non-overlapping controlled and restricted areas represented, according to an embodiment.
Figure 15C:
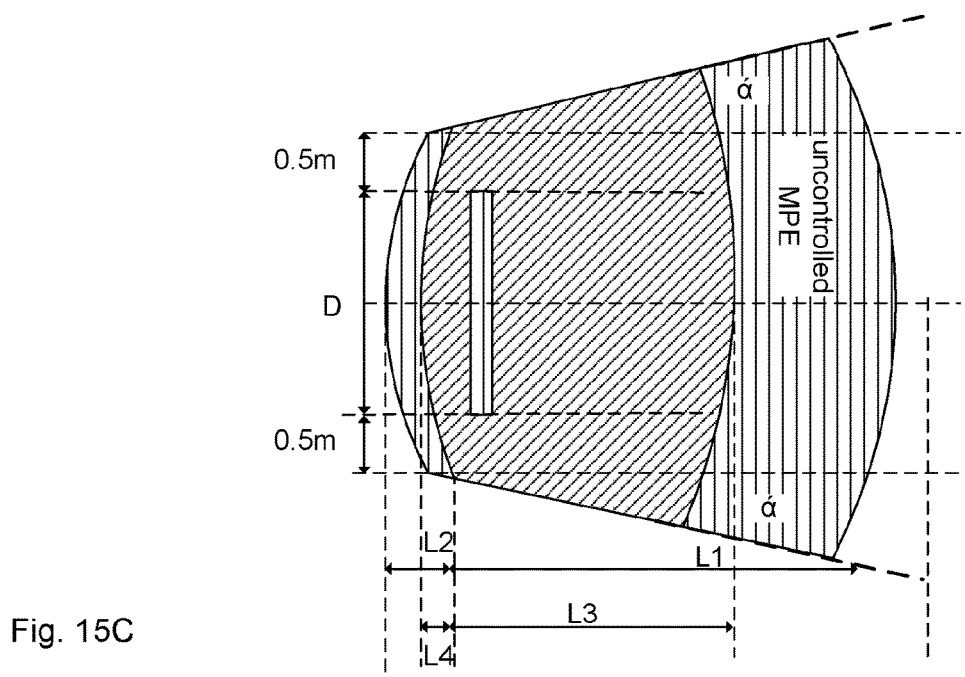
FIG. 15C is a graphical representation of a MPE map from the side view perspective of an antenna, according to an embodiment.

In an embodiment, the MPE maps module 430 calculates power densities for antennas in the database and creates graphic representations of the power densities. Example representations are depicted in FIGS. 15A-15C described below. In an embodiment, the graphic representations are in the form of radiation pattern maps. In an embodiment, the radiation pattern maps graphically depict the power densities and physical landmarks, including for example, interior features of a building (when the power densities are inside a building), towers, and emitters. The calculations of power density and the creation of graphic representations of the densities can be used to determine and maintain site safety and to comply with government regulations (e.g., OSHA, FCC, ICNIRP, and/or IEEE regulations) and to comply with other safety standards.

The graphic representations of the MPE maps provide the user with projected gradation patterns of power density. In an embodiment, the maps show two distinct areas, restricted and controlled MPE areas, which are defined in one example by FCC, ICNIRP, IEEE, and/or OSHA standards. MPE maps for the controlled areas represent the areas where the power density of the RF fields exceeds the limits for the general population. MPE maps for the restricted areas represent the areas where the power density of the RF fields exceeds the occupational MPE limits. The power density in the controlled areas is above the general public limits but not above the occupational limits for RF trained workers. However, more than two areas or regions can be defined and displayed. In general, the MPE maps module can display various gradation distinctions based on selected density values. The power densities created by multiple antenna structures, and in some instances owned by different wireless telecommunication companies, can be generated to show cumulative density. Alternatively, these modules can be used to calculate all power densities for a site. Power density calculations may vary based on a number of characteristics of the antenna and/or how the antenna is utilized. For example, power density may vary based on whether a frequency division duplex (FDD) spectrum or time division duplex (TDD) spectrum is utilized by the antenna. Similarly, power density may vary based on whether the antenna is configured to utilize a narrowband channel or a broadband channel. This is extremely beneficial if a person needs to do maintenance at a site so that they can determine how far from each antenna structure they must remain in order to be at a safe distance.

Figure 17:
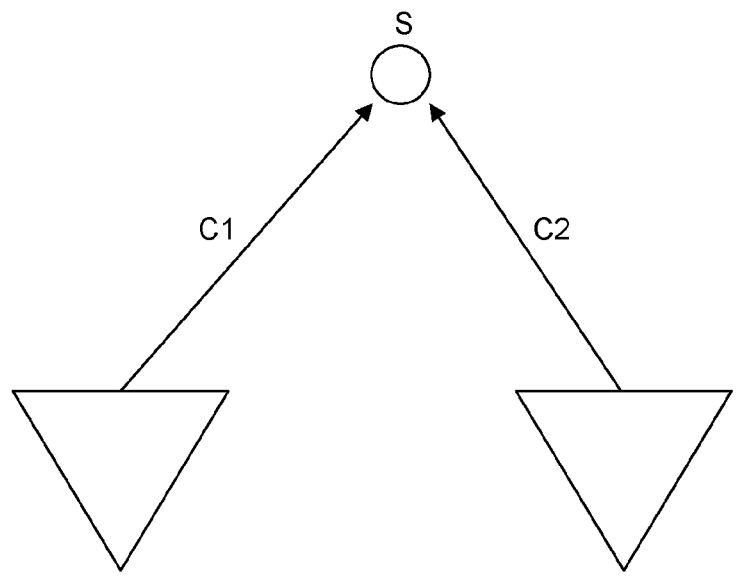
FIG. 17 represents the power density as a contribution of two antenna radiations, according to an embodiment.
Figure 19:
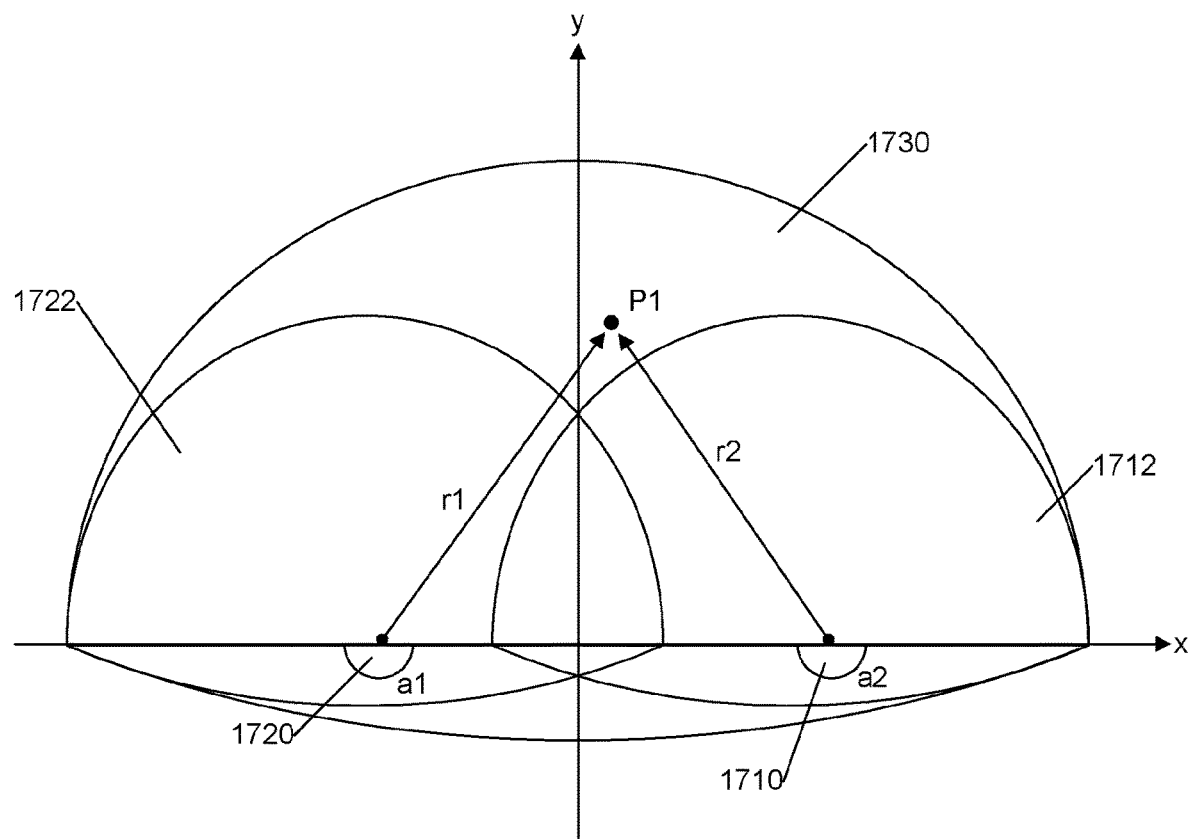
FIG. 19 represents the power density contribution of two antennas to a point in space, according to an embodiment.

In an embodiment, the graphic representations in the MPE maps and the power density calculations for antenna structures with multiple antennas can be determined using a single antenna model (e.g., FIG. 15B), conservative model (e.g., FIG. 13) or the contribution model (e.g., FIGS. 17 and 19). The conservative model considers one antenna sector as one antenna with power equal to the sum of the power of all antennas in the sector. The conservative model can be used in situations in which it is not possible to calculate the individual contribution of the antennas, and in which it is not certain if the antennas are used as a transmitter or receiver. The contribution model creates a more accurate graphic representation of the MPE maps by calculating the contribution of each of the antennas in the sector.

Some example equations used to calculate power density for MPE maps are set forth below. In an embodiment the MPE map module 430 of FIG. 5 can calculate power density for a variety of different antennas through the use of applicable mathematical models which have been enhanced by field measurement results stored in the data base.

The following calculations can be used to predict power density levels around typical RF sources:

$$S = \frac{P \cdot G}{4\pi R^2} \quad \text{Equation (1)}$$

$$S = \frac{EIRP}{4\pi R^2} \quad \text{Equaiton (2)}$$

wherein S is power density, P is power input to the antenna, G is numeric power gain of the antenna in the direction of interest relative to an isotropic radiator, R is the distance to the center of radiation of the antenna, and EIRP is the equivalent (or effective) isotropically radiated power.

For prediction of power density near a reflective surface, a 100% reflection of incoming radiation can be assumed, resulting in a potential doubling of predicted field strength and a four-fold increase in power density. In that case Equations (1) and (2) can be modified to:

$$S = \frac{(2)^2 P \cdot G}{4\pi R^2} = \frac{P \cdot G}{\pi R^2} = \frac{EIRP}{\pi R^2} \quad \text{Equation (3)}$$

Equations (1), (2), and (3) are generally accurate in the far-field of an antenna, but will over-predict power density in the near field, where they could be used for making a "worst case" or conservative prediction. The following equation can be used to predict power density close to the antenna surface:

$$S = \left(\frac{180}{\theta_{BW}}\right)\frac{P_{net}}{\pi R h} \quad \text{Equation (4)}$$

wherein $P_{net}$ is net power input to the antenna, $\theta_{BW}$ is the beam width of the antenna in degrees, R is the distance from the antenna, and h is the aperture height of the antenna. Equation (4) can be used for any vertical collinear antenna including omni-directional antennas for which $\theta_{BW}$ would be 360 degrees.

Power density calculations may also vary based on a number of characteristics of the antenna and/or how the antenna is utilized. For example, power density may vary based on whether a frequency division duplex (FDD) spectrum or time division duplex (TDD) spectrum is utilized by the antenna. Similarly, power density may vary based on whether the antenna is configured to utilize a narrowband channel or a broadband channel.

In an embodiment, power densities may be measured using equipment (e.g., customer equipment and/or custom equipment) positioned within an operating range of the antenna (e.g., a controlled and/or restricted area of the MPE map). For example, the equipment may be configured to detect output from an antenna and measure the power across a detection area. By utilizing such equipment, the systems described herein may be configured to measure power densities for RF transmitters of wireless networks utilizing, but not limited to MIMO, Massive MIMO, antenna arrays, and beamforming algorithms, and provide proper safety instructions to ensure compliance with existing and any future RF exposure regulations.

In an embodiment, MPE maps module 436 as represented in FIG. 5 provides radiation pattern maps which show the power density limits for restricted, controlled, and general public MPE boundaries. The radiation pattern maps depicted in FIGS. 13 and 14 show two different levels of density based on the exposure limit ranges set forth in the following tables:

Controlled Exposure (limits for occupational)

| Frequency Range (MH$_z$) | Power Density (S) mW/cm$^2$ |
|---|---|
| 30-300 | 1.0 |
| 300-1,500 | f/300 |
| 1,500-100,000 | 5.0 |

General Public Exposure (limits for general population)

| Frequency Range (MH$_z$) | Power Density (S) mW/cm$^2$ |
|---|---|
| 30-300 | 0.2 |
| 300-1,500 | f/1500 |
| 1,500-100,000 | 1.0 |

FIG. 15A is a graphical representation of a MPE map from the top view perspective for three antennas with overlapping controlled and restricted areas represented. In an embodiment, these gradations include the occupational RF "restricted" and "controlled" areas based on the MPE limits. FIG. 15B is a graphical representation of a MPE map from the top view perspective for two antennas with non-overlapping controlled and restricted areas represented, and where a single antenna mathematical model was applied. FIG. 15C is an example of a side view of an antenna as represented in FIG. 15A or 15B. In these figures, L1 is the extent of the controlled areas, which is the distance in which power density reaches its limits for general public MPE. L2 is the extent of the controlled area on the back of the beam and equals L1 multiplied by the front-to-back FB ratio from database table antenna model 260. The front-to-back ratio stored in the database table 260 is obtained from the manufacturer's technical specification. L3 is the distance in which the power density reaches its limits for controlled MPE. L4 is equal to L3 multiplied by the front-to-back ratio. $L_d$ is the distance between the center of the antennas furthest apart. D is the height of the antenna.

Figure 16:
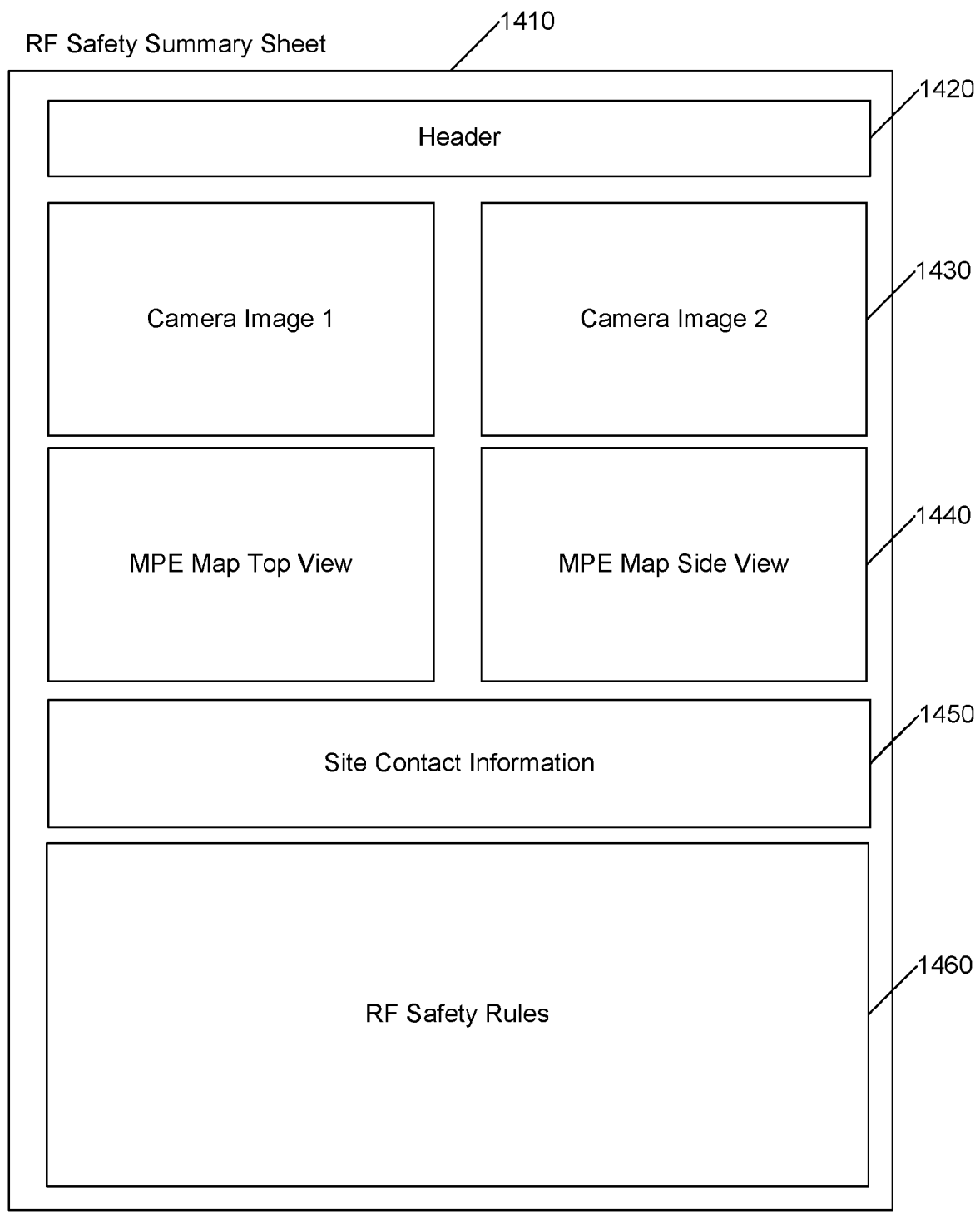
FIG. 16 is a block diagram representation of the RF safety summary sheet, according to an embodiment.

FIG. 16 is a block diagram representation of the data included in the RF Safety Summary Sheet (RF SSS) presented in the system 100 by module 431, according to an embodiment. RF Safety Summary Sheet 1410 includes header 1420 that identifies the site and the version of RF SSS, one or more camera images 1430, one or more MPE maps 1440, site contact information 1450 (e.g., for a property owner representative or licensee), and RF safety rules 1460 that describes detailed rules that the worker must follow. The system 100 uses site-specific information to provide safety information that is specific to each site.

FIG. 17 represents the power density which is created as a contribution of two antennas, according to an embodiment. C1 represents the contribution from a first antenna, C2 represents the contribution from a second antenna, and S is the power density at a particular point. Power density S is calculated as the contribution of the power densities of the first and second antennas, expressed as a percentage of the exposure limit. The graphic representation is based on calculations of the contributions of all the involved antennas in the site. Example calculations for the percent contributions of the first and second antennas are set forth in Equations (5) and (6) below:

$$C1 = \frac{S_1}{S_{1stnd}} \qquad \text{Equation (5)}$$

$$C2 = \frac{S_2}{S_{2stnd}} \qquad \text{Equaiton (6)}$$

wherein $S_1$ is the power density of the first antenna, $S_{1stnd}$ is the exposure limit of the first antenna, $S_2$ is the power density of the second antenna, and $S_{2stnd}$ is the exposure limit of the second antenna. The known variables in these equations are the position of the antennas in two dimensional space based on an X-Y coordinate system (e.g., illustrated in FIG. 11), and the limit of the power density, for example, as defined by a governmental regulation.

Figure 18:
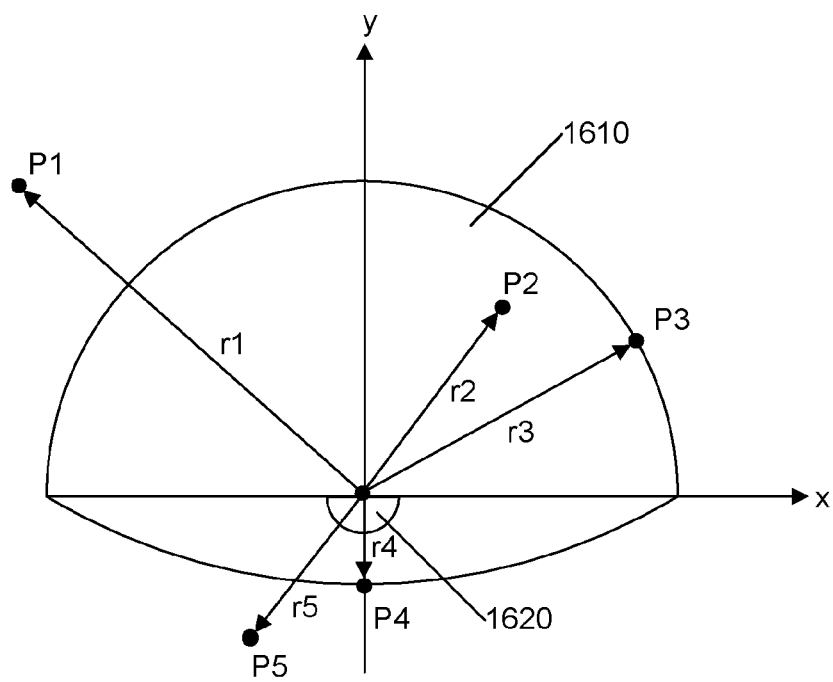
FIG. 18 represents the power density of a single antenna in different points in space, according to an embodiment.

FIG. 18 represents the power density of a single antenna in different points in space, according to an embodiment. The point P1 has a power density under the limit beyond the MPE boundaries 1610. The point P2 has a power density above the limits which falls within the MPE boundaries 1610. The point P3 falls on the outer edge of the MPE boundaries 1610 and has a power density equal to the limit, referred to as the limit point. Point P4 is at a distance r4 from the antenna, where r4 is equal to the front-to-back ratio multiplied by r3. The antenna 1620 has a front-to-back ration of 10%, and therefore, point P4 has a power density equal to the limit, as does point P3. Point P5 is located outside of the antenna's rear radiation MPE boundary 1610.

In order to calculate the power densities for a site with more than one more antenna structures, the standard MPE limits calculations should be modified in order to generate cumulative radiation patterns which include the contribution of all the individual antennas. To calculate the power density at a certain point P1 and determine whether it exceeds acceptable limits, the total sum of individual contributions of the various antennas at the site need to be calculated. $P_c$ is the calculation used to determine whether the power density at a particular site is below or in excess of acceptable limits. If $p_c$ is greater than 1, the power density is above acceptable limits. If $p_c$ is less than 1, then the power density is within acceptable limits. In order to calculate $p_c$, Equation (7) below may be used:

$$p_c = \frac{p_{a1}}{p_{s1}} + \frac{p_{a2}}{p_{s2}} + \cdots + \frac{p_{an}}{p_{sn}} \qquad \text{Equation (7)}$$

wherein $p_{a1}$ is the actual power density of antenna a1 based on r1 (distance of antenna a1 from the center of the antenna) and antenna power, $p_{s1}$ is the known limit for antenna a1, $p_{a2}$ is the actual power density of antenna a2 based on r2 (distance of antenna a2 from the center of the antenna) and antenna power, $p_{s2}$ is the known limit for antenna a2, and so on and so forth for all n antennas, and $p_c$ is a power density value that is used to determine whether or not the power density is within or exceeds a threshold limit. With this calculation, the values obtained from each antenna at a site are added together to determine if the power at the particular point in space $p_c$ exceeds the MPE limits. Even if individual radiations at a particular antenna do not reach the MPE limits, the final radiation as a contribution of all antennas may reach the MPE limits. It is important to note that power density limits for individual antennas could be different for each antenna.

FIG. 19 represents the power density contributions of two antennas to a point in space, according to an embodiment.

Specifically, the diagram in FIG. 19 represents the power density contribution of two antennas 1710 and 1720 to a point in space labeled P1. The individual radiation pattern map of antenna 1710 is shown at 1712, and the individual radiation pattern map of antenna 1720 is shown at 1722. The combined radiation pattern map for both antennas is represented by 1730.

Figure 20:
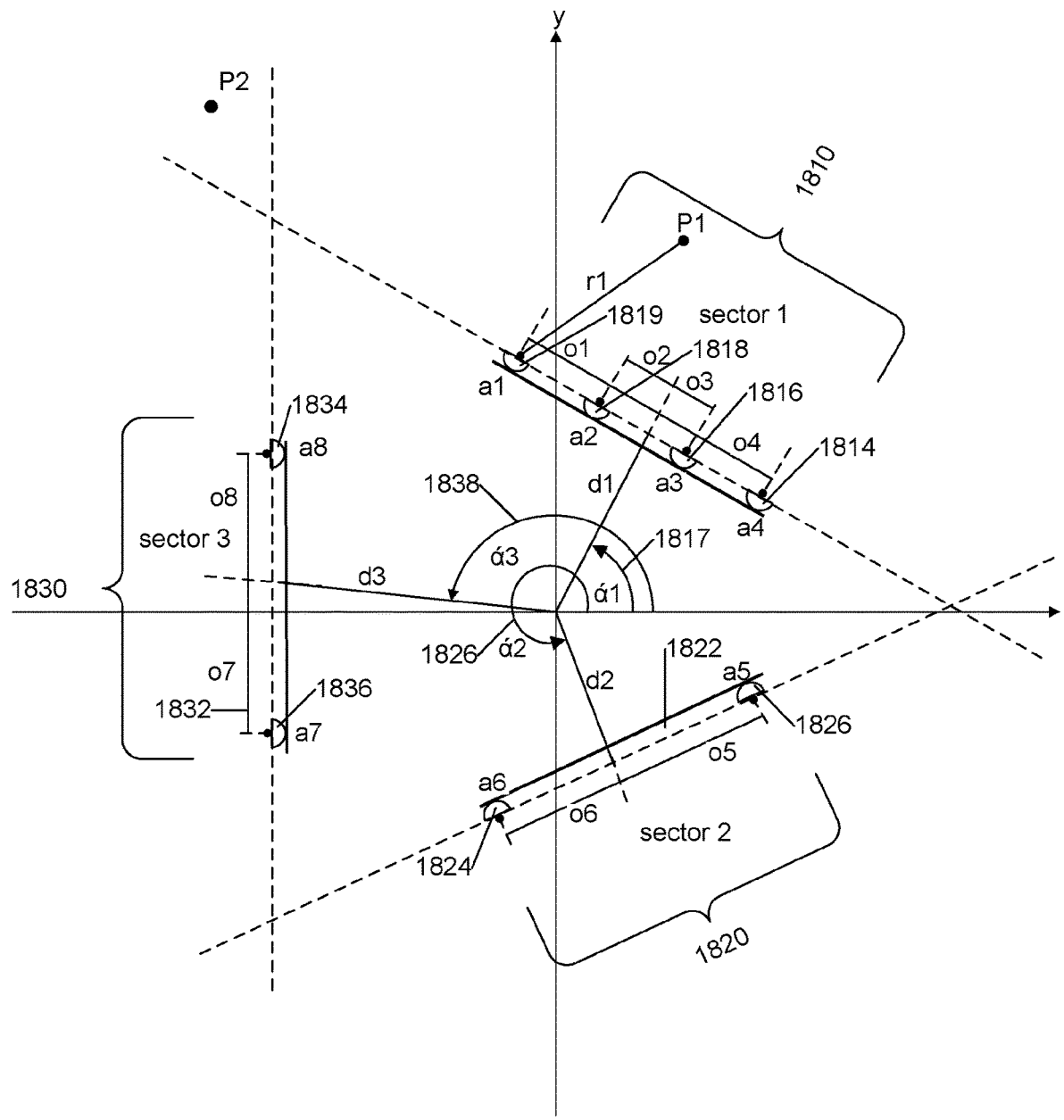
FIG. 20 represents participation of multiple antennas in the contribution model applied to an antenna array, according to an embodiment.

FIG. 20 is a diagram which represents the participation of multiple antennas in the contribution model applied to an antenna array, according to an embodiment. FIG. 20 illustrates three sectors, 1810, 1820, and 1830. The points labeled P1 and P2 are used to discuss power density at those points in two dimensional space in a contribution model. The power density at P1 is affected by antenna 1 (1819), antenna 2 (1818), antenna 3 (1816), and antenna 4 (1814), at sector 1810. All of the antennas on sector 1810 contribute to the power density at P1. The power density at P2 is affected by antennas 1819, 1818, 1816, 1814 of sector 1810 and antennas 1834 and 1836 of sector 1830. P2 is within the area where possible contributions of sector 1830 and sector 1810 overlap, and therefore, the power contributed by antennas on both sectors are taken into account.

Figure 21:
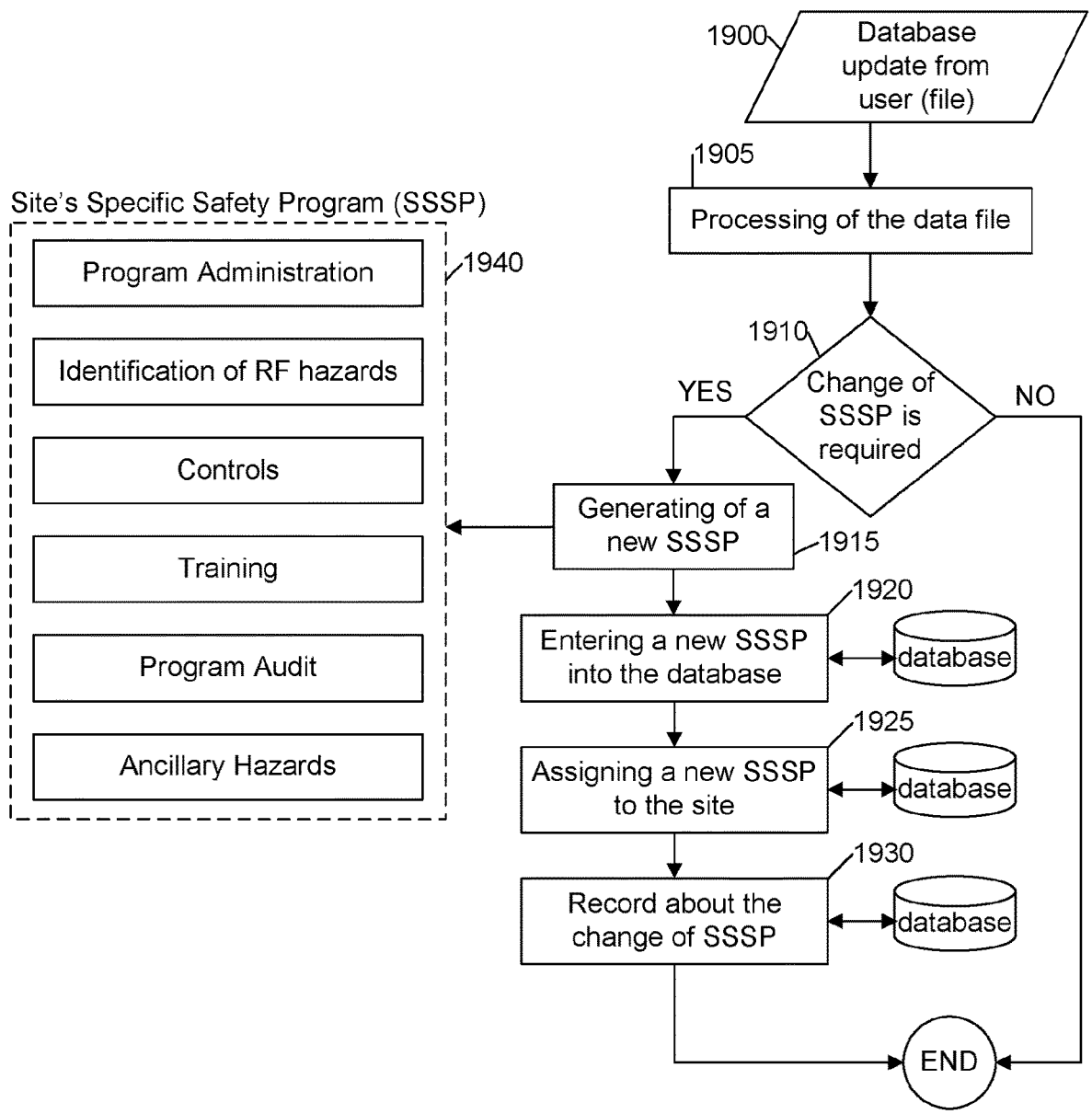
FIG. 21 is a flow diagram of an embodiment of an automated safety audit program.

FIG. 21 is a flow diagram of an embodiment of an automated safety audit program. Specifically, site-specific safety program module 433 may provide user access to a site-specific safety program (SSSP) 1940 which includes the site specific RF Safety Summary Sheet. The embodiment of an SSSP 1940, depicted in FIG. 20, contains the following categories of information: "program administration" which includes policies, RF safety officer information, contacts, and documentation; "identification of RF hazards" which identifies RF sources and MPE maps for the site; "controls" which includes energy controls, signs to look for, safe work practices, RF monitoring, and personnel protective practices; "training" which includes training programs for general public workers in areas where RF energy is too low to cause exposure above public limits, for workers in areas where energy may cause exposure above public limits, and for workers in areas where RF may cause exposure in excess of occupational limits unless workers utilize special controls, and records of who has received the training; "program audit" which contains information regarding responsibilities and audit reports; and "ancillary hazards" which can include, for example, fall protection, the identity and locations of hazardous materials at the site, lockout agent, and extreme weather precautions. The data for the SSSP is contained in the database 124 (e.g., as an entry in table 236). The automated safety audit program may update a site's safety program when relevant changes are made at the site.

Referring to FIG. 21, the automated safety audit program processes the database update file from the user at step 1900. In an embodiment, the update data file includes an array of keys and values, where "key" is the identification of the columns in the database and "value" is an updated value. If the file does not include a key for the particular database column, the process considers that the value was not changed and the current value is used if the site specific safety program (SSSP) (or the RF Safety Summary Sheet) needs to be changed. If new data is entered, the process proceeds to step 1905. At step 1905, the data entered by the user is processed by the system. The process determines if the updated values affect the existing SSSP, or if data directly include values that need to be changed in the SSSP. The following are examples of this process:

Example 1: If the input power of the transmitter is changed, this will change the location of the MPE boundaries. The MPE limits would then need to be recalculated and the existing SSSP would need to be changed. A new or modified SSSP would then be generated to replace the existing one.

Example 2: if the data update file includes a new site's RF safety officer, the information for the RF safety officer would need to be changed and a new SSSP would then be generated to replace the existing one.

Example 3: If the broadcasting frequency was changed, but it doesn't affect any part of the existing SSSP, then a new SSSP will not be generated.

Example 4: If the floor plan of a site is changed, the location of transmitters associated with the site would change relative to the boundaries of the floor. This can affect determining the exact location of a transmitter within a building. A new or modified SSSP would then be generated to replace the existing one.

At step 1910, if no change to the SSSP is required the process ends. However, if a change to the SSSP is required, the process proceeds to step 1915 where a new or modified SSSP is generated. Once a new SSSP is generated, the system proceeds to step 1920 where the new SSSP is entered into the database. At step 1925, the new SSSP is given a unique id and assigned to the site (e.g., as an entry in table 240). At step 1930, the process records the SSSP id change in the database. This record includes data on the old SSSP id, the new SSSP id, and the site identification code.

Though the foregoing description focused on the SSSP, it should be noted that the process also applies to the site-specific RF Safety Summary Sheet. Additionally, if the RF Safety Summary Sheet is updated during the process, previously issued site-specific certifications may be indicated as invalid in the database. Additionally, such an update to the RF Safety Summary Sheet can trigger the process described below in connection with FIG. 26, in which the system 100 prompts a user to obtain a certification (in this case a re-certification). Notices can also be sent by the system 100 to registered users that have received the site-specific RF Safety Summary Sheet, informing them that the old sheet is no longer valid.

Figure 22:
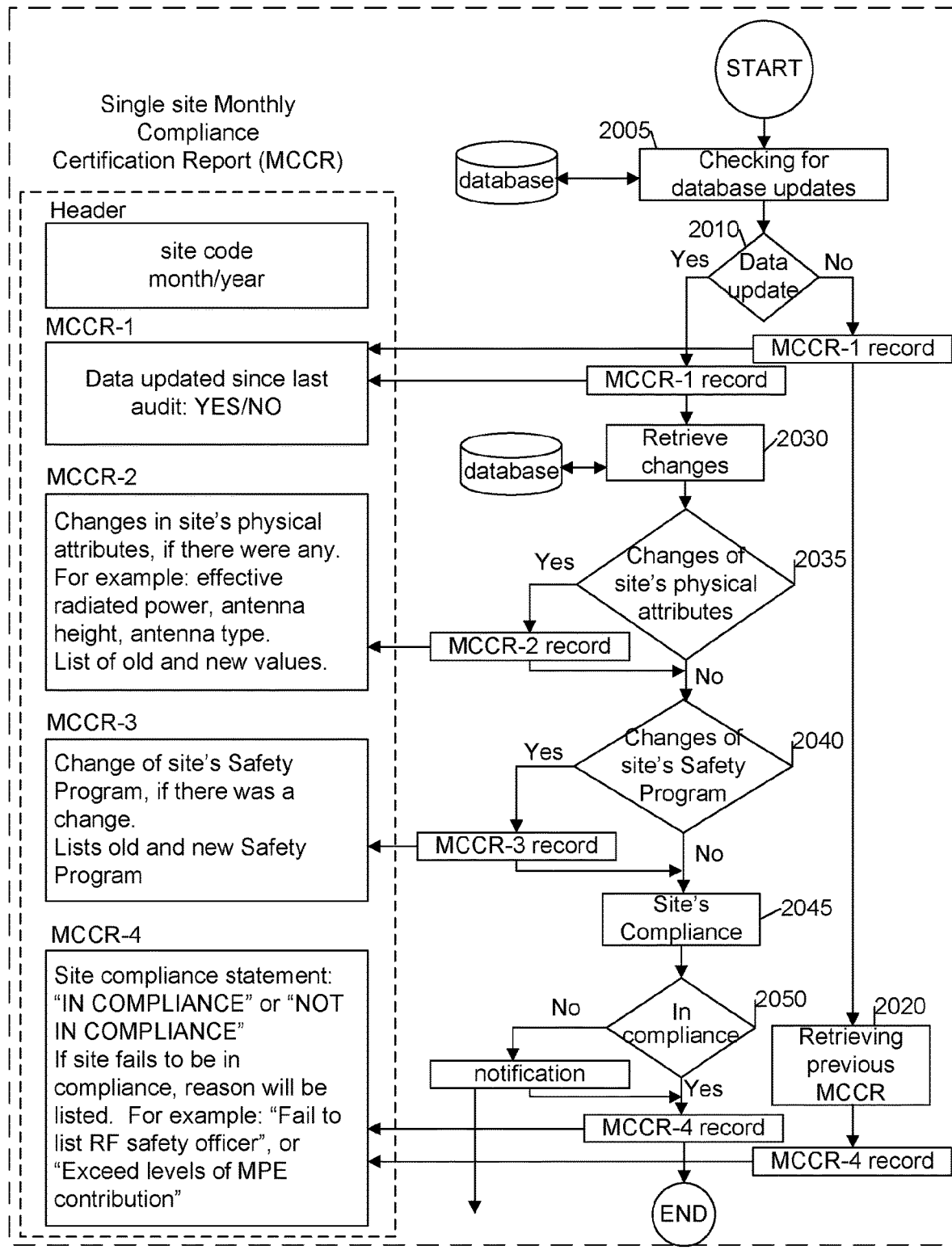
FIGS. 22 and 23 are flow diagrams of an embodiment of the automated compliance audit program.
Figure 23:
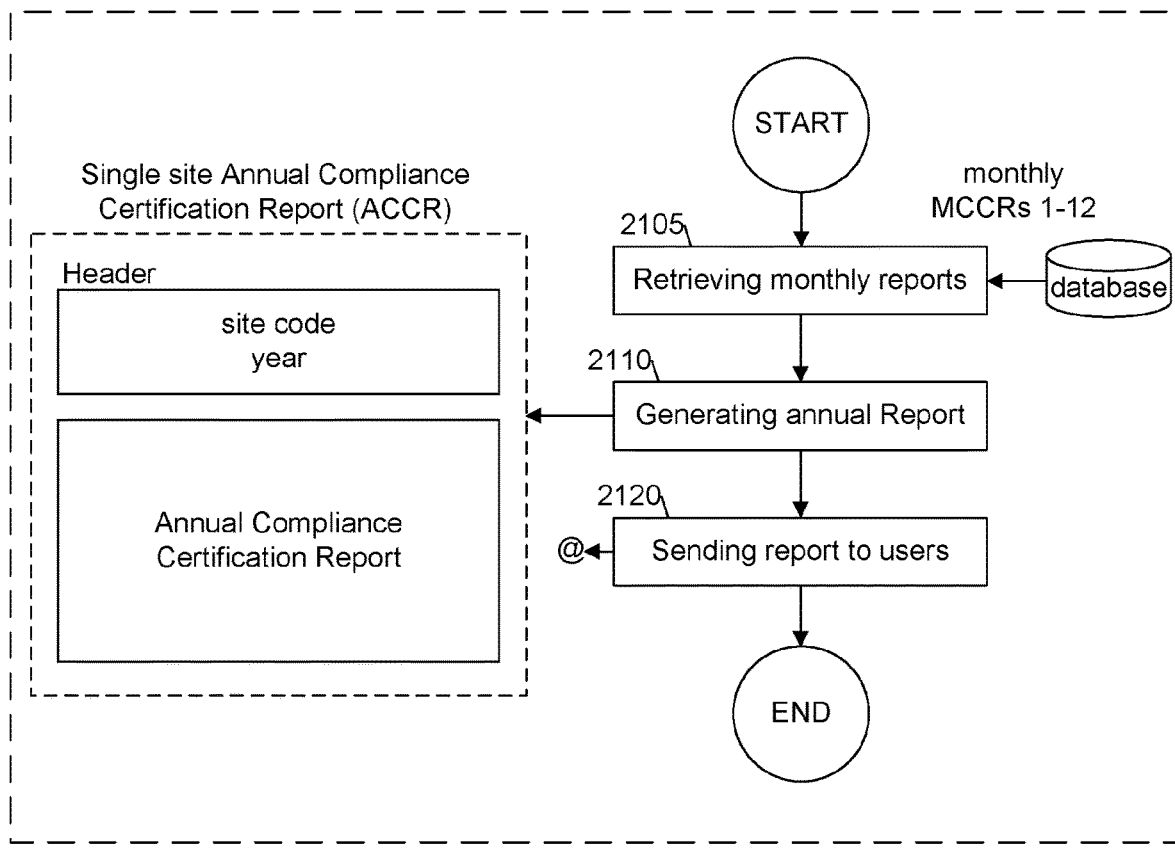

FIGS. 22 and 23 are flow diagrams of an embodiment of an automated compliance audit program (ACAP) implemented by the automated compliance audit module 446 of FIG. 5. The system executes a periodic (e.g., monthly) ACAP for every site and creates and stores a monthly compliance certificate report (MCCR) as shown in FIG. 22. In an embodiment the MCCR includes the site code, and the date (header), indicates whether the data has been updated since the last audit (MCCR-1), indicates what changes were made to the site since the last audit (MCCR-2), lists both the old and new safety programs if a new program was created (MCCR-3), and states whether the site is in compliance (MCCR-4). If the site is not in compliance, the system 100 sends a notification to the appropriate party. The system 100 can also execute an annual compliance certificate report ("ACCR") for all users and the sites they manage. The ACCR reports can be automatically generated and sent to the users as seen in FIG. 23. The MCCRs and the ACCRs are generated as computer records and/or printed. The computer records are time stamped and encrypted so that they cannot be altered. These reports are designed to meet the requirements of all applicable regulations, such as international, federal, and state regulations.

Referring to FIG. 22, at step 2005, the process checks the database for any new data updates since the last audit. At step 2010 if no data updates are found, the system generates an MCCR-1 record indicating that no changes have occurred. The process proceeds to step 2020 at which the previous MCCR is retrieved. The MCCR is updated (e.g., monthly) and used in the final site compliance statement MCCR-4. The process determines whether the site is in compliance with the current regulations applicable to that site. The system 100 includes all applicable regulations. The system 100 can also determine which regulations apply to the site. Thus, as regulations are updated in the future the system can ensure compliance with updated (e.g., current) regulations. Whether the site is in compliance is then added to the MCCR. If the site is not in compliance, the reason for the non-compliance is added to the MCCR and notification is sent to the appropriate party. For example the reason could be "failure to list RF safety officer" or "exceeds the MPE limits". Finally, the MCCR record is time stamped and encrypted so that it cannot be altered.

At step 2010, if updated data is found, the process proceeds to step 2030. At step 2030, the process retrieves data changes from the database. At step 2035, the process determines if the data changes relate to the site's physical attributes, for example effective radiated power, antenna height, antenna type, new transmitters, transmitter location, and floor plan. If the changes relate to the sites physical attributes, the process generates a list of old and new values which are stored in the MCCR, and the process proceeds to step 2040. If the changes don't relate to the sites physical attributes, the process proceeds to step 2040. At step 2040, the process verifies any change in the site specific safety program (or the RF Safety Summary Sheet) since the last MCCR. If a change occurred, the system creates an MCCR record that lists the old and new site safety program, and the process proceeds to step 2045. At step 2045, the system analyzes updated data and determines if the site is in compliance with the applicable regulations. At step 2050, if the site is in compliance, the system creates site compliance statement MCCR-4 which states "IN COMPLIANCE" and ends the process. If the site is not in compliance, the system sends notification to appropriate party, creates a site compliance statement MCCR-4 which states "NOT IN COMPLIANCE", describes the reasons for the non-compliance, and ends the process.

Referring to FIG. 23, at step 2105, the process retrieves the MCCR's from the database for the site being audited. At step 2110, an ACCR is generated by compiling all of the data from the MCCR's. The ACCR contains a site code year and an annual compliance certificate report. At step 2120, the ACCR is time stamped, encrypted, and stored in the database. Additionally, a copy of the ACCR can be sent to the user associated with the site.

Figure 24:
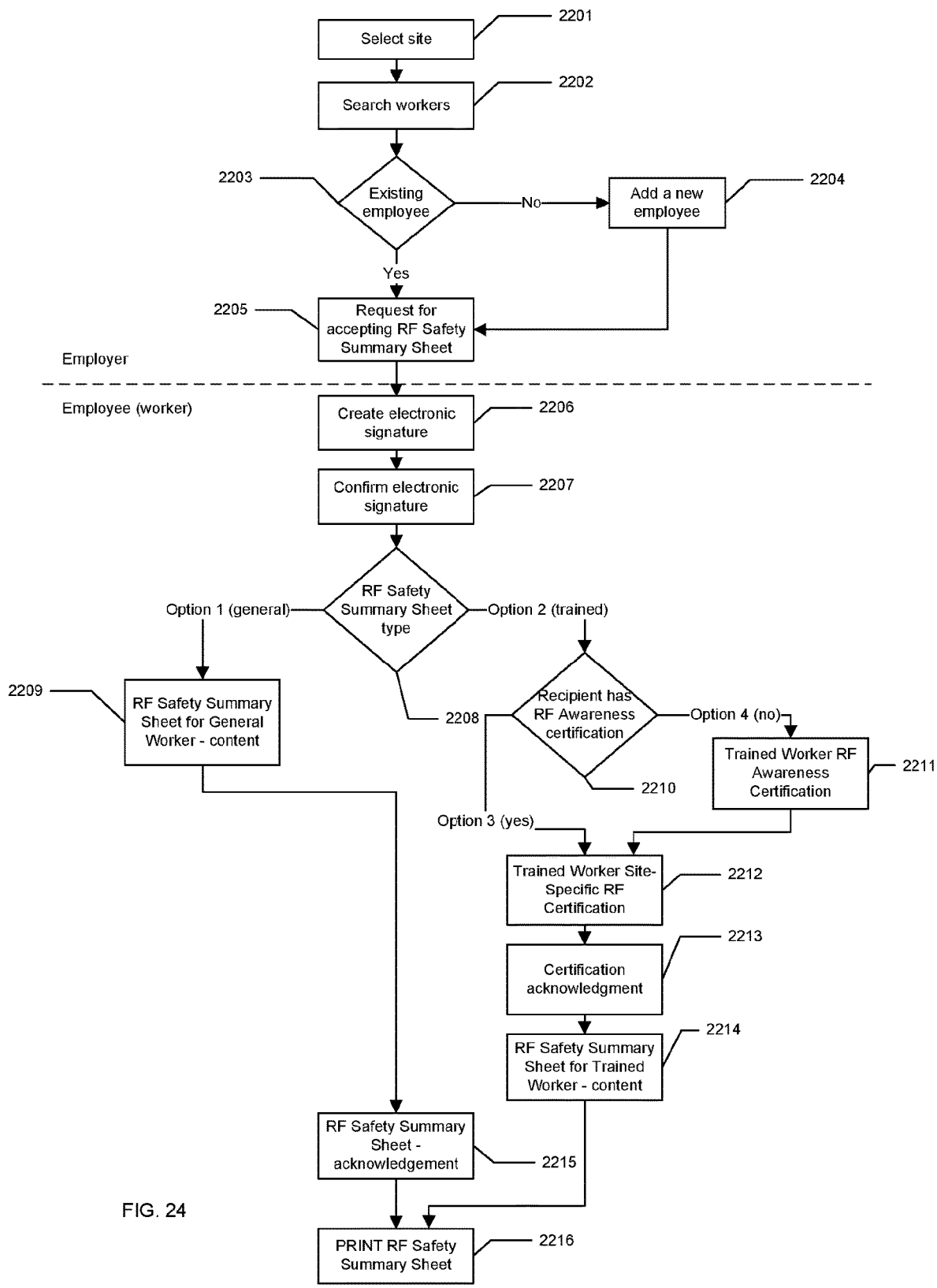
FIG. 24 is a flow diagram of functionality provided by the RF certification module 429 of FIG. 5 which allows an employer to provide his employee with site-specific RF safety summary sheets, according to an embodiment.

FIG. 24 is a flow diagram of functionality provided by the RF certification module 429, according to an embodiment. A user can access the module 429 via the site information display module 428, as was mentioned above. The module 429 allows a user to search for any worker listed in the database or only those workers that have received RF Certification step 2202. In an embodiment, the user's search is limited to employees of the user's company or organization. If the search does not present the desired employee (step 2203), the system allows the user to add a new employee to the database at step 2204. The system also provides the ability to issue the appropriate site-specific RF safety summary sheet to either type of worker (new or existing), beginning with the request sent by the employer to the employee at step 2205.

In an embodiment, the module presents all RF trained workers (employees) for the selected site at step 2202. To be qualified, the employee must have a current Worker RF Awareness Certification (e.g., certification date is equal to or less than one year old). Additionally, if the User requests general workers, the system will present all employees that do not have a current Worker RF Awareness Certification but have acknowledged the site-specific RF safety summary sheet (acknowledgement date is equal to or less than one year old). If the database indicates that the candidate (worker) has acknowledged the receipt of the current site-specific RF safety summary sheet for Certified Worker, the acknowledgement date will be presented. The system 100 determines whether the acknowledged site-specific RF safety summary sheet is identical to the current version. If the user wishes to view additional details of any selected worker, they can select the view details option. The system 100 allows the user to request that a worker become part of the system database. This request is based upon the need to provide a RF Certified or General Worker with the appropriate Site Specific RF safety summary sheet or to provide a user's worker with a Worker RF Awareness Certification. If the user is adding a new worker (step 2204), the user can select the month and day of the birth date of the desired worker, the last 4 digits of the desired worker's Social Security Number (SSN) (or other identifier), and worker's first and last name. When the user has entered the above fields, the use can select the lookup function, and the system 100 will determine whether the worker was previously entered into the system 100. The system 100 will perform an exact match on date of birth and the last 4 digits of the worker's SSN. If the worker is found in the database, an informational message will be presented, and the contact information fields will be filled with the information contained in the database. If the worker is not duplicated, the user can provide the additional information about the worker, such as title, address, email address, phone number, and/or the like.

At step 2205, the user can select a "Provide Site Specific RF safety summary sheet by Email" option. Then, the system 100 will validate that the selected worker has an associated email. If the email exists, the system 100 annotates the date and time that the request was sent. The system 100 also creates a secure link and sends an email to the selected worker. If the user selects the Provide on-site option, the system 100 will annotate the date and time that the worker was presented the electronic signature screen. If the user stops the process before selecting the Provide Site Specific RF safety summary sheet option, the system 100 will logoff the user to restrict the worker's system access privileges.

A worker electronic signature page is implemented by the module 429 as represented by steps 2206 and 2207 and provides reasonable evidence that the intended worker is the individual that will participate in the Trained Worker RF Certification and/or Trained Worker Site Specific RF Certification. At step 2206, the worker enters their date of birth month and day, last 4 digits of their Social Security Number, and their first and last name. The system 100 performs an exact match on date of birth, the last 4 digits of the worker's SSN, and the worker's last name. Upon all fields successfully matching, the worker will be presented with the Electronic Signature Confirmation page at a computer station being used by the worker at step 2207. The purpose of the Worker Electronic Signature Confirmation page is to affirm and record that the worker accepts the presented signature as an authorized and binding signature. The Worker Electronic Signature Confirmation screen presents the worker's personal and contact information as read-only information. It will also "stylize" the first and last name of the individual. Lastly, it will stylize the first and last name initial as the individual's electronic initials. The individual may select the "I accept my electronic signature" or Cancel option. If the individual selects the "I accept my electronic signature" option, the system will determine the appropriate site-specific RF safety summary sheet to present to the individual (Step 2208).

If the individual was requested for Trained Worker RF Certification only, the system 100 will present the current version of the certification. The system 100 will create a secure (unique) document id that is comprised of the following: First Name, Last Name, Birth Date, Last 4 digits of the worker's SSN (or other identifier), system date and time, and Document ID. The Document ID is the Document Name and Version number. For example WGRFAC-V1.7 would indicate Trained Worker RF Certification, version 1.7.

Based on the request type from the worker's employer, the system 100 will choose next steps in the process as represented by step 2208. Option 1 is for a General Worker-Site Specific RF Safety Summary Sheet for General Worker. If the individual was requested for a Site Specific RF Safety Summary Sheet for General Worker, the system will present the Site Specific RF Safety Summary Sheet for General Worker as indicated at step 2209. The General Worker then can acknowledge to the system the RF Safety Summary Sheet for General Worker at step 2215. In step 2216, the General Worker can print the Site-Specific RF Safety Summary Sheet for General Worker.

Option 2 is for a Trained Worker-Site Specific RF Safety Summary Sheet for trained Worker. In order to receive the Site Specific RF Safety Summary Sheet for a trained Worker, the worker must complete the Trained Worker RF Certification and Trained Worker Site-Specific RF Certification provided by the system. The system 100 will determine first whether the individual has a valid Trained Worker RF Certification (Step 2210). If the worker has a valid Trained Worker RF Certification (Option 3 in Step 2210), the system 100 proceeds to step 2212. If not (Option 4 in Step 2210), the system 100 causes the worker to first complete the Trained Worker RF Certification (Step 2211) and the system 100 then continues to step 2212.

After completion of the Trained Worker Site-Specific Certification (Step 2212), the worker can acknowledge his certifications (Step 2213) and this is indicated in the database. Once acknowledged, the worker can proceed to step 2214. At step 2214, the system presents the Site-Specific RF Safety Summary Sheet for Trained Worker. The Trained Worker then can acknowledge the RF Safety Summary Sheet for Trained Worker (Step 2215), and the acknowledgement is indicated in the database. In step 2216, the Trained Worker can print the Site-Specific RF Safety Summary Sheet for Trained Worker. The acknowledgement screens present the individual's name, current date & time, the specific site address, and the system-generated Secure Document ID created at the beginning of the process. The individual's previously accepted signature will be created and presented when the Sign option is selected.

Figure 25:
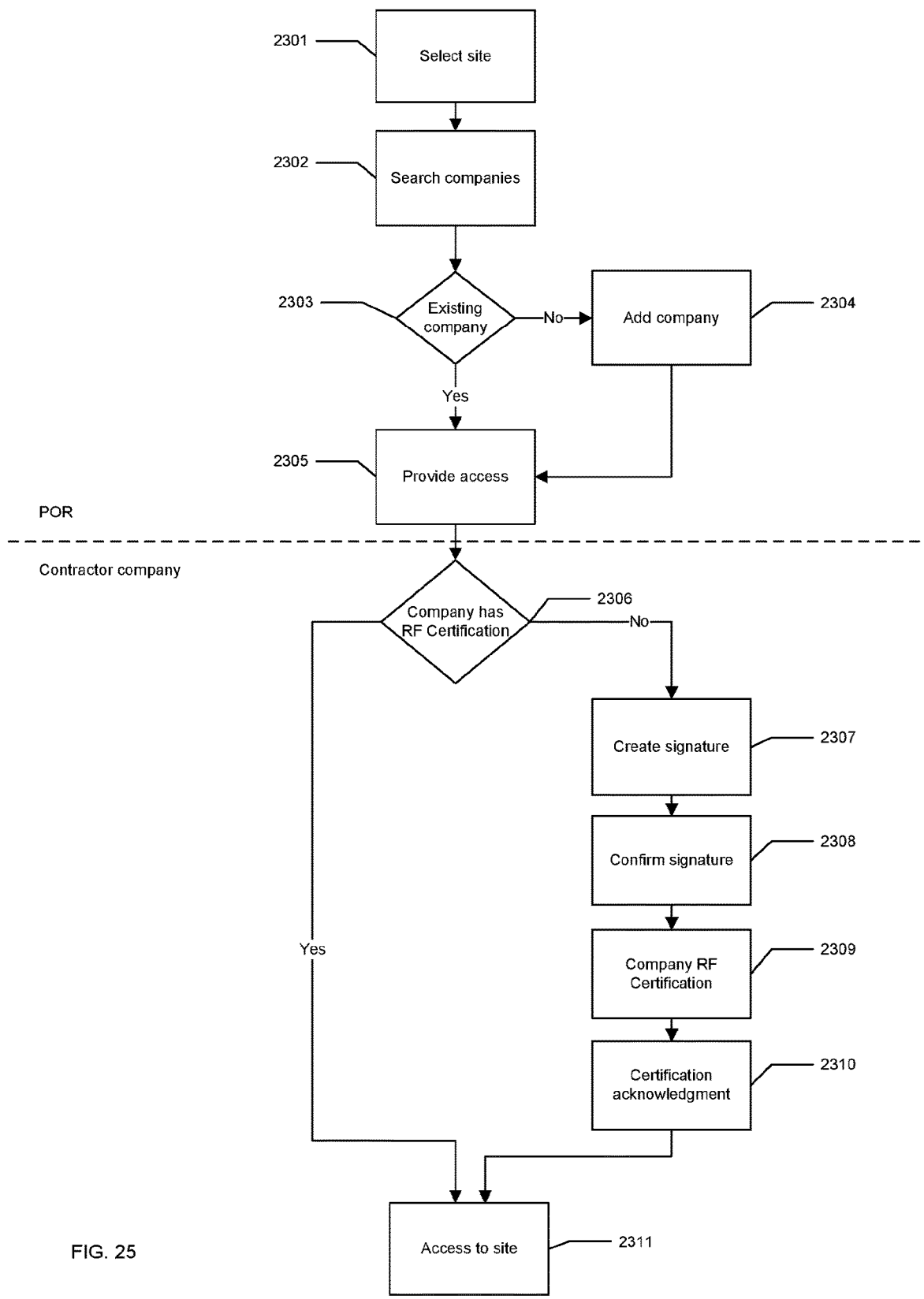
FIG. 25 is a flow diagram of further functionality provided by the RF certification module 429 of FIG. 5 which allows a user to provide contractor companies the system functionalities of site access, training and certification similar to that provided for employees, according to an embodiment.

FIG. 25 is a flow diagram of further functionality provided by the RF certification module 429 of FIG. 5, which allows a user to provide contractor companies the system functionalities of site access, training and certification similar to that provided for employees, according to an embodiment. This functionality addresses the need to provide a RF Trained or General Worker of a subcontractor with the appropriate RF Safety Summary Sheet and to provide a subcontractor's workers with Trained Worker RF Certification.

After a site is selected at step 2301, the module 429 allows the user to find, in the database, companies (e.g., subcontractors) that are certified who also may have workers who possess a Trained Worker RF Certification, Site-Specific RF Safety Summary Sheet for General Worker Acknowledgement, or Site-Specific RF Safety Summary Sheet for RF Trained Worker Acknowledgement (e.g., including Site-Specific RF Certification for Trained Worker). The system 100 also allows the User to view details about a selected company or to begin the process of adding a new company to the database. At step 2302, the system 100 provides the results of all companies, for example, with the closest company presented first and all others in ascending distance from the selected site. Information regarding the company can be presented, such as Company name, Company Address, Number of workers with Trained Worker RF Awareness Certification, Number of the company workers that possess a valid Site-Specific RF Safety Summary Sheet for RF Trained Worker, Number of the company workers that possess a valid Site-Specific RF Safety Summary Sheet for General Worker, and/or the like. The quantity represents the number of workers that possess a valid Site-Specific RF Safety Summary Sheet. To be considered valid, the Site-Specific RF Safety Summary Sheet should be of the same version as the current version. The user may also search for a specific company name at step 2302. This system 100 may present an ever-narrowing list of names by conducting a fuzzy match lookup as the user inputs information. For example, as the user begins their typing, the system 100 can return all names that best match the sequence of letters entered so far. The name can be presented along with the alphabetically ascending city and state in parenthesis. The user may also select a specific Company Type at this step. If the user wished to view additional details of any selected company, the user can select the View Details option and the system 100 will present additional information from the database related to that company. If the user wishes to add a company to the system 100, the user can select the Add New option. If the user is adding a new company (Step 2304), the user may enter the desired company's 9 digit Employer Identification Number (EIN) or combination of sole proprietor's last name, date of birth, and last 4 digits of SSN (Social Security Number), or other selected identifier. When the user enters a company identifier such as a Company EIN or sole proprietor's last name, date of birth, and last 4 digits of SSN, they can select the lookup function to determine whether the company was previously entered into the system 100. The system 100 can perform an exact match on, for example, Company EIN or sole proprietor's last name, date of birth, and last 4 digits of SSN. If the company is found in the database, an informational message is presented and the contact information fields will be filled with the information contained in the database. If the company has not been previously entered, the user can create a new entry by entering the name, title, email address, phone numbers, company name, and address. When the user is satisfied with the entries, the user select Add to record the information in the database.

At step 2305, after the user has selected the desired company and wishes to provide that company access to their Site-Specific RF Safety Summary Sheets, the user can select the Provide Company Access option. Selection of the Provide Company Access option causes the system 100 to associate the selected site with the company (if not already associated) and send an email notification to the company (e.g., to a selected authorized officer of the company) alerting them to the potential request for services. The system 100 determines whether or not the company has obtained their Company RF Certification, or no longer possesses a valid certification status (Step 2306), and if not, the system 100 directs the company or its authorized officer to the Company RF Certification procedure, represented by steps 2307, 2308, 2309, and 2310. A purpose of the Company Electronic Signature page is to provide reasonable evidence that the intended company is the company that will participate in the RF Certification tutorials.

At step 2307, the Company Electronic Signature page is presented to a user, for example, by the user clicking on or following a secure link received by an email sent by the system 100. The sending of the email with the secure link can also be triggered by a system background task that determines when a company's certification becomes due. In that case, the system 100 automatically sends out a re-certification email with a similar secure link as is sent for a new company. The information text in the email may be prefaced with the company's responsible party's name & the company's name. The Login ID will contain the email address of the recipient. The authorized individual can enter an identifier, for example, the company name and their 9 digit Federal Employer ID or sole proprietor's last name, date of birth, and last 4 digits of SSN. The authorized individual also enters a valid password and reconfirms the password. If the values entered by the authorized individual match those entered by the user, the company record is created with the Login ID and Password recorded in the database. Upon all fields successfully matching, the system 100 will present the authorized individual with the Electronic Signature Confirmation page represented by step 2308.

A purpose of the Company Electronic Signature Confirmation page is to affirm and record that the user accepts the presented signature as an authorized and binding signature. In the Company Electronic Signature Confirmation screen the system 100 can present the company information as read-only information. It may also "stylize" the first and last name of the authorized individual to simulate an actual handwritten signature. Lastly, it may stylize the first and last name initial as the authorized individual's electronic Initials. The "I accept my electronic signature" option is enabled as is the Cancel option. If the user selects the "I accept my electronic signature" option, the system creates a secure (unique) document id. The document id can be comprised of the following: First Name, Last Name, EIN or sole proprietor's date of birth and last 4 digits of SSN, system date and time, and Document ID. Document ID may comprise the Document Name and Version number. For example GRFC-V1.7 would indicate RF Awareness Certification, version 1.7. This secure document id becomes part of the company's database history and can be used to provide evidence that the authorized company completed the specific training that is/was contained in the referenced document. After acceptance, the system 100 will present the content of the applicable RF Certification tutorial and tests as represented by step 2309. The RF Certification tutorial and tests can be those discussed above in connection with Tutorial table 320. The operation of the tutorial and test is discussed further below.

After the completion of all of the tutorial sections and passage of the certification tests, a final signature may be obtained as represented by step 2310. At this step, the system 100 presents the individual's name, current date and time, and the system-generated Secure Document ID created at the beginning of the tutorial process. The individual's previously accepted signature will be created and presented when the Sign button is selected. Selection of the Sign button will present the individual's signature created in the Company Electronic Signature page. After this, the user is enabled to access the system 100 as represented by step 2311. For example, the user can be presented with a Continue to Web Site button.

Figure 26:
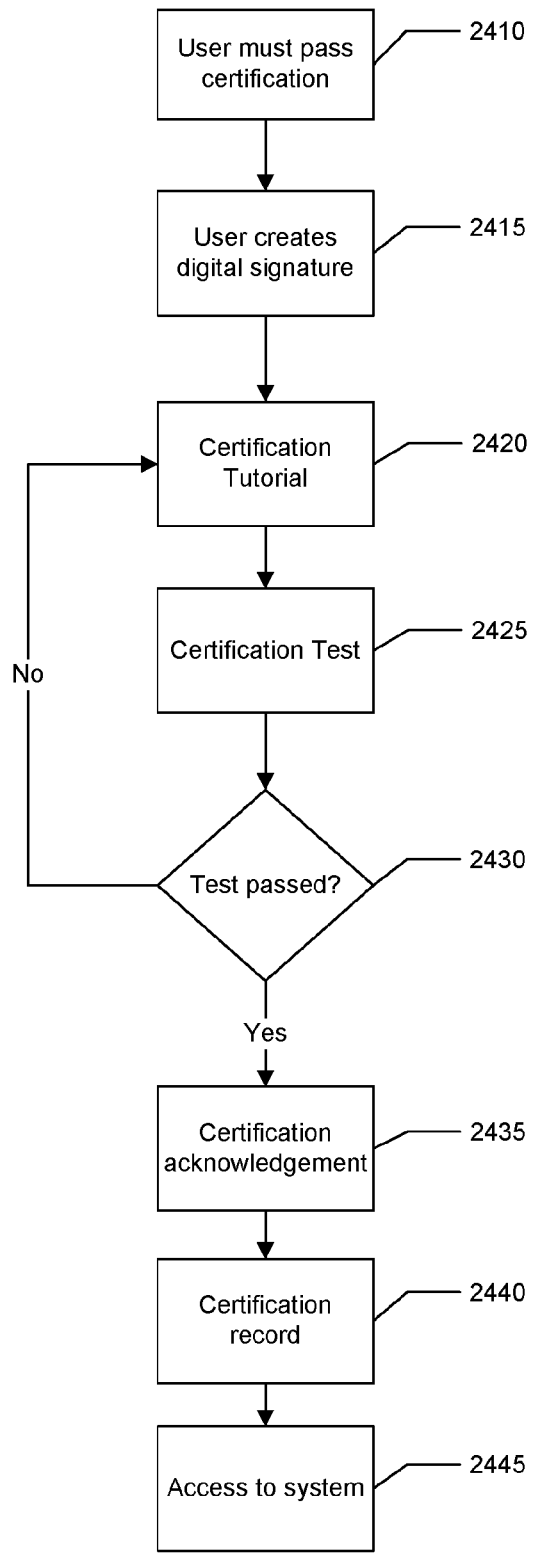
FIG. 26 is a flow diagram of further functionality provided by the RF certification module 429 of FIG. 5 which ensures a user's required RF certification before starting to use the system, according to an embodiment.

FIGS. 25 and 26 are flow diagrams of processes for a user to obtain certification which can be implemented by the RF certification module 429 of FIG. 5, according to an embodiment. For example, this process can be used whenever the system 100 requires a user to have a type of certification, as represented by FIG. 26 or at the request of a user as represented by FIG. 27.

Referring to FIG. 26, the system 100 determines that a user requires certification which is represented by step 2410. The system 100 then directs the user to the beginning of the process for the appropriate certification. The user then creates a digital or electronic signature as represented by step 2415. That process has been described in connection with step 2206 of FIG. 24. Next, the user is taken through a certification process as represented by steps 2420, 2425 and 2430. In an embodiment, the certification process starts with the tutorial contained in the Tutorial table 320. The content of the certification process can be based upon government safety rules or laws or can be selected by the system operator. In an embodiment, the process is an interactive tutorial. Alternatively, written materials can be provided electronically. The certification process includes presenting a test to the user at the end of the tutorial as represented by step 2425. The test and the questions may be stored in the tables 325 and 330 At step 2430, the system compares the user's test score with a minimum score on the test that is required in order to obtain the certification. If the user's score is less than the minimum required score, the user may be redirected back to step 2420 (i.e., certification tutorial). If the user passes the test, the user can acknowledge the certification (2404), and this is recorded in the database. At step 2440, the system 100 creates a record about the user certification using table 340. At step 2445, access to the system 100 is granted to the user, and the user is directed to an initial page such as are implemented by modules 422 and 424.

Figure 27:
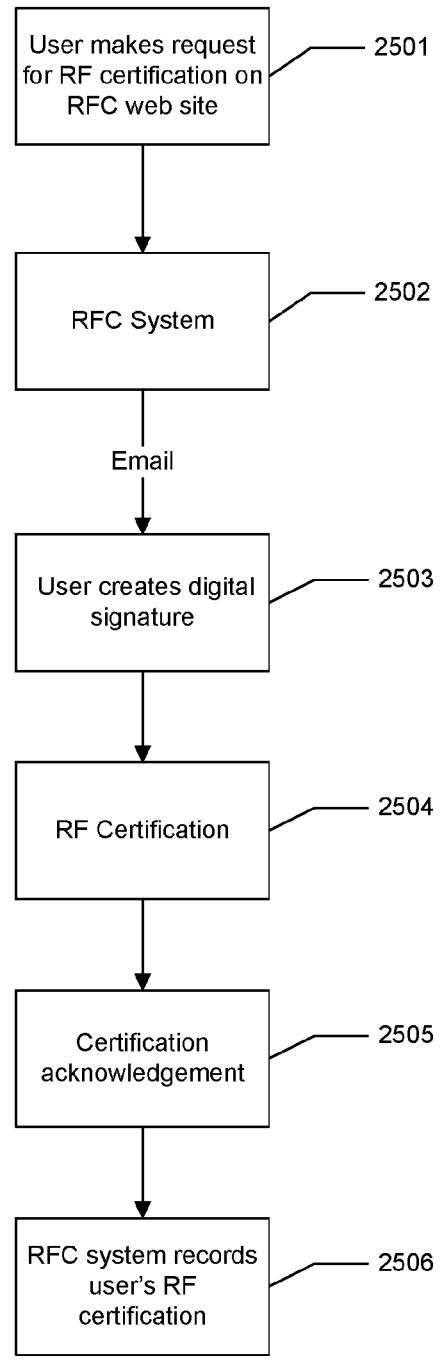
FIG. 27 is a flow diagram of further functionality provided by the RF certification module 429 of FIG. 5 which allows user to be RF certified upon his own request, according to an embodiment.

Referring now to FIG. 27, a similar process for a user to obtain a certification at the request of the user is shown. The process can begin with a user making a request for a certification, for example at a public page provided by the system 100, such as a home page, which is represented by step 2501. The system 100 then directs the user to the beginning of the process for the appropriate certification (2502). The user then creates a digital or electronic signature as represented by step 2503. That process has been described in connection with step 2206 of FIG. 24. Next, the user is taken through a certification process as represented by step 2504. The content of the certification process can be based upon government safety rules or laws or can be selected by the system operator. In an embodiment, the process is an interactive tutorial. Alternatively, written materials can be provided to the user electronically. The certification process includes presenting a test to the user at the end of the tutorial. A minimum score on the test can be required in order to obtain the certification. That process has been described in connection with steps 2420, 2425 and 2430 of FIG. 25. The user can then acknowledge the certification (2505), which may be recorded in the database (2506).

Figure 28:
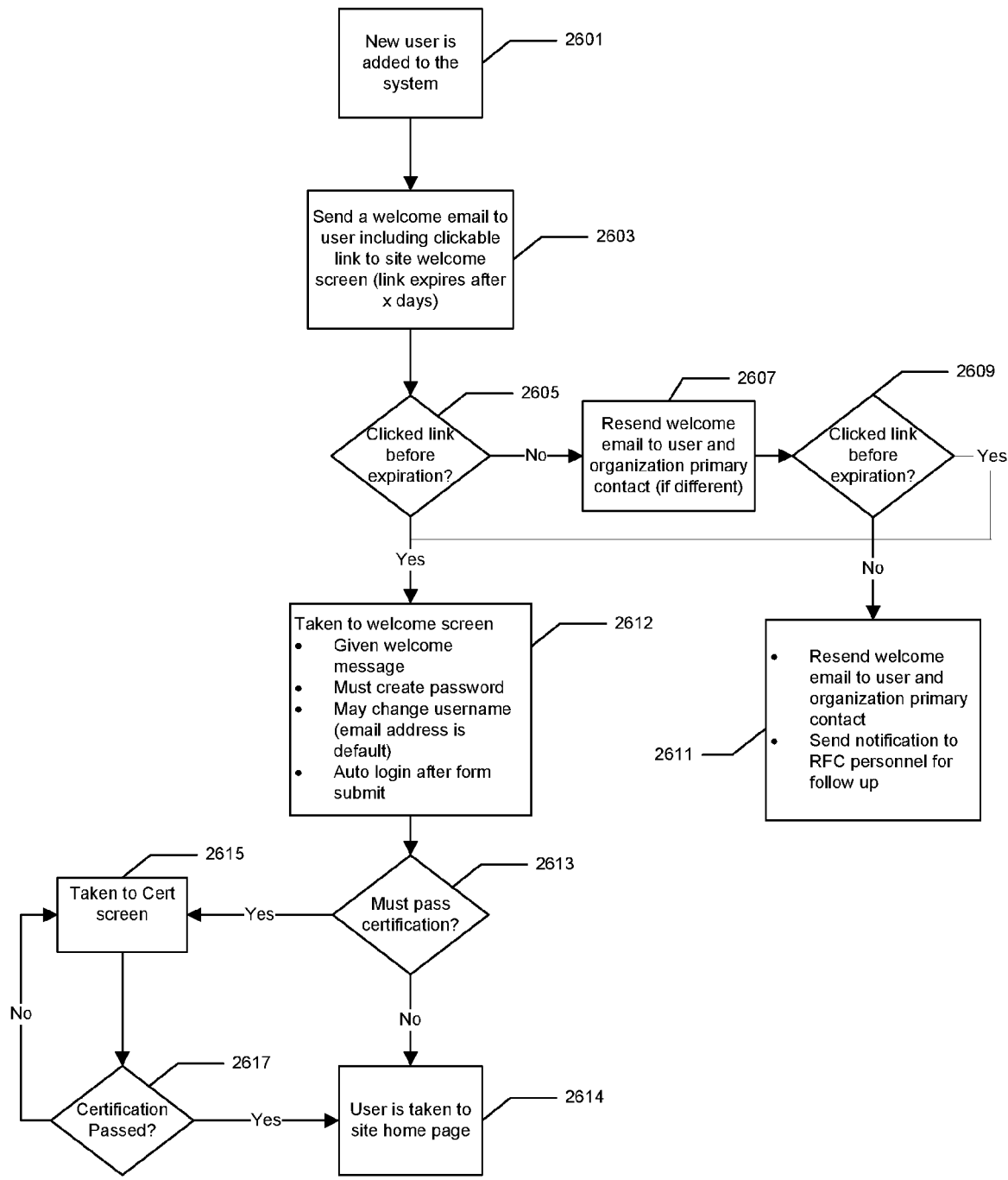
FIG. 28 is a flow diagram of further functionality provided by the RF certification module 429 of FIG. 5 and shows in details user's account activation including required RF certification, according to an embodiment.

FIG. 28 is a flow diagram of further functionality which can be provided by the RF certification module 429 of FIG. 5. In general, the method shown in FIG. 28 is an example of how the module allows new users to be added and sends the new user an invitation (e.g., an email) to begin the certification process if required.

Referring to FIG. 28, an administrator or existing user can add a new user by enter certain data about the new user, such as a name and email address as represented by step 2601. The system 100 then contacts the new user, for example, by sending an email with a link (step 2603). At step 2605, if the link is not activated before it expires, the email is re-sent (step 2607) and others can be notified. If the new user again fails to respond (step 2609), others can again be contacted and the email can be re-sent again (step 2611).

When the user responds to the invitation, they are taken through a welcome and registration process (step 2612). New users that need to pass certification (step 2613) are directed to a certification process represented by steps 2615 and 2617. This can be the process represented by FIG. 26. The content of the certification process can be based upon government safety rules or laws or can be selected by the system operator. A test can be presented to the user at the end of the tutorial (step 2617) and a minimum score on the test can be required in order to obtain the certification. Then, the user is directed to an initial page such as are implemented by modules 422 and 424 shown in FIG. 5.

Besides the method described above, the system 100 may also allow users (e.g., a worker or a sub-contractor) to initiate their certifications by clicking on a link or activating a button in other screens of the system 100 such as the public web site (step 2501). The system 100 then processes the user request and sends the user an email that contains a link to certification screens (step 2502). Completion of the Trained Worker RF Certification allows the worker to accelerate the worker's future request for Site-Specific RF Certification by skipping step 2211 of FIG. 24. By completing the Trained Worker RF Certification, the worker also becomes part of the database system and is listed in the system as a RF trained worker. The worker becomes visible for other users of the system 100 seeking a worker with an RF Trained Worker Certification. Completion of the Company RF Certification allows a company to accelerate a future request for accessing the system 100 by skipping steps 2307-2310 from FIG. 25. By completing the Company RF Certification, the contractor company also becomes part of the system 100 and is listed in the database as a company with RF Certification. The Company becomes visible (searchable) for other users of the system 100 seeking a company with RF Certification.

In at least one non-limiting embodiment, the systems and methods described herein provide for a computerized RF safety system and method for calculating, measuring and viewing electromagnetic field and electromagnetic exposure information (sometimes also referred to herein as RF exposure information) from RF transceiver equipment (e.g., antennas and/or transmitters as described throughout the present disclosure) that provides wireless coverage and services for wireless networks, relating to (but not limited to) 5G public and private wireless network. An embodiment may comprise a computer-accessible database (e.g., database 124 of FIG. 1) for storing electromagnetic field and electromagnetic exposure information including physical locations and utilization characteristics of networks and wireless signals, for example, as described herein. The systems may also provide for receiving, collecting, processing, and storing data from a plurality of sources about characteristics of wireless networks and installation locations, including outdoor locations and indoor locations. For example, locations may include a public area, such as a park, street, building, and/or the like, and private areas, such as buildings, parkways, land, and/or the like. Power densities for RF system equipment may be calculated and/or measured and used for generating a MPE maps, and RF safety programs. In an embodiment, the MPE maps and/or RF safety programs may be related to total transmission power from antennas of the RF system, for example but not limited to, antenna arrays for MIMO, Massive MIMO, and beamforming solutions. In an embodiment, alone or in combination, the MPE maps and/or RF safety programs may be related to frequency bands utilized, including the lower frequency band, mid frequency band, and high frequency band (millimeter wave), as described above. Power density calculations may vary based on several different factors. For example, they may vary based on FDD or TDD spectrum utilization and/or narrowband or broadband channel utilization. Alternatively, or in combination, power density measuring equipment may be utilized to measure power densities for RF transceiver equipment of wireless networks utilizing, for example, MIMO, Massive MIMO, antenna arrays, and beamforming algorithms.

In an embodiment, radio frequency safety certification of RF transceiver equipment and their associated antenna locations and configurations may be used by the system to automatically ensure compliance with existing and any future RF exposure regulations. For example, systems and methods here may be configured to identify current and update operating parameters, calculate MPE maps and compare these maps against current and/or update regulations to ensure compliance. Additional details are provided above in connection with FIGS. 21-26. Additionally, an embodiment may provide for periodic RF safety auditing of RF transceiver equipment, associated locations, and configuration to ensure compliance with existing and any future RF exposure regulations, as described above in connection with FIGS. 21-23.

In an embodiment, RF safety certification may be utilized by the system to provide insurance and indemnify the wireless network owner, operator, site owner, and employers against any RF exposure claims. For example, by performing the various methods described herein, a record may be established of compliance with the regulations, thereby countering any claim against the wireless network owner, operator, site owner, and employers.

An embodiment herein may include a plurality of sensors, for example, a number of IoT sensors forming a network hosted by a 5G wireless cell. The sensors may be configured to detect unwanted and/or unintended access (both physical and electrical) to the RF transceiver equipment. Sensors and cameras may be utilized by the systems described herein to monitor any access to one or more antenna locations, which may cause the system to trigger an automated modification of RF transceiver characteristics to ensure compliance with existing and any RF exposure regulations. Furthermore, in some implementations, utilizing sensors in connection with RF safety system may provide information about security, attendance, and status of RF transceiver equipment and their associated antenna locations. Additionally, sensor outputs may be utilized in conjunction with operating parameters, use cases and/or AI systems to trigger automated modification of RF transceiver characteristics to ensure compliance with existing and any RF exposure regulations.

In an embodiment, the systems may be configured to remotely modify antenna operational characteristics, for example, over a wireless network. The system may receive a request to access an area surrounding an antenna. In an embodiment, modification of individual antenna nodes of wireless network may be triggered by a request from a user seeking access to perform work in proximity of one or more antennas. The system may then process this request, for example, the system may be in wireless communication with one or more antennas and transmit control signals over the network to instigate modification of the operating characteristics of at least one of the antennas. By remotely modifying the operation characteristics of the one or more antennas, the systems described herein can ensure a user's compliance with existing and any future RF exposure regulations. In an embodiment, the request and resulting processing may be recorded in a database.

The systems and method described herein may also be implemented to model proposed wireless networks. For example, a proposed network may utilize, but not limited to, MIMO, Massive MIMO, antenna arrays, and beamforming algorithms. The specifications of the RF transceiver equipment may be received and analyzed to generate a model of the site. For example, a MPE map may be determined based on the proposed network and specifications of the equipment. By calculating power densities and MPE maps, the proposed network may be modified and optimized to ensure compliance with existing and any future RF exposure regulations.

The systems and methods may collect and maintain information about all sources of RF radiation within commercial and public structures in a computer database, including, but not limited to 5G networks and equipment servicing 5G networks. In one aspect this is a living database comprising millions of structures, including their associated RF transmitting devices and unique characteristics. The RF transmitting devices may include one or more of antenna arrays configured for MIMO, Massive MIMO, and beamforming algorithms and may be configured to utilize low frequency band, mid frequency band, and high frequency band (millimeter waves). Sensors may be deployed with or near RF transmitting devices. The sensors may be configured to provide different types of information for detecting various environmental events in the area surrounding corresponding transmitters. For example, sensors may be used for monitoring security, confirming attendance by a first responder or other certified personnel, and surveillance of the site.

The database may include energy transmissions information including site specific physical locations, site layouts, and the exact positions of all sources of RF radiation located on site, including their vertical positions and utilization characteristics. The system can deliver MPE maps of radio frequency radiation and site-specific safety programs to anyone working in or visiting areas containing wireless transmitters. The system creates and displays MPE maps and radiation patterns showing gradation power densities to identify exposure dangers.

An embodiment may be implemented using a combination of both hardware and software. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Further still, those of skill in the art will appreciate that the various illustrative logical blocks, modules, circuits, and method steps described in connection with the above described figures and the embodiments disclosed herein can often be implemented using each of the logical blocks, modules, circuits, and method steps or fewer than all of the logical blocks, modules, circuits, and method steps. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention. References to a "page" refer to a visual display of information such as a web page or other representation of information presented to a user on a computer display device.

Figure 29:
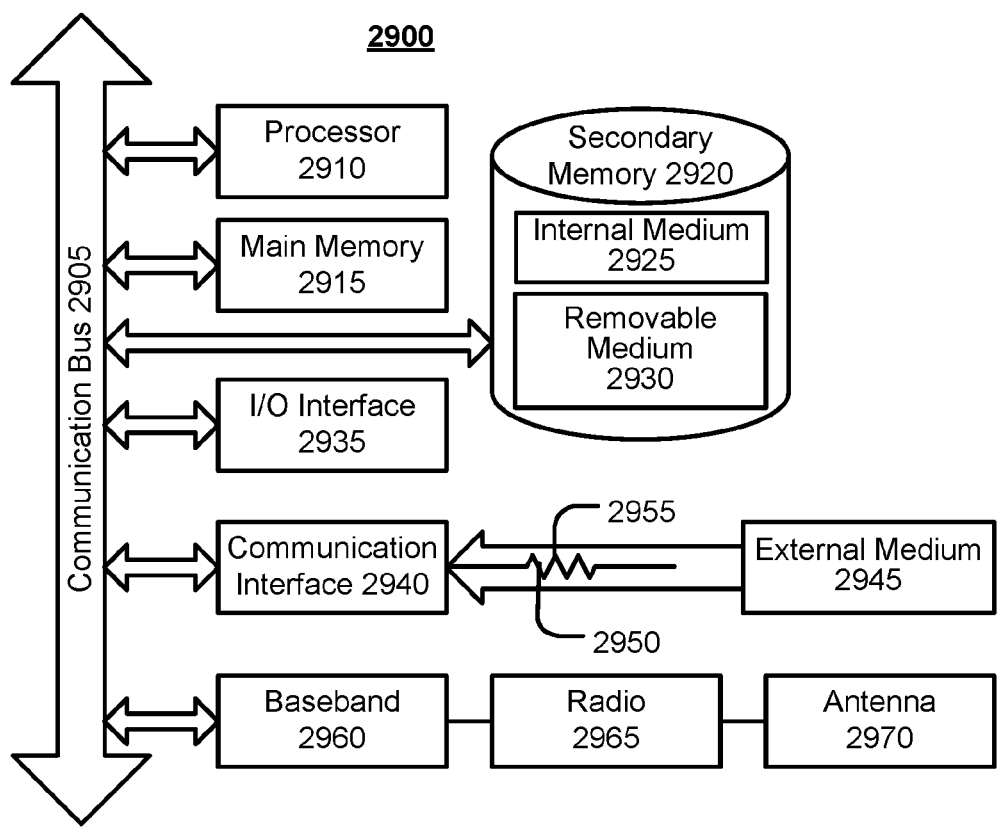
FIG. 29 illustrates an example processing system, by which one or more of the processes described herein, may be executed, according to an embodiment.

FIG. 29 is a block diagram illustrating an example wired or wireless system 2900 that may be used in connection with various embodiments described herein. For example, system 2900 may be used as or in conjunction with one or more of the functions, processes, or methods (e.g., to store and/or execute the software modules described in FIG. 5, to store and access the data structures described with respect to FIGS. 2 and 4, etc.) described herein, and may represent components of system 100, user devices 110, and/or other processing devices described herein. System 2900 can be a server or any conventional personal computer, or any other processor-enabled device that is capable of wired or wireless data communication. Other computer systems and/or architectures may be also used, as will be clear to those skilled in the art.

System 2900 preferably includes one or more processors, such as processor 2910. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 2910. Examples of processors which may be used with system 2900 include, without limitation, the Pentium® processor, Core i7® processor, and Xeon® processor, all of which are available from Intel Corporation of Santa Clara, California.

Processor 2910 is preferably connected to a communication bus 2905. Communication bus 2905 may include a data channel for facilitating information transfer between storage and other peripheral components of system 2900. Furthermore, communication bus 2905 may provide a set of signals used for communication with processor 2910, including a data bus, address bus, and/or control bus (not shown). Communication bus 2905 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 2900 preferably includes a main memory 2915 and may also include a secondary memory 2920. Main memory 2915 provides storage of instructions and data for programs executing on processor 2910, such as one or more of the functions and/or modules discussed herein. It should be understood that programs stored in the memory and executed by processor 2910 may be written and/or compiled according to any suitable language, including without limitation C/C++, Java, JavaScript, Perl, Visual Basic, .NET, and the like. Main memory 2915 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 2920 may optionally include an internal medium 2925 and/or a removable medium 2930. Removable medium 2930 is read from and/or written to in any well-known manner. Removable storage medium 2930 may be, for example, a magnetic tape drive, a compact disc (CD) drive, a digital versatile disc (DVD) drive, other optical drive, a flash memory drive, and/or the like.

Secondary memory 2920 is a non-transitory computer-readable medium having computer-executable code (e.g., disclosed software modules) and/or other data stored thereon. The computer software or data stored on secondary memory 2920 is read into main memory 2915 for execution by processor 2910.

In alternative embodiments, secondary memory 2920 may include other similar means for allowing computer programs or other data or instructions to be loaded into system 2900. Such means may include, for example, a communication interface 2940, which allows software and data to be transferred from external storage medium 2945 to system 2900. Examples of external storage medium 2945 may include an external hard disk drive, an external optical drive, an external magneto-optical drive, and/or the like. Other examples of secondary memory 2920 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 2900 may include a communication interface 2940. Communication interface 2940 allows software and data to be transferred between system 2900 and external devices (e.g. printers), networks, or other information sources. For example, computer software or executable code may be transferred to system 2900 from a network server (e.g., servers 120 and/or 124) via communication interface 2940. Examples of communication interface 2940 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 2900 with a network (e.g., network(s) 114 and/or 126) or another computing device. Communication interface 2940 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 2940 are generally in the form of electrical communication signals 2955. These signals 2955 may be provided to communication interface 2940 via a communication channel 2950. In an embodiment, communication channel 2950 may be a wired or wireless network (e.g., network(s) 114 and/or 126), or any variety of other communication links. Communication channel 2950 carries signals 2955 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 2915 and/or secondary memory 2920. Computer programs can also be received via communication interface 2940 and stored in main memory 2915 and/or secondary memory 2920. Such computer programs, when executed, enable system 2900 to perform the various functions of the disclosed embodiments as described elsewhere herein.

In this description, the term "computer-readable medium" is used to refer to any non-transitory computer-readable storage media used to provide computer-executable code and/or other data to or within system 2900. Examples of such media include main memory 2915, secondary memory 2920 (including internal memory 2925, removable medium 2930, and external storage medium 2945), and any peripheral device communicatively coupled with communication interface 2940 (including a network information server or other network device). These non-transitory computer-readable media are means for providing executable code, programming instructions, software, and/or other data to system 2900.

In an embodiment that is implemented using software, the software may be stored on a computer-readable medium and loaded into system 2900 by way of removable medium 2930, I/O interface 2935, or communication interface 2940. In such an embodiment, the software is loaded into system 2900 in the form of electrical communication signals 2955. The software, when executed by processor 2910, preferably causes processor 2910 to perform one or more of the processes and functions described elsewhere herein.

In an embodiment, I/O interface 2935 provides an interface between one or more components of system 2900 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 2900 may also include optional wireless communication components that facilitate wireless communication over a voice network and/or a data network (e.g., in the case of user device 110). The wireless communication components comprise an antenna system 2970, a radio system 2965, and a baseband system 2960. In system 2900, radio frequency (RF) signals are transmitted and received over the air by antenna system 2970 under the management of radio system 2965.

In an embodiment, antenna system 2970 may comprise one or more antennae and one or more multiplexors (not shown) that perform a switching function to provide antenna system 2970 with transmit and receive signal paths. In the receive path, received RF signals can be coupled from a multiplexor to a low noise amplifier (not shown) that amplifies the received RF signal and sends the amplified signal to radio system 2965.

In an alternative embodiment, radio system 2965 may comprise one or more radios that are configured to communicate over various frequencies. In an embodiment, radio system 2965 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 2965 to baseband system 2960.

If the received signal contains audio information, then baseband system 2960 decodes the signal and converts it to an analog signal. Then the signal is amplified and sent to a speaker. Baseband system 2960 also receives analog audio signals from a microphone. These analog audio signals are converted to digital signals and encoded by baseband system 2960. Baseband system 2960 also encodes the digital signals for transmission and generates a baseband transmit audio signal that is routed to the modulator portion of radio system 2965. The modulator mixes the baseband transmit audio signal with an RF carrier signal, generating an RF transmit signal that is routed to antenna system 2970 and may pass through a power amplifier (not shown). The power amplifier amplifies the RF transmit signal and routes it to antenna system 2970, where the signal is switched to the antenna port for transmission.

Baseband system 2960 is also communicatively coupled with processor 2910, which may be a central processing unit (CPU). Processor 2910 has access to data storage areas 2915 and 2920. Processor 2910 is preferably configured to execute instructions (i.e., computer programs, such as the disclosed application, or software modules) that can be stored in main memory 2915 or secondary memory 2920. Computer programs can also be received from baseband processor 2960 and stored in main memory 2910 or in secondary memory 2920, or executed upon receipt. Such computer programs, when executed, enable system 2900 to perform the various functions of the disclosed embodiments.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method comprising using at least one hardware processor to:
   store a database, wherein the database comprises, for each of a plurality of sites, data representing relative locations of one or more transmitters that emit radio frequency (RF) radiation at the site, wherein the one or more transmitters comprise at least one 5G antenna;
   for at least one of the plurality of sites,
      calculate a power density caused by the one or more transmitters, including the at least one 5G antenna, for one or more areas of the at least one site, and
      generate a maximum permissible exposure (MPE) map of the at least one site, wherein the MPE map comprises a graphical representation of each of the one or more transmitters, including the at least one 5G antenna, and graphically distinguishes any area of the site for which the calculated power density exceeds at least one limit; and
      for each of one or more of the plurality of sites,
         detect motion or human presence at the site based on an output of one or more sensors located at the site, and
         in response to detecting the motion or human presence, automatically control the one or more transmitters, including the at least one 5G antenna, to modify one or more operating parameters of the one or more transmitters to reduce RF exposure, wherein modifying the one or more operating parameters comprises continually modifying operation of the one or more transmitters, based on a calculated power density experienced by a human at a position of the detected motion or human presence, in real time, as that position changes over time, to ensure real-time compliance with RF exposure regulations as the human moves around within a vicinity of the one or more transmitters.

2. The method of claim 1, wherein the MPE map graphically distinguishes a plurality of areas of the at least one site based on the at least one limit.

3. The method of claim 2, wherein the at least one limit comprises an occupational limit and a general limit, and wherein the plurality of areas comprise a restricted area in which the calculated power density exceeds the occupational limit, and a controlled area in which the calculated power density is below the occupational limit but exceeds the general limit.

4. The method of claim 1, wherein the MPE map comprises a graphical representation of a floor plan at the at least one site with any graphically distinguished areas superimposed on the floor plan.

5. The method of claim 1, further comprising using the at least one hardware processor to, for the at least one site, generate a site-specific RF safety summary comprising a site identifier for the at least one site, the MPE map, and one or more safety rules.

6. The method of claim 5, further comprising using the at least one hardware processor to transmit the site-specific RF safety summary to at least one user device over at least one network.

7. The method of claim 6, further comprising using the at least one hardware processor to transmit the site-specific RF safety summary to the at least one user device over the at least one network in response to a request from the at least one user device over the at least one network.

8. The method of claim 7, further comprising, for each of the plurality of sites, generating a machine-readable indicium that encodes an identifier of the site for placement at the site, wherein the request comprises the identifier of the site as decoded from the machine-readable indicium by a mobile application on the at least one user device.

9. The method of claim 8, wherein the machine-readable indicium comprises a matrix barcode.

10. The method of claim 1, wherein, for each of the plurality of sites, each relative location of each of the one or more transmitters is represented as an offset from a fixed reference point.

11. The method of claim 1, further comprising using the at least one hardware processor to, for the at least one site:
receive a request to power down the at least one 5G antenna; and,
in response to the request, initiate power down of the least one 5G antenna.

12. The method of claim 11, wherein receiving the request to power down the 5G antenna comprises receiving a selection of the graphical representation of the at least one 5G antenna from the MPE map.

13. The method of claim 1, wherein the at least one 5G antenna is a plurality of 5G antennas, and wherein calculating the power density caused by the plurality of 5G antennas comprises using a model that calculates the contribution of each of the plurality of 5G antennas to the power density at a plurality of points in the MPE map.

14. The method of claim 1, further comprising using the at least one hardware processor to, for the at least one site:
receive an update to a configuration or a parameter of the at least one 5G antenna from a user device over at least one network; and,
in response to the update,
modify information stored for the at least one 5G antenna in the database and used to generate the MPE map of the at least one site, according to the update, and
initiate a communication to prompt at least one user, who previously obtained a safety certification for the at least one site, to obtain a re-certification for the at least one site.

15. The method of claim 14, further comprising using the at least one hardware processor to track all safety certifications for the plurality of sites in compliance with one or more applicable RF safety regulations.

16. The method of claim 1, further comprising using the at least one hardware processor to, for the at least one site:
receive an update to a configuration or a parameter of the at least one 5G antenna from a user device over at least one network; and,
in response to the update,
modify information stored for the at least one 5G antenna in the database and used to generate the MPE map of the at least one site, according to the update, and
record the modification in a modification history stored in the database.

17. The method of claim 1, wherein calculating the power density comprises calculating the power density using one or more equations, and wherein the method further comprises using the at least one hardware processor to:
receive an update to the one or more equations; and
modify the one or more equations according to the update so that subsequent calculations of the power density caused by the one or more transmitters use the modified one or more equations.

18. The method of claim 1, further comprising using the at least one hardware processor to:
determine a location of a user; and
restrict access to the MPE map for one or more of the plurality of sites based on the location of the user.

19. A system comprising:
at least one hardware processor; and
one or more software modules that are configured to, when executed by the at least one hardware processor,
store a database, wherein the database comprises, for each of a plurality of sites, data representing relative locations of one or more transmitters that emit radio frequency (RF) radiation at the site, wherein the one or more transmitters comprise at least one 5G antenna, and,
for at least one of the plurality of sites,
calculate a power density caused by the one or more transmitters, including the at least one 5G antenna, for one or more areas of the at least one site, and
generate a maximum permissible exposure (MPE) map of the at least one site, wherein the MPE map comprises a graphical representation of each of the one or more transmitters, including the at least one 5G antenna, and graphically distinguishes any area of the site for which the calculated power density exceeds at least one limit, and
for each of one or more of the plurality of sites,
detect motion or human presence at the site based on an output of one or more sensors located at the site, and
in response to detecting the motion or human presence, automatically control the one or more transmitters, including the at least one 5G antenna, to modify one or more operating parameters of the one or more transmitters to reduce RF exposure, wherein modifying the one or more operating parameters comprises continually modifying operation of the one or more transmitters, based on a calculated power density experienced by a human at a position of the detected motion or human presence, in real time, as that position changes over time, to ensure real-time compliance with RF exposure regulations as the human moves around within a vicinity of the one or more transmitters.

20. A non-transitory computer-readable medium having instructions stored thereon, wherein the instructions, when executed by a processor, cause the processor to:
 store a database, wherein the database comprises, for each of a plurality of sites, data representing relative locations of one or more transmitters that emit radio frequency (RF) radiation at the site, wherein the one or more transmitters comprise at least one 5G antenna;
 for at least one of the plurality of sites,
  calculate a power density caused by the one or more transmitters, including the at least one 5G antenna, for one or more areas of the at least one site, and
  generate a maximum permissible exposure (MPE) map of the at least one site, wherein the MPE map comprises a graphical representation of each of the one or more transmitters, including the at least one 5G antenna, and graphically distinguishes any area of the site for which the calculated power density exceeds at least one limit; and
 for each of one or more of the plurality of sites,
  detect motion or human presence at the site based on an output of one or more sensors located at the site, and
  in response to detecting the motion or human presence, automatically control the one or more transmitters, including the at least one 5G antenna, to modify one or more operating parameters of the one or more transmitters to reduce RF exposure, wherein modifying the one or more operating parameters comprises continually modifying operation of the one or more transmitters, based on a calculated power density experienced by a human at a position of the detected motion or human presence, in real time, as that position changes over time, to ensure real-time compliance with RF exposure regulations as the human moves around within a vicinity of the one or more transmitters.

* * * * *